(12) United States Patent
Banker et al.

(10) Patent No.: US 7,957,415 B2
(45) Date of Patent: *Jun. 7, 2011

(54) APPARATUS AND METHOD FOR UNILATERAL TOPOLOGY DISCOVERY IN NETWORK MANAGEMENT

(75) Inventors: Kim K. Banker, Rocklin, CA (US); Christopher Alan Del Signore, Los Gatos, CA (US); Gavin Bowlby, Houston, TX (US); Richard Karl Feldman, Los Altos, CA (US); Farivar Farzaneh, Los Altos, CA (US); Michael Timothy Kauffman, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 1178 days.

This patent is subject to a terminal disclaimer.

(21) Appl. No.: 10/916,597

(22) Filed: Aug. 12, 2004

(65) Prior Publication Data

US 2005/0013310 A1    Jan. 20, 2005

Related U.S. Application Data

(63) Continuation of application No. 09/397,911, filed on Sep. 17, 1999, now Pat. No. 6,847,614, which is a continuation-in-part of application No. 09/176,620, filed on Oct. 21, 1998, now Pat. No. 6,426,947, application No. 10/916,597, which is a continuation-in-part of application No. 09/063,633, filed on Apr. 20, 1998, now Pat. No. 6,295,272.

(51) Int. Cl.
*H04J 3/16* (2006.01)

(52) U.S. Cl. .................................... 370/466

(58) Field of Classification Search .................. None
See application file for complete search history.

(56) References Cited

U.S. PATENT DOCUMENTS

| | | | |
|---|---|---|---|
| 2,852,606 A | 9/1958 | Curry | |
| 3,178,515 A | 4/1965 | Bramer et al. | |
| 3,223,779 A | 12/1965 | McFarlane | |
| 3,384,822 A | 5/1968 | Miyagi | |
| 3,603,882 A | 9/1971 | Wilson | |
| 3,623,105 A | 11/1971 | Kamen | |
| 3,718,766 A | 2/1973 | Stover | |
| 4,079,203 A | 3/1978 | Dragoo | |
| 4,218,655 A | 8/1980 | Johnston et al. | |
| 4,425,642 A | 1/1984 | Moses et al. | |
| 4,677,608 A | 6/1987 | Forsberg | |
| 5,367,635 A | 11/1994 | Bauer et al. | |
| 5,509,123 A * | 4/1996 | Dobbins et al. | 370/254 |
| 5,598,406 A | 1/1997 | Albrecht et al. | |
| 5,719,868 A | 2/1998 | Young | |

(Continued)

OTHER PUBLICATIONS

"Simultaneous Transmission of Master and Slave Channel Data", D.H. Rumble, IBM Technical Disclosure Bulletin, vol. 5, No. 11, (Apr. 1963, pp. 73-75).

*Primary Examiner* — Anh-Vu Ly

(57) ABSTRACT

A system for reducing the cost of network management by using a proxy agent and subchannel communications so fewer SNMP licenses and fewer protocol stacks are needed. Subchannel communication is achieved in a plurality of different embodiments. Embodiments having single subchannel transceivers, multiple transceivers, single multiplexer and multiple multiplexers are disclosed. An NMS process using routing table CRC to automatically detect when the NMS topology information is incorrect and automated topology discovery is disclosed. A process for automated discovery of redundant cables during automated topology discovery is disclosed.

19 Claims, 37 Drawing Sheets

U.S. PATENT DOCUMENTS

| | | |
|---|---|---|
| 5,805,816 A | 9/1998 | Picazo et al. |
| 5,850,397 A * | 12/1998 | Raab et al. .................... 370/392 |
| 5,937,201 A | 8/1999 | Matsushita et al. |
| 6,151,390 A * | 11/2000 | Volftsun et al. ............... 370/467 |
| 6,295,272 B1 * | 9/2001 | Feldman et al. ............... 370/210 |
| 6,385,201 B1 * | 5/2002 | Iwata ............................ 370/400 |
| 6,426,947 B1 * | 7/2002 | Banker et al. ................. 370/254 |
| 6,693,917 B1 | 2/2004 | Feldman et al. |
| 6,847,614 B2 * | 1/2005 | Banker et al. ................. 370/252 |
| 7,664,142 B2 * | 2/2010 | Feldman et al. ............... 370/488 |
| 2002/0116493 A1 | 8/2002 | Schenkel et al. |
| 2002/0143935 A1 | 10/2002 | Schenkel et al. |
| 2005/0163110 A1 * | 7/2005 | Howell .......................... 370/352 |

* cited by examiner

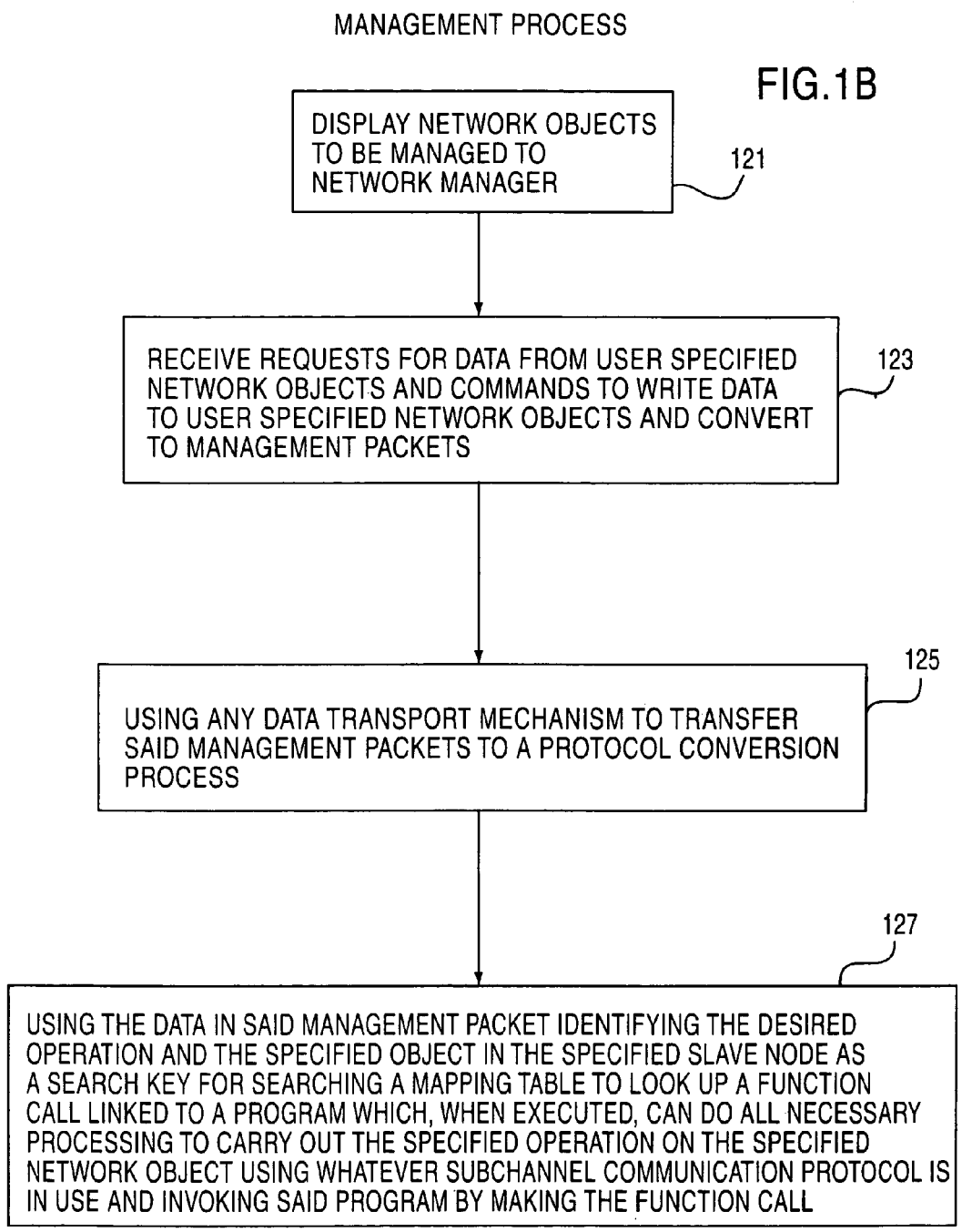

SUBCHANNEL ROUTING TABLE

| ID/OID | PARENT ID | PARENT DOWNLINK PORT # | UPLINK PORT # | NUMBER OF PORTS | ... |
|---|---|---|---|---|---|
| 0 | – | – | – | 1 | |
| 1 | 0 | 1 | 5 | 4 | |
| 2 | 1 | 1 | 1 | 4 | |
| 3 | 1 | 4 | 2 | 4 | |
| 4 | 3 | 3 | 2 | 4 | |
| ⋮ | ... | ... | ... | ... | |

101 → ID/OID, 103 → PARENT ID, 109 → PARENT DOWNLINK PORT #, 107 → UPLINK PORT #

FIG.5

ROUTING INSTR.

FIELD 1    FIELD 2     FIELD 3
[ [POINTER]   [.1.4]   [OPERATION CODE] ]
    117        115          119

FIG.7

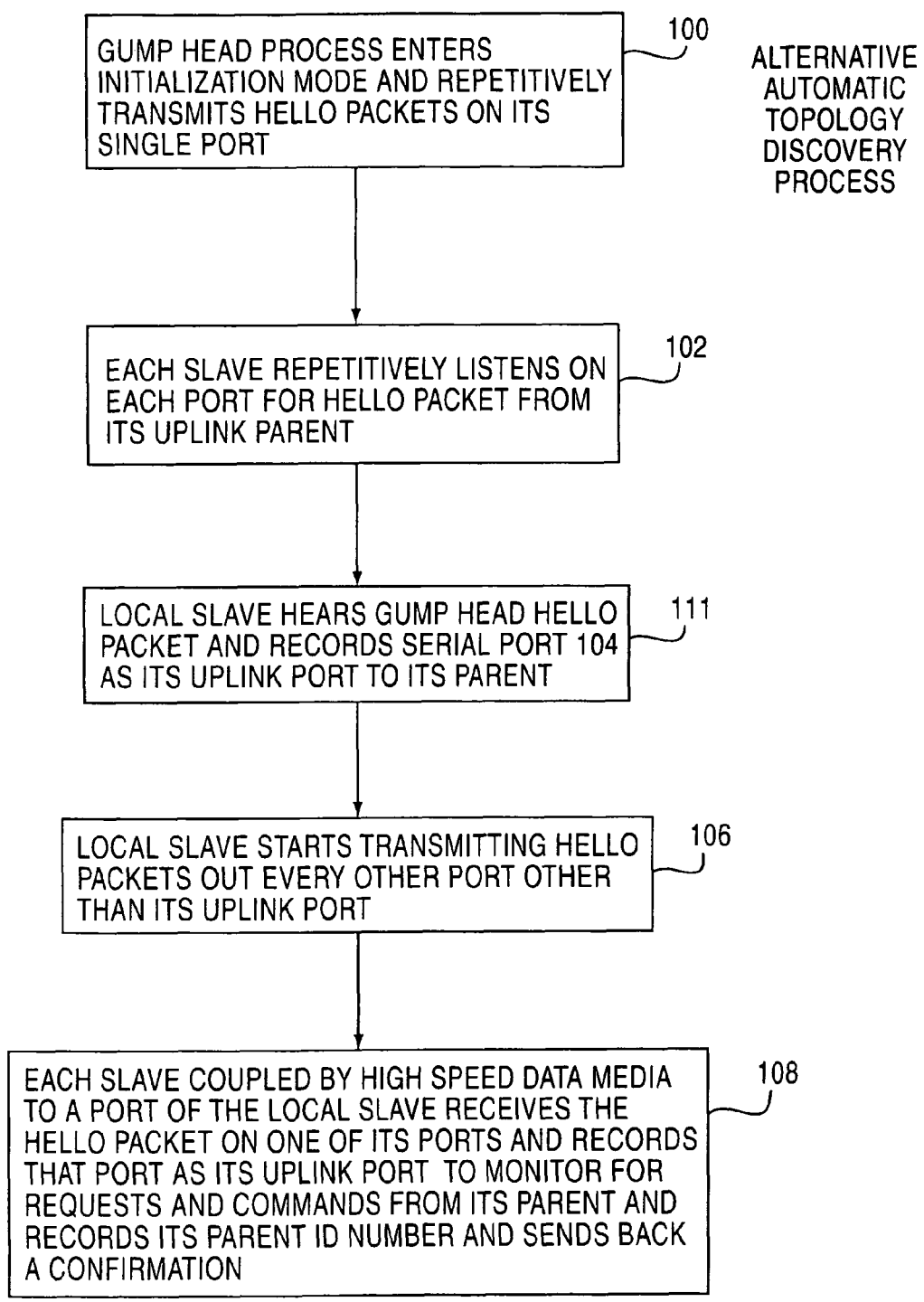

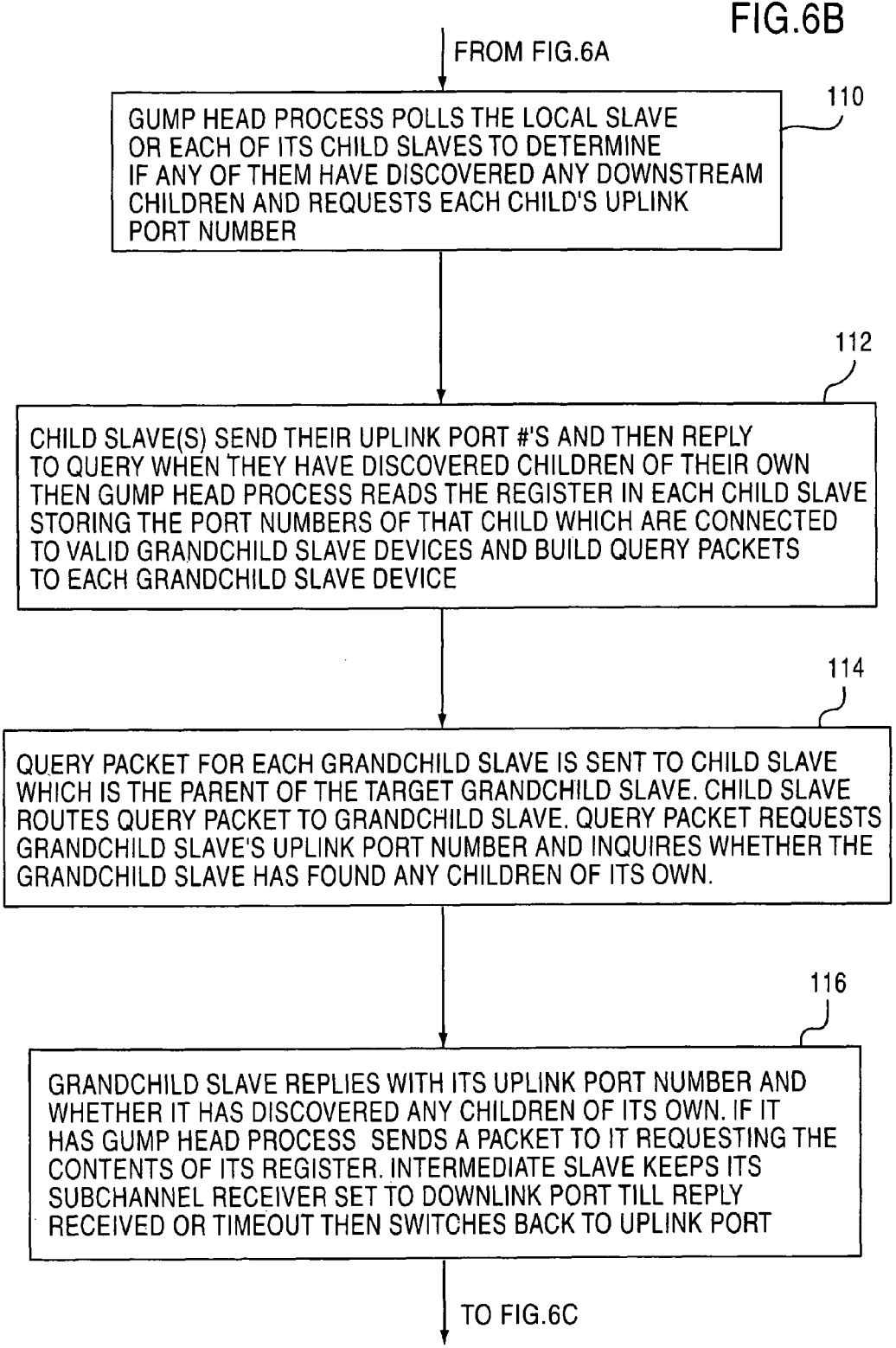

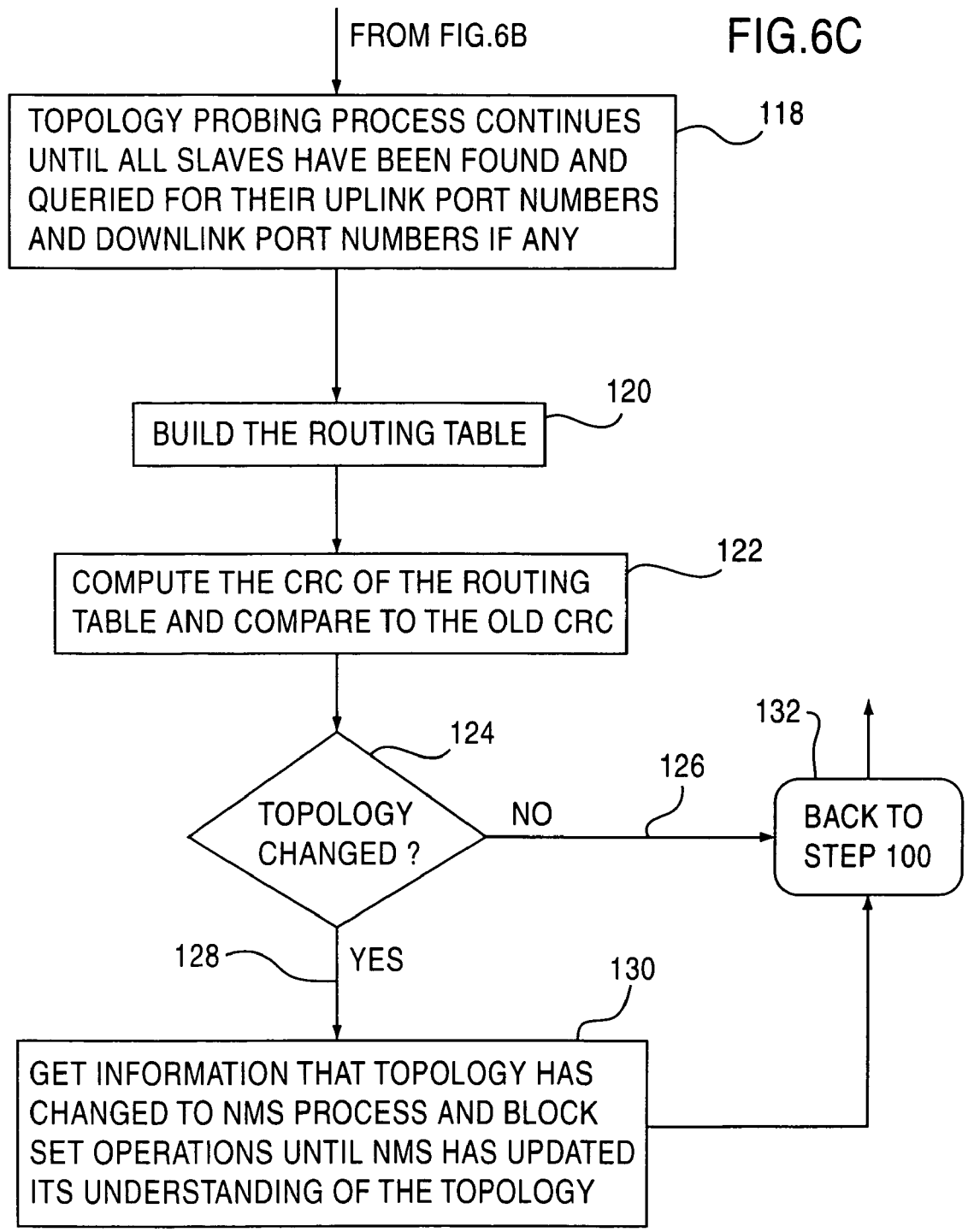

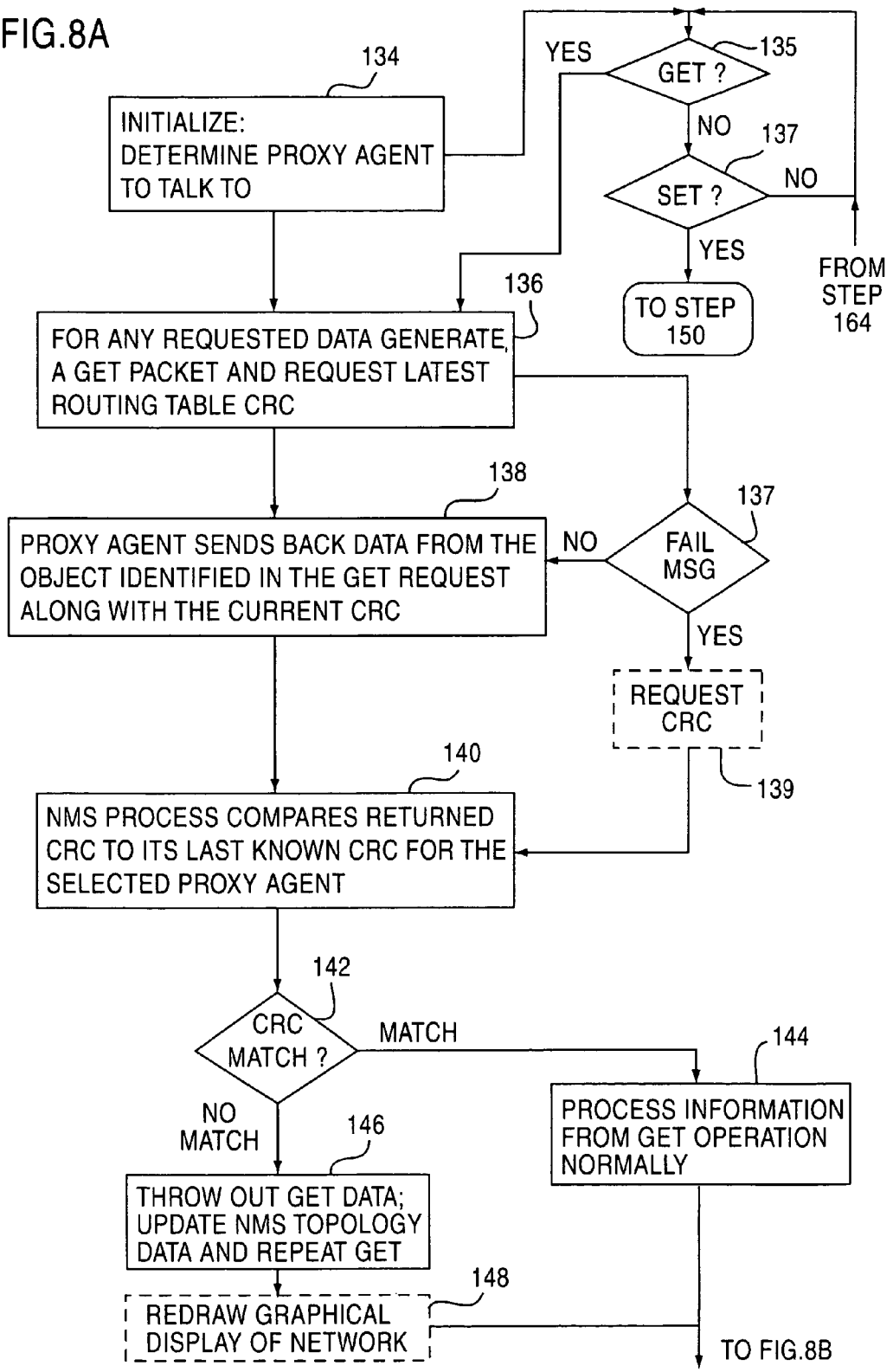

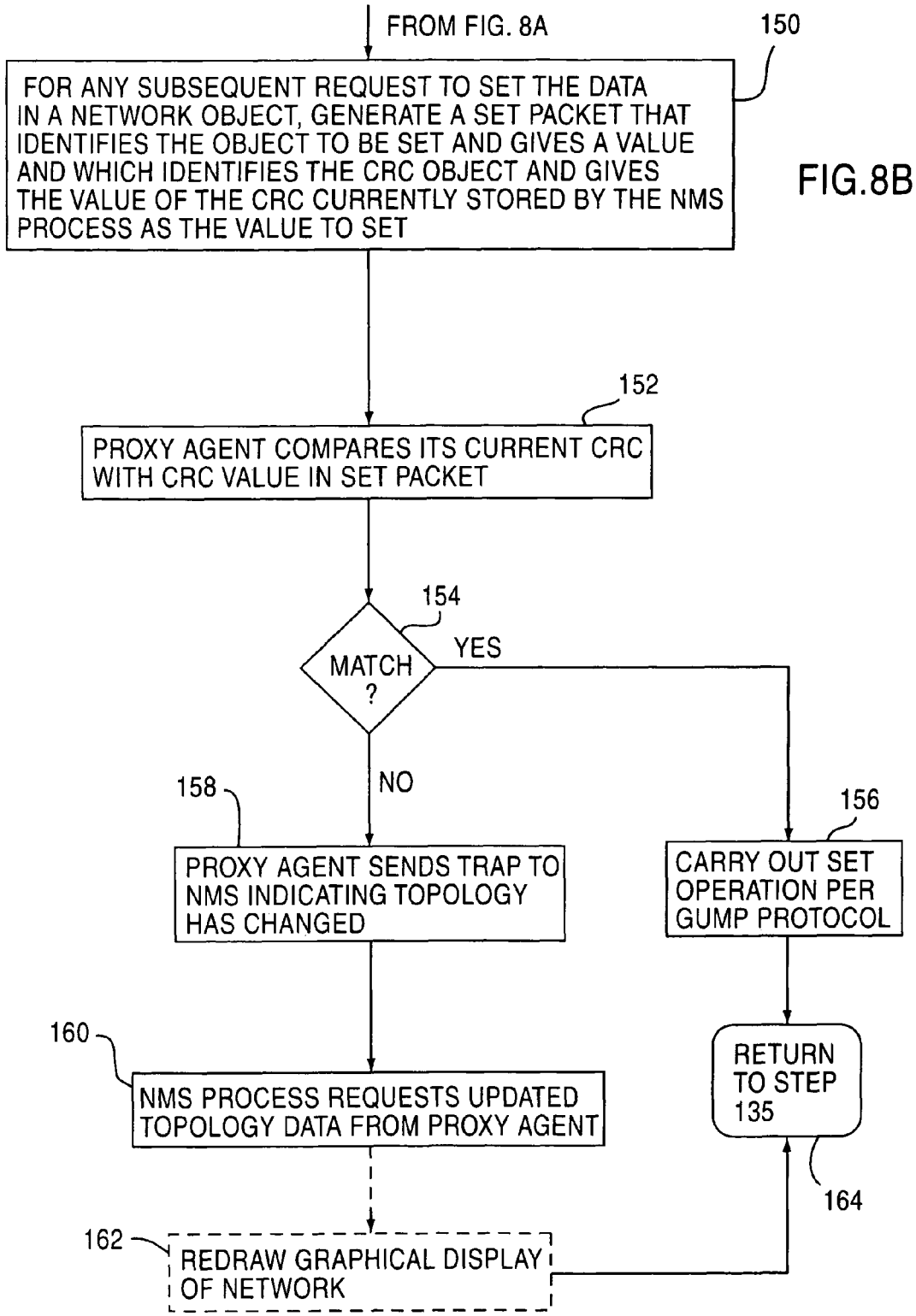

PROCESSING OF GETS AND SETS IN LAN EMBODIMENT USING GUMP/SUBCH

FROM FIG.9B ↓

224 — TO BUILD A SUBCHANNEL PACKET, THE PROGRAM IN THE GUMP HEAD PROCESS USES THE ROUTING TABLE TO BUILD ROUTING INSTRUCTIONS WHICH INCLUDE A BYTE FOR EVERY LEVEL IN THE HIERARCHY WHICH TELLS THE SLAVE PROCESS AT THAT LEVEL HOW TO SWITCH ITS MULTIPLEXER FROM THE UPLINK PORT TO THE CORRECT DOWNLINK PORT TO SEND THE SUBCHANNEL PACKET ON THE CORRECT BRANCH OF THE NETWORK TREE TO GET IT TO THE TARGET SLAVE. THE GUMP HEAD PROCESS ALSO ADD A POINTER FIELD WHICH IS INCREMENTED BY EACH RELAY SLAVE BEFORE TRANSMISSION SO THAT THE POINTER POINTS TO THE ROUTING BYTE THE RECEIVING SLAVE SHOULD USE TO CONTROL ITS MULTIPLEXER. THE SUBCHANNEL PACKET IS THEN TRANSMITTED VIA ALL THE SUBCHANNEL TRANSCEIVERS IN THE CHAIN TO THE TARGET SLAVE

226 — IN THE PREFERRED EMBODIMENT, ALL GETS ARE PROCESSED BY SENDING BACK THE REQUESTED DATA ALONG WITH THE CURRENT ROUTING TABLE CRC, AND THE NMS PROCESS COMPARES ITS LOCALLY STORED CRC TO THE CRC JUST RECEIVED AND THROWS OUT THE GET DATA IF THERE IS A CRC MISMATCH AND REQUESTS THE PROXY AGENT OR GUMP HEAD PROCESS TO SEND IT WHATEVER TOPOLOGY INFORMATION IT NEEDS TO UPDATE ITS UNDERSTANDING OF THE TOPOLOGY INCLUDING AT LEAST THE NEW GUMP IDS. THE NMS PROCESS THEN REDRAWS THE TOPOLOGY DISPLAY. IN THE PREFERRED EMBODIMENT, ALL SETS OF ANY OBJECT ARE ACCOMPANIED BY A REQUEST TO SET THE ROUTING TABLE CRC WITH THE NMS' MOST RECENT CRC VALUE. THE GUMP HEAD OR PROXY AGENT PROCESS COMPARES THE INCOMING CRC TO THE CORRECT ROUTING TABLE CRC AND BLOCKS THE SET OPERATION ON THE OTHER NETWORK OBJECT IF THERE IS A MISMATCH AND NOTIFIES THE NMS PROCESS OF THE MISMATCH. THE NMS PROCESS UPDATES ITS TOPOLOGY INFORMATION, REDRAWS THE DISPLAY AND TRIES AGAIN. IN ALTERNATIVE EMBODIMENTS, EVERY TIME THE ROUTING TABLE CRC CHANGES, A TRAP IS SENT TO THE NMS WHICH THEN UPDATES ITS TOPOLOGY INFORMATION AND REDRAWS THE DISPLAY.

228 — TARGET SLAVE PERFORMS GET OR SET ON TARGET OBJECT AND PUTS DATA IN AN UPSTREAM REPLY PACKET OR PREPARES AN ACKNOWLEDGEMENT OF A SET OPERATION. THE REPLY OR ACKNOWLEDGEMENT PACKET IS TRANSMITTED OUT THE UPLINK PORT OF THE TARGET SLAVE. EACH SLAVE IN THE CHAIN FROM THE TARGET SLAVE TO THE GUMP HEAD PROCESS MONITORS ITS DOWNLINK PORT IN THE CHAIN TO THE TARGET SLAVE UNTIL A REPLY PACKET OR ACKNOWLEDGEMENT PACKET IS RECEIVED. AS EACH SLAVE RECEIVES THE REPLY PACKET OR ACKNOWLEDGEMENT, IT SWITCHES ITS MULTIPLEXER TO ITS UPLINK PORT AND SENDS THE REPLY OR ACKNOWLEDGEMENT TO ITS PARENT. THIS PROCESS CONTINUES UNTIL THE REPLY OR ACKNOWLEDGEMENT REACHES THE GUMP HEAD PROCESS

230 — GUMP HEAD PROCESS SENDS REPLY OR ACKNOWLEDGEMENT TO PROXY AGENT VIA ITS API WHICH THEN ENCAPSULATES THE DATA OF THE REPLY OR ACKNOWLEDGEMENT IN AN SNMP COMPATIBLE PACKET AND SENDS IT BACK THROUGH THE PROTOCOL STACKS AND NETWORK TO THE NMS PROCESS.

FIG.9C

FSK DIGITAL SUBCHANNEL
TRANSMITTER

DIGITAL FSK SUBCHANNEL
TRANSMITTER #3

NON-BACKWARD COMPATIBLE SUBCHANNEL RCVR

SUBCHANNEL VARIES BIAS

APPARATUS AND METHOD FOR UNILATERAL TOPOLOGY DISCOVERY IN NETWORK MANAGEMENT

This is a continuation application of U.S. patent application Ser. No. 09/397,911, filed Sep. 17, 1999, now U.S. Pat. No. 6,847,614 which is a continuation-in-part application of prior U.S. patent application Ser. No. 09/176,620 filed Oct. 21, 1998 entitled APPARATUS AND METHOD FOR UNILATERAL TOPOLOGY DISCOVERY IN NETWORK MANAGEMENT that issued as U.S. Pat. No. 6,426,947 B1. This application is also a continuation-in-part of prior U.S. patent application Ser. No. 09/063,633 filed Apr. 20, 1998 now U.S. Pat. No. 6,295,272 entitled SUBCHANNEL MODULATION SCHEME FOR CARRY MANAGEMENT AND CONTROL DATA OUTSIDE THE REGULAR DATA CHANNEL, the contents of all of these parent applications being hereby incorporated by reference.

FIELD OF USE AND BACKGROUND

The invention is useful in Fibre Channel Arbitrated Loop (hereafter FCAL) or other computer network or telephony network management systems to, in the preferred embodiment, reduce the cost of ownership and provide a simple, lightweight, out-of-band (or in-band) network management protocol which is SNMP compatible and which has integrated, unilateral device/topology discovery using a synchronous command protocol.

FCAL is a form of computer network which is popular in high speed, high volume networks. The networks are comprised of one or more hubs and a plurality of nodes such as computers, printers, disk drive arrays etc. Like all computer networks, the nodes on the network are coupled together by a data path and the number and arrangement of nodes on the network can change over time.

Computer networks must be managed. Data must be obtained from the various nodes such as traffic levels, temperature etc. and various conditions must be set in the network to open ports, shut ports down etc. The various registers, ports, sensors etc. in a network are the objects to be managed. Typical network objects are enclosure temperature, port status (fault, bypass etc.), power supply status, fan status, traffic level etc. The temperature and fan status are important objects in high speed hubs since the hub will fail shortly after its temperature gets too high or its fan stops working.

SNMP, or Synchronous Network Management Protocol is an industry standard protocol enabling management of networks. SNMP protocol provides an industry standard way of performing get and set operations. Each of the objects to be managed in the various nodes has an object ID. Get operations cause data to be obtained from the object identified in the object ID (hereafter OID) in the get command. Set operations cause data to be written to the object defined by the object ID given in the set command.

Network management station (hereafter NMS) software that provides an interface to a network management employee and allows him or her to manage the network by issuing get and set commands is known in the art. There are many software programs available commercially that provide SNMP compatible network management services. These programs reside on a computer coupled to the network and can either communicate with the nodes in the network directly or through so-called proxy agents. Originally NMS SNMP software was designed to talk to a single device on the network. As networks grew in size, various solutions to this problem surfaced. Proxy agents were one of these solutions. An example of a prior art NMS software package is Open View™.

Proxy agents are known and are a way of reducing the amount of software and licenses that are needed for the nodes on the system. If a network is arranged so that NMS SNMP management software manages the network by communicating directly with the nodes in the network, more software are needed than if a proxy agent is used. NMS software typically communicates with the objects in the network by encapsulating SNMP packets inside Ethernet packets and sending the Ethernet packets to the nodes on the network which contain the objects from which data is needed or to which data is to be written. NMS software can use other protocols than SNMP and Ethernet. To manage a network in this way requires that each node have an Ethernet interface card and a software driver for that card plus UDP/IP layer software to understand the IP packet address header and SNMP layer software to understand the get and set commands, decode the OIDs and carry out the desired functions. This requires an SNMP license for every node plus the expense of the UDP/IP layer plus the expense of the Ethernet software and hardware at the physical layer. Proxy agents cut down on this expense by incorporating the Ethernet driver and interface card and the UDP/IP and SNMP layer software therein to receive SNMP commands from the NMS software. The proxy agent then uses its own less complicated communication protocol to communicate with the other nodes in the system in a master-slave relationship to carry out the get and set commands. An example of a prior art proxy agent software program is the proxy agent available commercially from ISI or the VX Works™ package available commercially from Wind Works.

A MIB is an abstract definition document containing data that is used by the NMS software and the proxy agent to learn the network objects available in a particular network that can be managed. The function of the MIB is to define the objects in the nodes that are available for management (sometimes called "exposing" them) to the NMS software and the proxy agent. MIBs are written in custom fashion for each network to define the objects in the network to be served by the hubs in the network to the NMS software. The MIB defines the syntax that the NMS software should use to ask for data from an object or set data into the object. The MIB defines the OIDs of the objects in the network so that the NMS can do gets and sets to these OIDs and so that the hubs know which objects to which the gets and sets are directed. The MIB also defines what type of data, e.g., floating point, 4-byte integer etc., is output by an object or what type of data to write to an object. The hubs in the network serve as the servers which serve the objects in the network to the NMS software. Every hub has a MIB which lists the objects which can be viewed and controlled by the NMS software process.

SUMMARY OF THE INVENTION

In a broadly defined embodiment of the invention, several elements described below are combined to provide a system for reducing the cost of network management by using a proxy agent and subchannel communications sharing the same media as the high speed data of the network. For purposes of clarity in separating the notions of the mainstream data traffic on the network and the management data and commands, the phrase "high speed data" will be used to denote the mainstream data signals which are not management data and commands. However, the phrase "high speed data" in this specification and claims should not be understood as limiting application of the invention to networks where actual high speed data such as 1 GB Ethernet or FCAL is being transferred. The various embodiments of the invention are useful in any network comprised of a plurality of objects to be monitored and/or managed regardless of the speed of the mainstream data traffic.

By using a proxy agent and subchannel communications, the additional expense devoted to network management is reduced because fewer SNMP licenses and fewer Ethernet and UDP/TCP protocol stacks are needed and no separate wiring for management communications to each node is needed. Further, because the subchannel data shares the media used by the high speed data and there is no separate Ethernet or other LAN coupling each node and carrying solely management traffic, there is also no need for an Ethernet or other interface circuit at each node.

Although the preferred embodiment described herein uses a subchannel out-of-band communication path, in alternative embodiments, the management protocol can be practiced in-band also. These embodiments do not require the mapping process and routing instructions in each subchannel packet but require management data encapsulated in regular packets normally used to transfer high speed data and require a process to crack open each data packet in the mainstream, look for management data, route the packet or repeat the packet onto the segment containing the target node and management object and a process to crack open the packet at the target node and act on the management request.

Subchannel communication is achieved in a plurality of different embodiments. Embodiments having single subchannel transceivers, multiple transceivers, single multiplexer and multiple multiplexers are disclosed.

An NMS process using routing table cyclic redundance check calculation (hereafter CRC) to automatically detect when the NMS topology information is incorrect and automated topology discovery is disclosed. A process for automated discovery of redundant cables during automated topology discovery is also disclosed.

In a broad embodiment, the subchannel communication protocol and apparatus stands alone regardless of what type of NMS or other process supplies the object IDs and desired operations to be performed on those objects. In this broad embodiment, a proxy agent receives a management command identifying the object upon which a management function is to be performed such as writing data to the object or reading data therefrom. The proxy agent uses the object ID as a search key to look up a function call in a mapping table which maps object IDs to specific function calls associated with a computer program in a library of programs that has an application programmatic interface. Each program is invoked by a specific function call of the API and controls the hub or switch microprocessor to do all processing necessary to carry out the desired management function on the object identified in the management command. The program is executed, and, if necessary, it builds a subchannel packet using the object ID in the management command and routing instructions read from a routing table which stores routing information based upon the current network topology to get a subchannel packet to every object ID in the network. The particular communication protocol to get the subchannel packets to their target network objects is not believed to be critical to the invention. For example, in some embodiments, the routing table can be eliminated and each subchannel packet contains at least the object ID and information codifying the management function to be performed. Each subchannel packet in this embodiment is then broadcast on the subchannel to all nodes. The particular switching protocol for this embodiment for the subchannel transceivers depends upon the network topology. Each node looks at each subchannel packet and decides whether the packet is addressed to it or not. In the preferred embodiment, the nodes in the network are arranged in a hierarchical structure, each node except the master node having exactly one parent node and possibly having one or more child nodes. Each node has a subchannel transceiver which controlled to constantly monitor the uplink port coupled to the parent to receive subchannel packets and uses routing instructions in said subchannel packet to switch its transmitter to output the subchannel packet on the correct downlink port to send the subchannel packet on its way to the target object. In each node, after transmitting the subchannel packet out a downlink port, the transceiver receiver is switched over to constantly monitor the downlink port for any reply packet or message transmitted by the node having the target object, and when such a subchannel packet is received, the transceiver sends it out the uplink port to its parent node, and then switches its receiver to begin monitoring the uplink port again for further subchannel packets or topology discovery messages.

Switches Between

The first element in some embodiments is a network management process having any type of user interface such as a graphical or non graphical interface which functions to send management packets to a proxy agent to obtain data and set various network objects to desired values. The network management process can use any type of management protocol and any type of database which exposes to it the objects on the network available for managing. Preferably, SNMP protocol and a MIB are used. In the claims, the phrase "network management process" is used to refer to any type of NMS process using any type of management protocol and any type of database to expose the objects to be managed.

Transmission of the management packets to the proxy agent can be by any method such as over any type of data network or over an interprocess transfer mechanism. In the claims, the phrase "data transport mechanism" is used to refer to whatever mechanism is used to get the management packets to the proxy agent regardless of whether the network management process and the proxy agent are running on different computers at the same location, at different locations or on both running on the same computer.

The proxy agent process can either cause transfer of each management packet to the object which is the target thereof by an out-of-band subchannel transmission or can cause the management packet to be converted to a packet of another format. The packet of another format or the management packet itself transmitted over the subchannel is referred to in the claims as a subchannel packet. If the management packet has been converted by the proxy agent into another format, the other format can be any necessary format to aid in implementing the communication protocol used to transmit the subchannel packet to the object such as the GUMP packet format described in the detailed description.

The transmission of the subchannel packet to the network object to be managed may be by any communication protocol, so long as the transmission is made over the same media as the high speed data and is made out-of-band. "out-of-band" means the subchannel packet is not encapsulated in any packet of the type used to transmit the high speed data and does not reduce the high speed data throughput. In the broadest definition of the invention, the type of communication protocol to get the management packets from the proxy agent to target network objects is not important, and in the claims, the communication protocol from the proxy agent process to the objects to be managed is simply referred to as "any subchannel communication protocol".

The subchannel transmissions are made by one or more subchannel transceivers in each hub and node on the network. The number of transceivers used to do the subchannel communication protocol is also not important. The hubs and nodes usually have multiple ports, and if the number of subchannel transceivers is less than the number of ports, one or more multiplexers are used to couple the transceivers to the ports. The number of multiplexers used is in accordance with the subchannel communication protocol and is not critical to the invention in the broadest definition thereof.

The type of high speed data network carrying payload data is also unimportant so long as a type of encoding is used on the payload data which is DC balanced or otherwise encoded so that a portion of the Fourier spectrum of the payload data has suppressed energy levels and can be used for subchannel communication of overhead data such as subchannel packets with minimal interference from the high speed data. The phrase "data network" in the claims is intended to mean any type of data network as defined in the previous sentence.

More generally stated, the main genus of the invention includes all species which solve one main problem. This problem is how to reduce the cost of ownership of a network wherein both high-speed, high-volume data and low-speed, low-volume management data must be sent without having an adverse impact on the throughput of the high speed data. This problem has three cost components: the cost of a separate data path for management packets to every hub or node having objects therein to be managed; and, the cost of a separate, protocol stack at every hub or node, the protocol stack being those software processes to process the overhead aspects of transmitting the management packets to the devices to be managed; and the cost to implement a communication protocol between the master hub and proxy agent process and the slave nodes. Specifically, if an SNMP management protocol is used and the SNMP packets need to be transmitted over a data path including Ethernet LAN segments and internet segments, then each hub or node needs to have a protocol stack that includes the several software layers needed to do SNMP processing, UDP filtering and routing, UDP/IP protocol processing and interface to the Ethernet LAN segment to which the node or hub is connected. The "master hub" is a hub or switch with a microprocessor in it that executes the proxy agent process and the subchannel communication protocol and which initiates automated topology discovery and routing table CRC calculations and carries out processing based upon the routing table CRC to insure that get and set or other management operations are based upon the correct network topology.

Each species in the main genus solves this main problem by having two shared structural and/or operational characteristics. First, every species in the main genus eliminates the need for separate data paths for the management and control data which are different from the high speed data paths. This is accomplished through use of an out-of-band subchannel data path through the same media used by the high speed data. The second component of the cost of ownership problem is solved by every species in the genus by elimination of the protocol stack at every node or hub and substituting a single protocol stack at one central location in embodiments where the network management process is physically separated from the network to be managed and coupled thereto through a wide area and/or local area net. This is accomplished in every species of the main genus through use of a network management process that talks to objects in the network to be managed through a proxy agent running on the machine having the single protocol stack. The use of a proxy agent allows the network management software to talk to a single entity, the proxy agent having a single IP address. The network management process does not have to be able to communicate with all the objects to be managed by whatever communication protocol is used to talk to them. The proxy agent does that. A simple communication protocol using the subchannel provides out-of-band communication between the proxy agent and the slave nodes. This structure having a subchannel management data path and a proxy agent eliminates the need for an IP address for every hub or node and eliminates the need for a protocol stack at every hub or node. In species where SNMP management protocol is used, it also eliminates the need for an SNMP (or other management protocol) license for every hub or node.

Every species in the main genus transmits out-of-band management packets which are transmitted using the same media as the high speed data, but wherein the management and control data is transmitted in subchannel packets and not encapsulated in any high speed data packets that would waste bandwidth needed for payload data. Because management data packets are usually not as large as the capacity of the high speed data blocks or packets, by not including the management packets in otherwise empty high speed data blocks, wasted bits space is avoided. This prevents reducing the throughput of the high speed data by in-band management packet transmission. The transmission of management and control data occurs over a subchannel portion of the Fourier spectrum of the high speed data where not very much energy from the high speed data is present to interfere with the subchannel transmissions using a simple communication protocol involving a single subchannel transceiver in every node, a routing table and routing instructions in subchannel packets. The species of this main genus using subchannel communications out-of-band on the main network media can be used on any network which has DC balanced encoding to suppress energy content at low frequencies from DC up to some frequency below the main energy content of the high speed data. Networks using 8b/10b encoding protocol are examples of networks in which the invention can be used.

The communication protocol used by the proxy agent to transmit the management packets over the subchannel can be any known communication protocol. The management packets can be sent on the subchannel using either complex peer-to-peer communication protocols or simpler point-to-point communication protocols which are not peer-to-peer. All that is necessary is that the management subchannel packets get to the correct objects to be managed eventually. The details of how many transceivers are used in each hub or node to do the subchannel communication or the communication protocols they use to transmit on the subchannel are not important for species within this broadly defined genus. The subchannel communication protocol of the preferred embodiment can drop a packet, but this is not fatal since the proxy agent will retry although there is no retry between slaves.

The advantage of the species in this main genus is that the complexity, expense and inconvenience of using separate data paths for management data and the complexity and expense of a protocol stack and possible SNMP license at every node or hub are eliminated while providing the flexibility, reliability and expansion capability of a managed network.

Such managed networks include multiple nodes or hubs each of which includes at least one port capable of bidirectional communication, but most of which contain multiple ports each of which must be capable of bidirectional communication.

A subgenus within this main genus solves a second problem. That problem is how to reduce the cost and complexity of the hardware and software for subchannel communication of management data. This problem is solved in all species of the subgenus by using a single subchannel transceiver in every hub and node with a multiplexer that switches the transceiver transmitter output and receiver input simultaneously between the multiple ports in accordance with a light weight, synchronous communication protocol for management or subchannel packets.

The species in this subgenus implement a simple, non peer-to-peer communication protocol by use of foreknowledge of the topology of the network so that routing instructions can be given to management packets. Simple parent-child relationships are used to define the topology and only one subchannel transceiver is used in each such node or hub regardless of how many ports each node or hub has. Simple rules are used to control the switching of the multiplexer so as to guide the single transceiver as to which port to listen to or transmit from. A simple slave software process controls switching by the multiplexer. The term "slave" is used herein to mean "proxied device" which the proxy agent process talks to. Nodes and slaves are intended to be understand as meaning the same thing when speaking of nodes on the network other than the master hub node or the proxy agent process. The slave process controls the multiplexer to always listen to the port connected to the parent (the uplink port) until the parent sends a management packet and instructs the child slave to transmit it out a specific port to another slave. The incoming packet is referred to in the claims as a subchannel packet and is called a GUMP packet in the detailed description below of the preferred embodiment. GUMP packets are particular kinds of subchannel packets which include routing instructions in the header thereof based upon the topology of the network so as to instruct each slave through which the GUMP packets passes how to switch its multiplexer to make the relay. The protocol is synchronous, so a slave through which a GUMP packet passes keeps its multiplexer switched to the downlink port out which the packet was transmitted until a reply is received or timeout occurs. When either event occurs, the slave process switches the multiplexer back to the uplink port, and, if a reply was received, sends the reply packet to its parent. This process continues all the way up the chain. This simple protocol has no lost packets, no collisions since the master talks to only one slave at a time, and does not require complicated back-off and retry algorithms.

The foreknowledge of the topology necessary to provide these routing instructions in this subgenus may be provided by configuration data which is supplied by the network administrator or by automatic topology discovery. The automatic topology discovery process is practiced in the preferred embodiment. Automatic topology discovery has the advantage of eliminating the need for the network administrator to update the configuration data of all the slaves when the topology of the network changes.

One alternative embodiment employs one subchannel transceiver for every port so that broadcast subchannel communication protocols can be implemented.

Another alternative embodiment employs one subchannel transceiver in every port but multiple multiplexers, one for the transmit output and the other for the receiver input.

BRIEF DESCRIPTION OF THE DRAWINGS

FIGS. 1B and 1C are a flowchart illustrating the general process for managing the network carried out by all species in the genus of FIG. 1A.

FIG. 5 is a diagram of a typical routing table.

FIGS. 6A, 6B and 6C are a flow chart of an alternative embodiment of an automatic topology discovery process to discover new child slaves, encode the topology in a routing table and generate a short description of the routing table in the form of a CRC.

FIG. 7 is a diagram of one type of downstream subchannel packet with routing instructions which is used in the slave subchannel communication processes to control switching of their single multiplexer in the light-weight, store-and-forward, single-thread, subchannel communication protocol.

FIGS. 8A through 8B are a flowchart of processing by the NMS process to use the routing table CRC to detect and correct the situation when the NMS topology information is out of date.

FIGS. 9A through 9C is a flowchart of the preferred process of network management data requests and commands issued by a network manager using an SNMP compatible NMS application, a proxy agent, a light weight subchannel communication protocol with the NMS process constantly apprised of changes in topology by use of a routing table CRC.

DETAILED DESCRIPTION OF THE PREFERRED AND ALTERNATIVE EMBODIMENTS

Figure 1A:
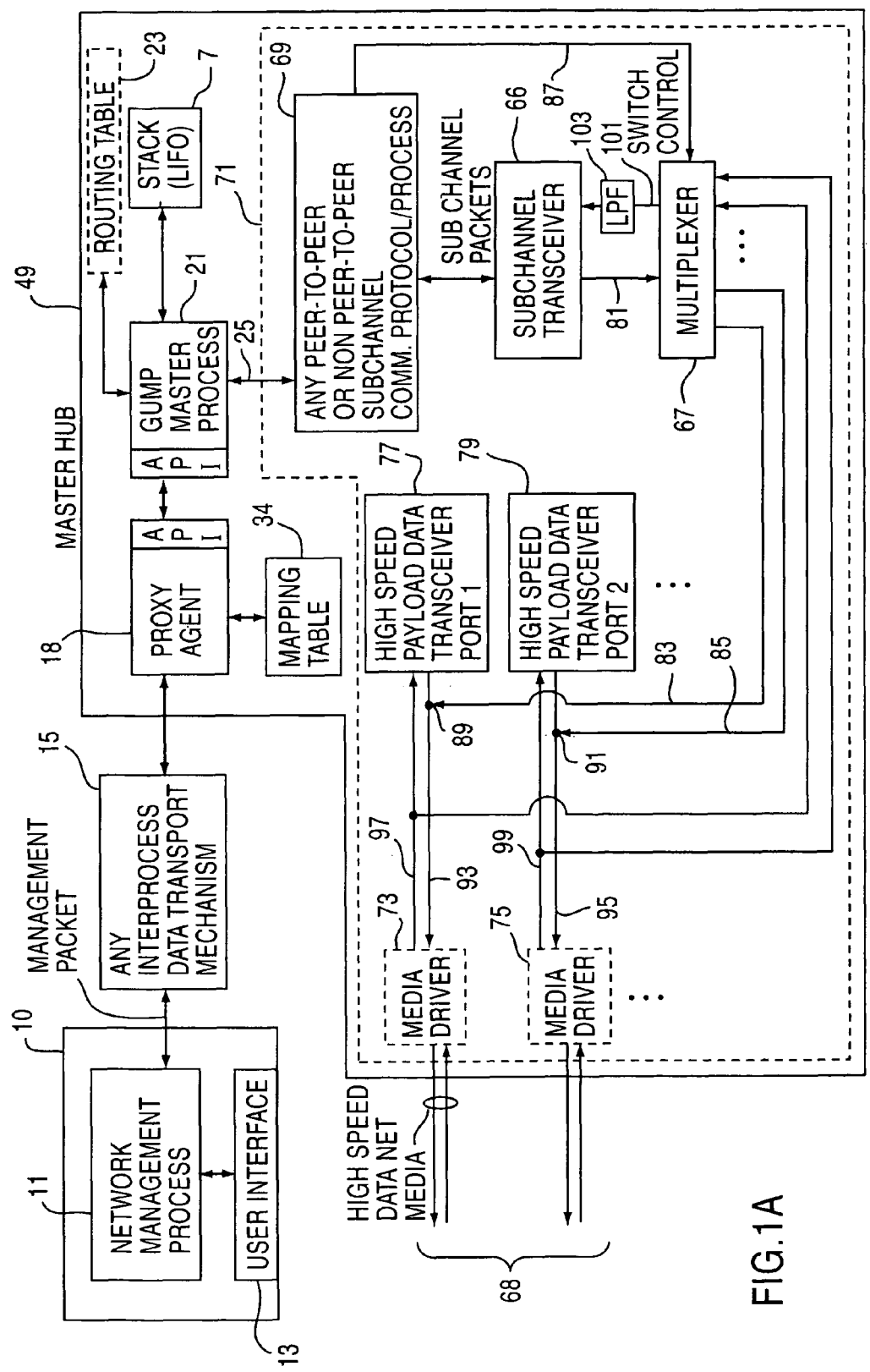
FIG. 1A is a block diagram representing the main genus of systems for managing networks using proxy agents and subchannel communication so management packets can be sent out of band over the same media as the high speed network data.

Referring to FIG. 1A, there is shown a block diagram representing the main genus of the invention. There follows a description of the structural and operational characteristics that all species in the main genus share. FIG. 1B is a flowchart illustrating the general process for managing the network carried out by all species in the genus.

A computer 10 has in execution thereon a network management process (hereafter sometimes referred to as the NMS process) 11 which has either a graphical or non graphical interface 13 to a network manager. The function of the NMS process is to display all objects in a high speed data network which can be managed to the network manager using a management object database (not shown) which defines all the available objects and gives their characteristics and to receive requests to obtain data from selected objects or write data to selected objects and convert those requests to management packets. Specifically, the network management software process either by list or by graphical display of the topology of the network, displays the network objects to be managed to the network manager, as symbolized by step 121 in FIG. 1B. The network manager then enters data requests and issues commands to write certain data to certain objects to manage the network via a mouse and/or keyboard. The NMS receives these requests for data and commands to write data, and converts them into management packets for transmission to a proxy agent process 18, as symbolized by step 123 in FIG. 1B. In some embodiments, the NMS process is eliminated and another autonomous management process is substituted that needs no interaction with a network administrator. For example, an autonomous network management process that is coupled to the proxy agent or substitutes for it which functions to periodically poll every management object in the network to make sure all values are within limits and all nodes are operative could be substituted for the NMS process 11.

The network management process can use any type of management protocol and any type of database which exposes to it the objects on the network available for managing. Preferably, SNMP protocol and a MIB are used. In the claims, the phrase "network management process" is used to refer to any type of NMS process with any type of user interface and using any type of management protocol and any type of database to expose the network objects to be managed.

Figure 1C:
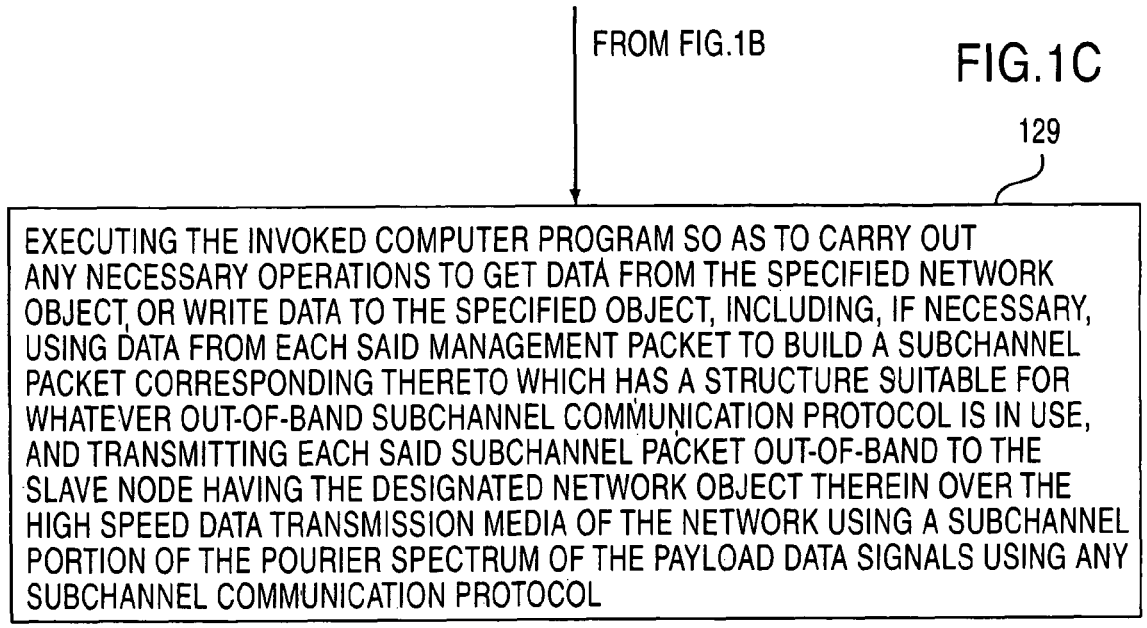
Figure 3:
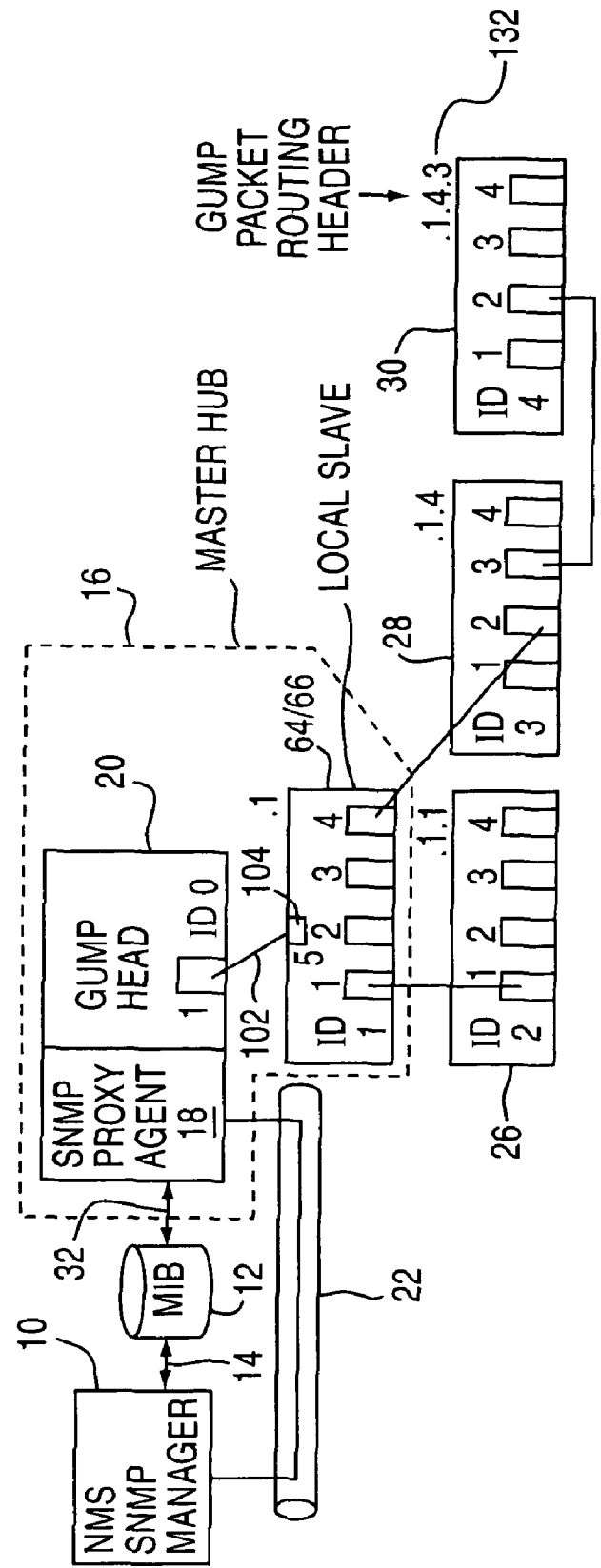
FIG. 3 is a block diagram of a species within the genus of FIG. 1A using SNMP management protocol, a MIB and an SNMP proxy agent and an Ethernet LAN coupling the NMS process to the SNMP proxy agent.
Figure 4:
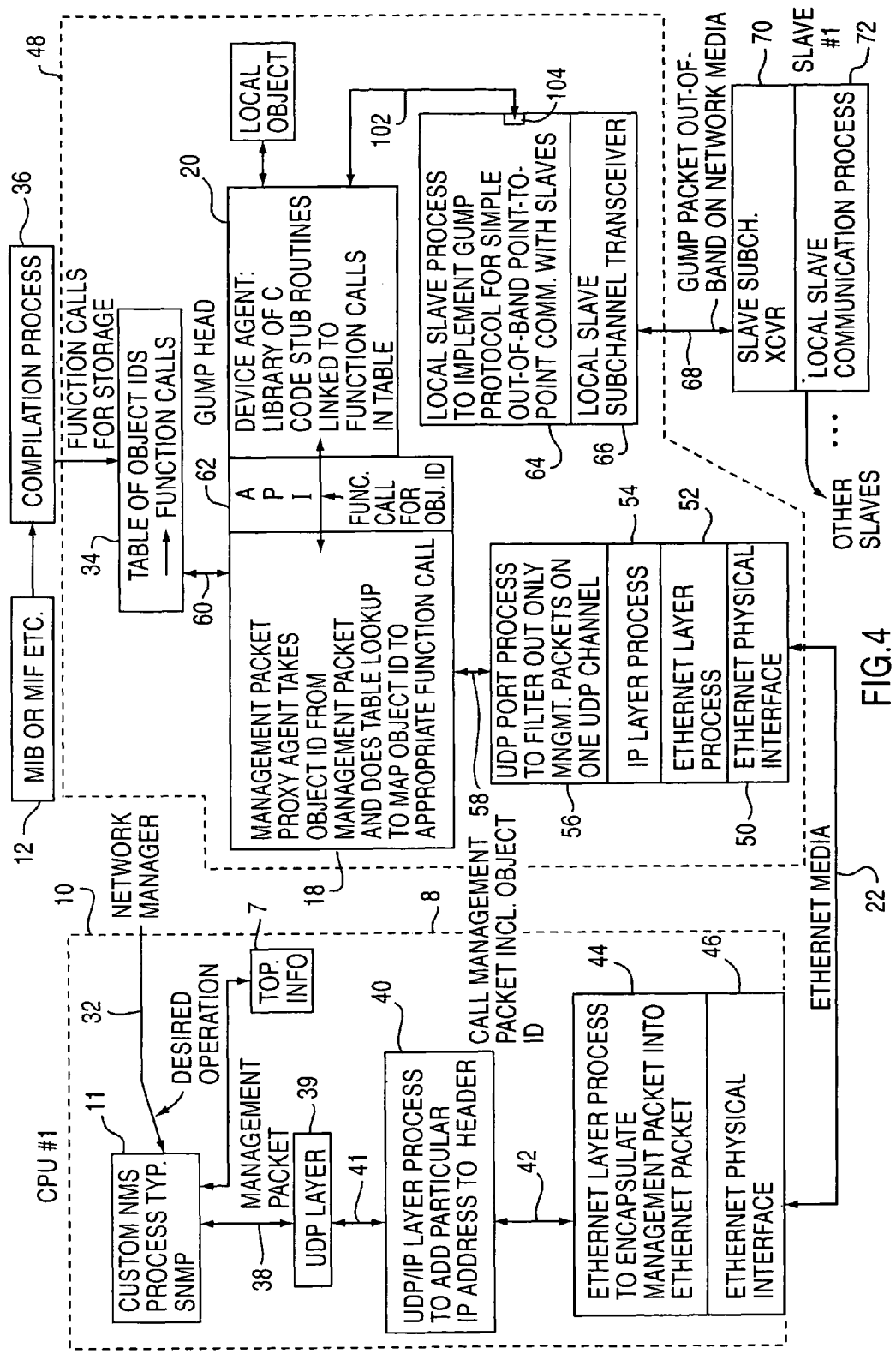
FIG. 4 is a more detailed block diagram of the preferred embodiment of FIG. 3 showing the various protocol layer processes and their functions and the general software architecture.

The management packets can be delivered to the proxy agent by any known data transport mechanism to transfer data from one computer process to another, as represented by step 125 in FIG. 1B. The data transport mechanism can be over any type of data network using any necessary protocol/encapsulation processes, or over any intracomputer interprocess transfer mechanism. In FIGS. 3 and 4, a local area network such as an Ethernet are used, and FIG. 4 shows the details of the necessary protocol stacks needed in this environment. However, in some embodiments, the proxy agent 18 and NMS process may be running on two computers coupled together by a serial bus so a SLIP protocol can be used. In other embodiments, the NMS and proxy agent may be running on the same computer so any intracomputer, interprocess message mechanism can be used. Block 15 in FIG. 1 represents this diverse collection of ways to get the management packets to the proxy agent. In the claims, the phrase "data transport mechanism" is used to refer to block 15 representing whatever mechanism is used to get the management packets to the proxy agent process regardless of whether the network management process and the proxy agent are running on different computers at the same location, at different locations or on both running on the same computer.

Eventually, the management packets get to the proxy agent 18 or other protocol conversion process. The proxy agent or protocol conversion process is a process running on a programmable computer in a master hub 49 or in any other programmable computing machine coupled to the master hub. The protocol conversion process functions to find and invoke a computer program which can perform any necessary operations or communication protocol to perform the designated operation on the designated object. The protocol conversion processing includes, if necessary, converting the data in the management packet to a subchannel packet having a structure to support whatever out-of-band subchannel communication protocol is in use. The protocol conversion processing is accomplished by using the data from the management object specifying the desired operation to be performed on a specified object in a specified slave hub or node or in said master hub as a search key to search a mapping table to lookup a function call linked to a computer program which can do the necessary processing to carry out the desired operation on the desired object, as symbolized by step 127 in FIG. 1B. Specifically, the table lookup is done using the OID identifying the type of network object on which the operation is to be performed and the operation to be performed in that object and ID of the master hub or slave node having the designated network object therein as the search keys to search the mapping table 34 in FIG. 1A. The function call is linked to a computer program, which when executed, performs all necessary processing to perform the desired operation on the desired object in the designated master hub or slave node, as symbolized by step 129 in FIG. 1C. If the designated object is in a slave node, the processing of step 129 includes all necessary processing to build a subchannel packet corresponding to each management packet. Each subchannel packet has whatever structure is necessary to support whatever subchannel communication protocol is in use, such as routing instructions if the subchannel communication protocol in use is the light weight point-to-point, single thread, store-and-forward protocol defined in more detail below. Where the network object to be operated upon is in a slave node, block 129 also represents the process of sending each subchannel packet out-of-band, over the subchannel on the high speed data network transmission media to the designated object so as to carry out the desired operation on the designated object. Further, if the object is local to the master process such as a routing table CRC object, block 129 symbolizes whatever processing and communication is necessary to carry out the desired operation directly on the local object without any subchannel transmissions.

For example, suppose every port of every hub or node has its own subchannel transceiver and a broadcast subchannel communication protocol is in use. Then, the protocol conversion process is a process to simply use the OID and the identification of the slave in which the desired network object is resident to generate a subchannel packet for broadcast on every port of the master hub and all slaves which has at least the identification of the slave as the destination address and the OID and any related data as the payload (a source address is not needed as all subchannel packets received by a node are assumed to originate at the master hub or switch. Each slave then examines the source addresses in the broadcast subchannel packets it receives on any port for ones that have its ID as the destination address, filters out ones that do not, and performs the desired operation on the designated object encoded in the OID. Any data obtained from the operation is put in an upstream packet having the master process ID as the destination address and the slave ID as the source address and broadcasts it out every port.

The master hub 49 also has the other circuitry and processes depicted by blocks in FIG. 1 present therein. The master hub 49 is connected by the transmission media 68 of a high speed data network to a plurality of slave hubs and other slave nodes, each of which has one or bidirectional data ports like the master hub. Each slave hub or node has at least the subchannel transceiver circuitry and high speed data transceiver circuitry shown inside dashed line 71 and a slave process executing on a programmable computer such as a microprocessor in the slave, the slave process controlling the subchannel transceiver so as to implement subchannel communications.

The function of the proxy agent 18 is to look up the function call of a program in a library of programs such that when the program is executed, the data requested is obtained from the object identified in the management packet or the requested operation is performed on the user specified network object. After looking up the proper function call, the proxy agent makes the function call to invoke the computer program linked to that function call to carry out the desired operation. In some embodiments, the proxy agent process can do all the necessary processing to cause transfer of each management packet to the object which is the target thereof by an out-of-band subchannel transmission. In the preferred embodiment, the proxy agent uses a mapping table 34 which results from compilation of a MIB or other network object definition database to look up the appropriate function call of a software process that is executed by a GUMP master process 21. That function call is then invoked through a call to the application programmatic interface (hereafter API) of a GUMP master process, and the process within the GUMP master process library linked to that function call is executed by the master hub.

The GUMP master process functions as a library of computer programs. Each computer program is capable of building any necessary subchannel packet and carrying out the necessary processing to get the subchannel packet to the specified network object by any out-of-band subchannel communication protocol and carrying out the specified operation. In the case where the specified object is a local object immediately accessible to the master process 21, such as the routing table CRC, the computer programs in the library linked to the local object will carry out the necessary processing to get data from or write data to the local object and return retrieved data or a confirmation that a set operation has been successfully performed.

In the preferred embodiment where a light weight subchannel communication protocol is used, the GUMP master process 21 uses an optional routing table 23 to look up routing instructions for used in building the subchannel packet. The routing table is required for the light weight GUMP communication protocol but not for some other embodiments so it is shown in dashed lines. In the preferred embodiment, the GUMP master process 21 uses foreknowledge of the high speed network topology recorded in routing table 23 to build GUMP packets from the incoming management packets received from the NMS process or management commands received from some other process such as an autonomous management process. The proxy agent passes these management packets to the GUMP master process as an argument to the function call. The GUMP packet includes a routing field with data in it reflecting the current topology. The topology is data in the routing table from which can be directly or indirectly gleaned which ports of each slave or master hub or node are coupled to which ports of other slave or master nodes and what the existing uplink-downlink or parent-child relationships are. The routing data in each GUMP packet output on data path 25 controls the subchannel communication protocol/process 69 to properly switch the multiplexers in the master and slave nodes to get the GUMP packet to its target object. The transmission of the GUMP packet to a target object effectively creates a "wormhole" through all the ports to the target object. To implement the simple, light weight communication protocol of the preferred embodiment, the subchannel communication protocol/processes in the master and each slave control their multiplexers to always listen to the port connected to the parent (the uplink port) until the parent sends a management packet and instructs the child slave to transmit it out a specific downlink port to a child slave and so on through all levels of the hierarchy until the packet reaches the slave having the object to be managed. The multiplexers all along this route or wormhole are left switched to their downlink ports until a reply comes back (this process is synchronous) or timeout occurs.

The foreknowledge of the topology necessary to provide these routing instructions in this subgenus may be provided by configuration data which is supplied by the network administrator or by automatic topology discovery, the latter being the process practiced in the preferred embodiment. Automatic topology discovery has the advantage of eliminating the need for the network administrator to update the configuration data of all the slaves when the topology of the network changes. Automatic topology discovery will be described below.

In other embodiments, the structure of the subchannel packet built by the GUMP master process depends upon the topology of the high speed data network 68 and upon the number of subchannel transceivers 66 available in each hub and node, the number of multiplexers 67 used for each transceiver and the type of communication protocol implemented by the subchannel communication protocol/process 69 in execution on the master hub and the slave nodes. For example, in some embodiments, one subchannel transceiver may be dedicated to each port. In these embodiments, a simple broadcast protocol will work wherein the GUMP master process puts destination and source fields in a subchannel packet along with data which indicates what data is requested or what data is to be written to an object. The subchannel packet can then be broadcast on all downlink ports and the target slave can detect its destination address in the subchannel packet. The destination slave then performs the requested operation and, if data is to be returned, generates an upstream packet addressed to the GUMP master process 21. Other subchannel packet structures appropriate to different subchannel structures will be apparent to those skilled in the art.

In the preferred embodiment, only one subchannel transceiver 66 is used in the master hub and each slave node and a single multiplexer 67 is used to simultaneously switch the transmit and receive ports of this subchannel transceiver between multiple ports. The multiple ports are represented at 73 and 75 by optional media drivers (fiber optic high speed data media require electrical-to-optical conversion drivers, whereas some copper media do not require drivers). Each port is coupled to a high speed data transceiver shown as representative high speed data transceivers 77 and 79.

The subchannel transceiver 66 generates subchannel signals on output 81 and transmits them to the single transmitted signal input of multiplexer 67. The transmitted signal is then switched to one of outputs 83 or 85 depending upon the switch control signal on bus 87 supplied by the subchannel communication process 69. The transmitted signals are mixed by superposition with the high speed data transmissions at summing junctions 89 or 91. The combined signals are transmitted on lines 93 or 95 to the media driver of the active port and launched into the media of the high speed data network.

Upstream reply signals are converted by the media drivers into electrical signals and put on high speed data input lines 97 and 99. The combined high speed data and subchannel signals are tapped off these high speed data input lines and coupled to multiple received signal inputs of multiplexer 67. The selected or active port's combined signal is then switched to line 101 and low pass filtered in filter 103. The output of the filter is coupled to the receive input of the subchannel transceiver 66.

The high speed data network 68 must be one wherein high speed payload data is transmitted over the network media using a DC balanced encoding scheme. Such an encoding scheme is needed to enable subchannel communications. In DC balanced encoding schemes, a portion of the Fourier spectrum of the high speed data has suppressed energy levels at low frequencies. That portions is hereafter called the subchannel portion. The energy levels in the subchannel portion are sufficiently suppressed that management data communications can be successfully sent on signals having their Fourier spectrum located in the subchannel portion so as to share the same transmission media used by the high speed data and eliminate the expense and added complexity of separate data paths to each slave node. Use of subchannel communication also eliminates the need to put the management data into otherwise empty high speed data packets thereby wasting payload data bandwidth.

Figure 2:
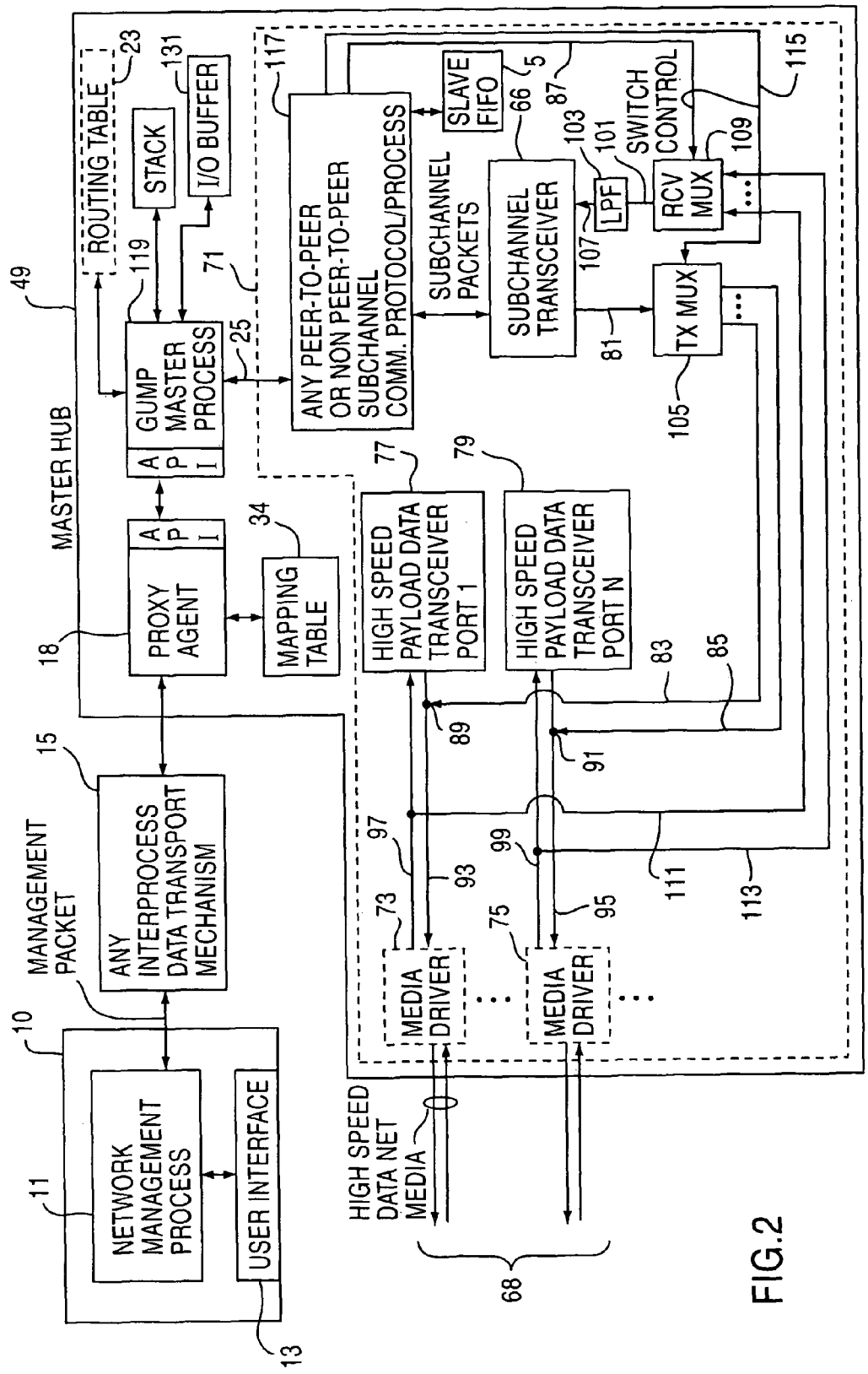
FIG. 2 is a block diagram of a subgenus within the genus of FIG. 1 having separate transmit and receive multiplexers.

Referring to FIG. 2, there is shown a block diagram representing a subgenus of embodiments which is similar to the genus of embodiments shown in FIG. 1, but which uses a single subchannel transceiver with separate transmit and receive multiplexers. All blocks having the same reference numbers as blocks in FIG. 1 have the same structure and function in the combination of FIG. 2 as the like numbered blocks in FIG. 1. In the subgenus of FIG. 2, the transmit output 81 of the subchannel transceiver 66 is coupled to the input of a transmit multiplexer 105. The receive input 107 of the subchannel transceiver is coupled to the output of a low pass filter 103 which has its input coupled to the shared output of a receive multiplexer 109. The transmit multiplexer has its plural outputs, of which lines 83 and 85 are typical, coupled to summing junctions as in the case of the genus represented by FIG. 1. The plural inputs of receive multiplexer 109 are coupled by lines, of which lines 111 and 113 are typical, to tap signal off the high speed data input lines 97 and 99.

The switch control input of the transmit multiplexer 105 is coupled to receive switch control input signals by line 115 to a circuit controlled by the subchannel communication protocol/process 117. The switch control input of the receive multiplexer 109 is coupled to receive switch control input signals from a circuit controlled by subchannel communication protocol process 117. A GUMP master process 119 generates subchannel packets of an appropriate structure to support whatever subchannel communication protocol is implemented by process 117.

The subchannel communication protocol implemented by process 117 will be described in the flowchart of FIG. 11A through 11D after the discussion of the flowchart of FIGS. 6A, 6B, 6C.

Referring to FIG. 3, there is shown a computer network implementing the teachings of the invention in an FCAL environment. A computer 10 has in execution thereon a network management system (hereafter NMS) computer program (not separately shown, but see FIG. 4) as well as a stack of SNMP, UDP/IP and Ethernet processes (not separately shown, but see FIG. 4). Although the NMS process can be any form of network management process and protocol such as RPC, in the preferred embodiment, it is SNMP compatible. This is an advantage because SNMP NMS software is already commercially available as are SNMP agents. If RPC or some other protocol is used, custom software has to be written. The preferred form of SNMP™ NMS process manages the network by issuing get and set commands. The use of SNMP allows a MIB to be written which exposes the management objects in standard fashion thereby allowing the use of standard NMS processes which are modified to use the GUMP protocol and subchannel communication capability and the network routing table CRC notions described below. The NMS process receives an object name or other identifier used in the NMS graphic user interface, a desired operation and an IP addresses as its input from the network manager. Using the MIB's table and/or a GUMP routing table, the NMS looks up the object ID and GUMP ID of the object to be operated upon and incorporates the ID information into a management packet to carry out the desired operation on the object. The network objects exposed to the NMS could also be described in a MIM (for CMIP) or a MIF (for DMI) if other protocols than SNMP are used. For example, if the DMI protocol for network management is used by the NMS process 10, the MIB 12 would be replaced with a MIF.

The SNMP get and set commands contain object identification information therein called OIDs which identifies the particular object in the network from which data is to be obtained or to which data is to be written. The structure and operation of SNMP NMS systems is well known in the art as is the SNMP protocol, and will not be described herein. These get and set commands are encapsulated in Ethernet™ packets and transmitted to a master node hub 16 via an Ethernet data path 22. There is a GUMP root slave 64/66 which is actually circuitry in the same enclosure as the master node circuitry 16 which is executing the GUMP head process 20 and the SNMP proxy agent process 18. The GUMP root slave is comprised of a subchannel point-to-point communication process 64 and subchannel physical layer circuitry 66 which receives GUMP communication packets from process 64 and transmits them on the FCAL media out-of-band from the high speed data. An Intel 8031 microprocessor in the GUMP root and an Intel 8031 microprocessor in each slave carry out the light weight GUMP point-to-point communication protocol message traffic processing. Simultaneously, a Motorola 68EN302 microprocessor in the master hub 16 executes the GUMP head and SNMP proxy agent processing to take care of network management functions. The meaning of light weight point-to-point communication protocol is that the local slave 64 and the other remote slaves such as 26, 28 and 30 do not have to be capable of a peer-to-peer communications. That is, each slave does not have to be able to talk to each other slave in the network. Each slave only includes one transceiver that needs to be able to listen to its uplink port for requests and commands coming down from its parent slave at all times and, when instructed to by a packet from its parent slave, switch to the port coupled to a child slave device to which the packet is to be sent or sent through to another child slave device and transmit the packet to that first child slave device only. Since only one transceiver is needed to do this with a multiplexer which can couple the transceiver to any of the slave's ports, there is no need for a transceiver for every port. This keeps the cost of transceivers down. Further, it eliminates the need for complicated try and back-off and retry algorithms controlling the subchannel communications or other communications on separate media carried out by the transceivers which would be necessary if peer-to-peer communications were to be attempted with less than a transceiver for every port of every slave.

The network to be managed comprises a master node 16 and a plurality of slave nodes of which slaves 26, 28 and 30 are typical. The slave nodes are typically hubs with multiple ports each of which can other hubs or devices connected thereto. The master hub and slave nodes are coupled together via network media such as FCAL fiber or copper conductor media via a plurality of ports. Each slave is shown as having four ports marked by numbers 1 through 4, and the master node is shown as having one port. Each slave can be a hub or a node on the network and must have sufficient computing capability to execute a lightweight point to point communication process. In the preferred embodiment, this lightweight point to point communication protocol is implemented as an out-of-band subchannel over the network media. This out-of-band communication facility will be described in more detail below and is the preferred embodiment. In alternative embodiments, the point to point communications between master and slaves can be implemented using any separate digital data or analog signal paths running between the master and slaves. Although the topology discovery process involves digital data point to point communications, that data can be, by use of modems, transmitted in analog form over other data paths such as phone lines etc.

The master node has to have the computing capability sufficient to execute a proxy agent process 18 and a GUMP head process 20. The master node 16 also has a subchannel communication interface comprised of a subchannel communication process 64 and a subchannel hardware interface circuit 66.

The slave nodes only have to have the computing capability to carry out the simple, lightweight point-to-point communications and do not need any Ethernet interface circuit or Ethernet driver and the slaves also do not need any UDP/IP software layer processes nor any SNMP software layer processes. This saves on wiring expenses by eliminating the need to extend the Ethernet media wiring to the locations of all the slaves, and it saves on license expense since only the proxy agent needs an SNMP license and the slaves do not since they do not carry out any SNMP processing. Further, the use of the light weight point to point communication protocol eliminates the need for every slave node to have an IP address or other enterprise addressing resource such as IPX or FCAL address.

The function of the proxy agent 18 is to receive the Ethernet packets, strip out the get and set commands, do a table lookup using the OIDs in the get and set commands to find an appropriate function call to use to invoke a function to carry out the get or set for that OID, and invoke the function linked to the function call. When data or status information is returned, the proxy agent encapsulates that information in an SNMP (or some other protocol) packet and then encapsulates the SNMP packet in an Ethernet packet addressed to the NMS process and transmits the Ethernet packet to the NMS process. The functions to handle the get and set commands are invoked by making the function calls mapped to the particular OIDs where the function calls are invoked through an application programmatic interface or API implemented by the GUMP head library or process.

The function of the GUMP head process is, among other things, to do unilateral topology discovery of the topology of the network, store the topology data in a compact table form and to encode the contents of the table in a compact form as a CRC value. The GUMP head also presents the API to the proxy agent and stores and executes the functions mapped to each OID. The structure and operation of the GUMP head process will be made more clear later herein when the details of its function in the preferred embodiment is described. The basic structure of the GUMP head process is as a library of function calls that are linked to object IDs or OIDs stored in a table mapping OIDs of objects in the network available to be managed to the function calls that invoke routines which, when executed by the GUMP head carry out network management commands and information requests issued by the NMS process.

A MIB or management information base 12 in the form of a table mapping OIDs to function calls is available for access to the NMS software via bidirectional data path 14 and to the proxy agent via bidirectional data path 32. The MIB 12 really is the result of a compilation of a program written in special MIB SNMP syntax which describes every object in the network which is available to be managed and the syntax to use in obtaining data from and writing data to each such object and the format for data obtained from that object or to be written to that object. When the MIB is compiled, the result is a series of stub code routines or extensions of the agent 18 which are mapped to each OID and which, when executed, invoke a function or computer program in the library of the GUMP head which is written specifically to carry out the get or set command with that specific object identified in the OID of the SNMP get or set.

Basically, the SNMP get and set protocol is a higher layer of abstraction which is old. It is the MIB description and the code generated by compiling the MIB to invoke specific functions or computer programs and the functions written to carry out the gets and sets on specific objects and the tables mapping OIDs to specific function calls that convert the prior art SNMP NMS and SNMP agent into tools useful to manage a specific network. The extensions convert the SNMP agent into a proxy agent. That is, the extensions convert the SNMP OIDs in the SNMP gets and sets into GUMP IDs which are specific to the network being managed. The GUMP IDs are also specific to the lightweight point to point communication protocol implemented by the GUMP head and the out of band communication mechanism which shares the same media as the FCAL communications. This latter out of band communication mechanism which shares the same media as the FCAL communications will be subsequently referred to herein as the subchannel. One of the functions of the GUMP head process 20 is to receive an object ID from the proxy agent process 18 and translate that to a specific device or register and invoke the program written to carry out gets and/or sets to that specific device and then make a call to the subchannel layer to carry out the appropriate communication with that device.

A more detailed view of the software architecture of a system according to the teachings of the invention is shown in FIG. 4. The process carried out by the apparatus of FIG. 4 is depicted in the flow chart comprised of FIGS. 9A through 9C. A computer 10 runs a custom NMS process 11 and a protocol stack of SNMP, UDP/IP and Ethernet processes, represented by boxes 40 and 44. The SNMP protocol stack is integrated into the NMS process.

The NMS process 11 displays all the network objects that are available to be managed, as defined in the MIB 12, on a graphic display of the topology. The network manager selects an object, and issues requests for data, called gets or commands to set the value of a network object, called sets, to the NMS process 10, via data path 32 representing keyboard and/or mouse operations, as symbolized by block 20 in FIG. 9A.

The NMS system converts each request into an SNMP compatible management packet with get or set primitives, and one or more OID which identifies the type or class of the objects as column identifiers in a routing table. The management packet also includes the slave ID of the slave that has the network object in it. This slave ID is called the GUMP ID in the preferred embodiment, and is used by the proxy agent as an index into the routing table, i.e., the row number to read in the column defined by the OID to determine the exact network object to be acted upon.

The preferred embodiment of NMS requests the most current value of the routing table CRC automatically with every get request to another object. With every set, the preferred NMS automatically attempts to set the value of the routing table CRC using a locally stored CRC value represents the then current understanding of the NMS of the current topology. These processing steps are represented by block 202 of FIG. 9A. See FIGS. 8A and 8B for the operations of the NMS using the CRC of the routing table to make sure the NMS database of the network topology is up to date. It is the NMS process 11 which provides a user interface, preferably a graphic user interface, for a network administrator to use in managing the network. In the preferred embodiment, the NMS process 11 draws a graphic depiction of the network to be managed and is custom written by the assignee of the present invention.

Although the NMS system can use network management protocols other than SNMP, SNMP is preferred. The NMS uses its own local database of topology information, represented by block 7, to look up the object IDs and slave IDs for inclusion in its management packets. The compilation process is only done once and is not an ongoing process, but to clarify the relationship between the MIB 12 and the table 34, the compilation process is represented by block 36. The compilation process compiles the custom code of the MIB which defines all the objects to be exposed to the NMS process into a table which maps each object to an OID and a function call. When that function call is executed, the get or set command to that OID is carried out.

The get or set commands or other network management commands if other than SNMP is being used are output as packets on data path 38 to a UDP layer process 39. The function of the UDP layer software is to encapsulate the SNMP or other management packet into a UDP datagram and put a management type code into the UDP datagram header, as symbolized by block 204 on FIG. 9A. There is more than one type of UDP datagram, and each has a specific type field in its header. It is this type field that defines the port or channel which processes at the destination can listen to in order to receive only datagrams of interest to them and reject all other. In other words, the UDP type field is the field which causes the UDP datagram to be routed at the destination to the correct process which understands its and wants the information contained therein. In this case, the UDP type field added by process 39 identifies the particular port or channel devoted to management packets so as to cause the datagram to get routed to the proxy agent 18.

The datagrams output by the UDP layer process 39 are transmitted on data path 41 to a UDP/IP layer process 40. More precisely, the process 40 is an IP layer process which determines that the incoming packet is a UDP protocol packet and processes the packet in accordance with that protocol. The UDP/IP layer process 40 functions to encapsulate the UDP datagram into an IP packet and adds a particular IP address to the header which specifies the particular system to which the packet is addressed, as symbolized by block 206 in FIG. 9A. In some embodiments, the management packet may be transmitted over wide area networks such as the internet and one or more local area networks before it gets to the system to which it is directed. The IP address is used by routers to get the IP packet through the appropriate segments of the wide area network to the appropriate local area network and, in conjunction with the Ethernet or other local area network address added by the Ethernet interface driver 44, through the appropriate segments of the local area network until the IP packet gets to the correct hub or node system on the local area network which is executing the proxy agent. The UDP/IP layer process 40 also adds IP layer CRC bits.

The UDP/IP layer process outputs IP packets on data path 42 to an Ethernet layer driver process 44. The function of the Ethernet layer process is to encapsulate the IP packets into Ethernet packets and add the Ethernet address of the Ethernet interface card of the master hub or master node computer 16 in which the proxy agent 18 and GUMP head process 20 are executing, as symbolized by block 208 on FIG. 9A. The Ethernet address guides the Ethernet packet through the local area network to the correct hub or node. The Ethernet layer process also adds Ethernet packet CRC bits. The Ethernet packets are output to an Ethernet interface circuit 46 which couples the computer 8 upon which the NMS process is executing to the Ethernet media 22.

Of course, in alternative embodiments, other forms of communication of the SNMP or other management packets to the proxy agent can be used. If networks are used, any type of local area network and/or wide area network can be used to transmit the management packets to the system running the proxy agent. In fact, local and/or wide area networks are not required to practice the invention although they are convenient in some applications. Indeed, any form of interprocess communication of data can be used to get the management requests for data and commands from the NMS process 11 to the proxy agent 18. The proxy agent and GUMP head and local slave processes may be executing on the same computer as the NMS management process. In such a case, interprocess data transfer mechanism such as shared address space or any other interprocess communication data path may be used to transfer SNMP or other management packets to the proxy agent. For example, a serial bus may connect a computer running the NMS process to another computer running the proxy agent process and a SLIP (serial link internet protocol) protocol can be used for the transfers between the NMS process and the proxy agent process. The number and type of processes running between the NMS process and the proxy agent process and involved in transfer of data therebetween therefore will depend upon the configuration of the system and where the NMS and proxy agent processes are running relative to each other and will depend upon the types of data paths between these processes.

Figure 9A:
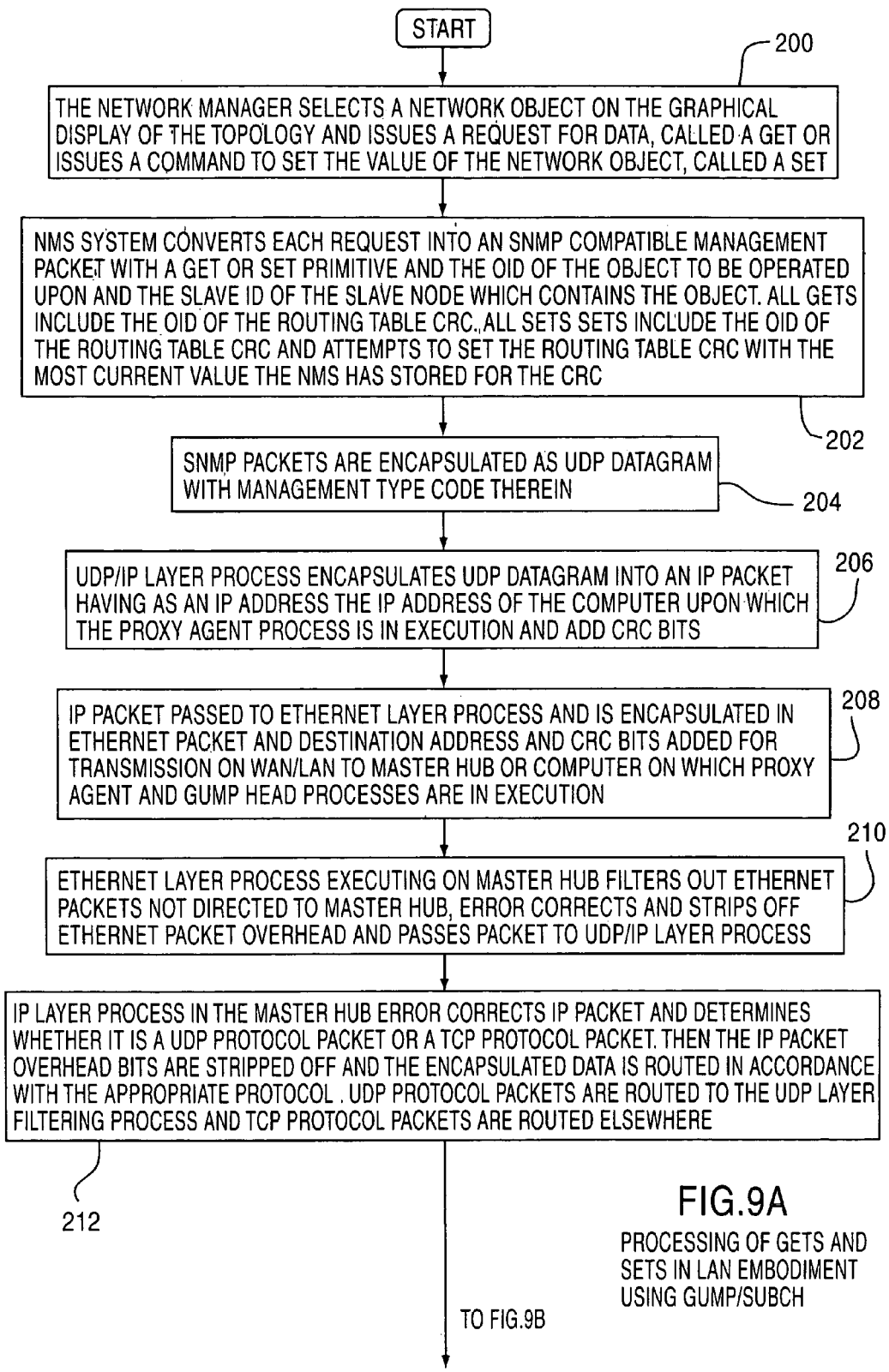

The Ethernet packets addressed to the Ethernet physical interface circuit 50 coupling the master hub 48 are filtered out by their destination address, error corrected and stripped of their Ethernet overhead bits, as symbolized by block 210 in FIG. 9A. Master hub reference number 48 is used to distinguish it from master hub 16 in FIG. 3 and master hub 49 in FIGS. 1A and 2, each of which may be programmed to implement different subchannel communication protocols and have different numbers of subchannel transceivers or different numbers of subchannel transceiver multiplexers.

The Ethernet layer process then passes the resulting IP packet to an IP layer process 54. The IP process 54 examines incoming IP packets to determine whether they are TCP or UDP protocol packets and error corrects the IP packet. The IP layer process then strips off the IP header information and routes the encapsulated data in accordance with the appropriate protocol, as symbolized by block 212 in FIG. 9A. UDP protocol IP packets have the encapsulated UDP datagram transferred to a UDP port process 56 but TCP protocol packets never make it to the UDP port process.

Figure 9B:
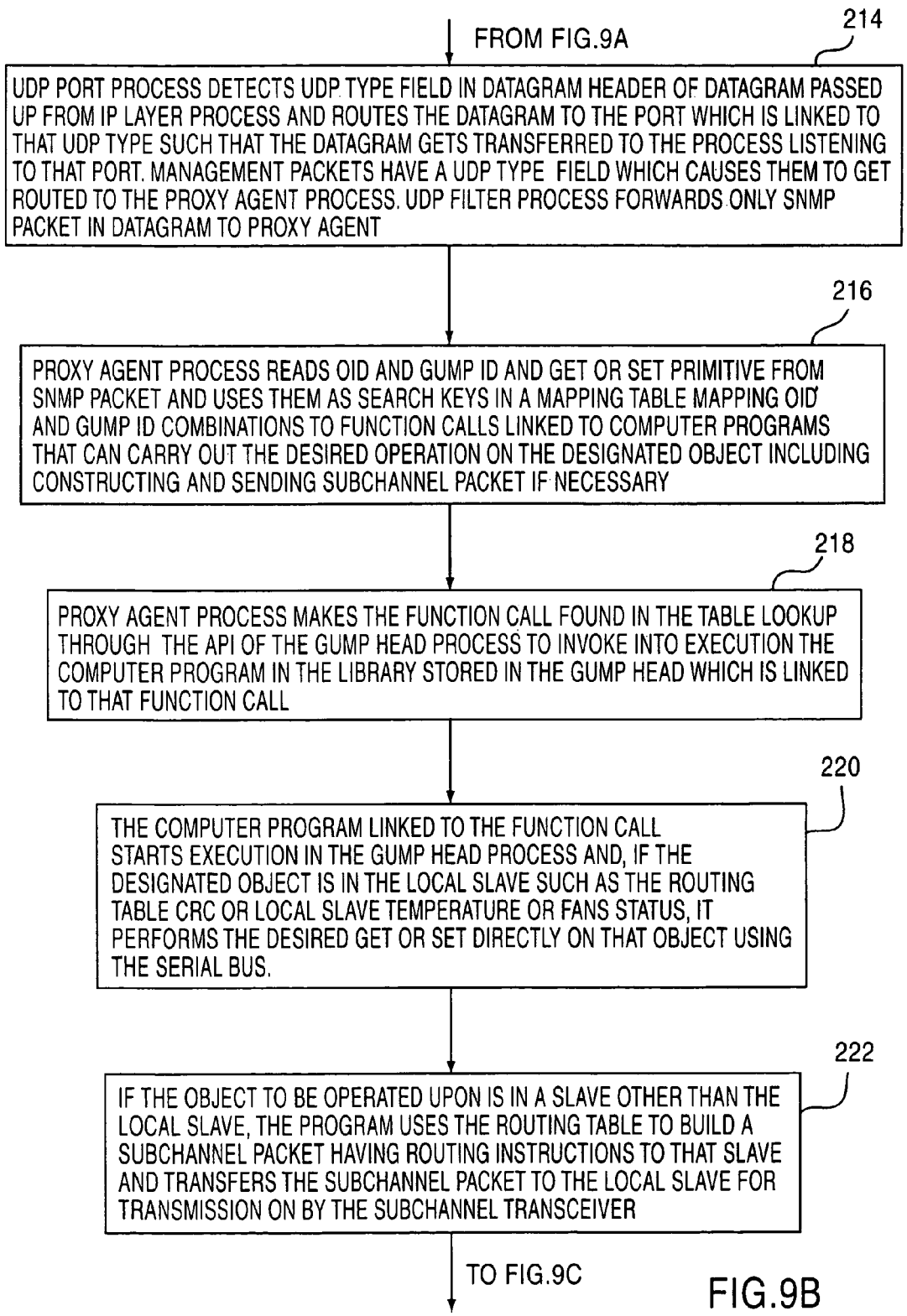

The function of the UDP port process is to detect the UDP type field in the datagram header and route the datagram to the proper port assigned to that type, as symbolized by block 214 in FIG. 9B. The master hub 48 has various processes in execution on it that are bound to, i.e., listening to specific UDP ports. One of these processes is the proxy agent 18. Processes interested in datagrams of only a specific type listen only to the port assigned to that type so that they do not get flooded with datagrams of unwanted types. The processes bind to the UDP ports by notifying the operating system (not shown) of the master node 48 that they want to receive messages directed to a specific port. When the UDP port receives a UDP datagram, it notifies the operating system of the UDP type and transfers the UDP datagram to the appropriate process that has bound itself to that port type by whatever mechanism the operating system uses to effect such transfers. All datagrams having a type field indicating they do not have anything to do with network management get routed by the UDP port process 56 to whatever other process (not shown) executing on the master node computer or hub 16 to which those packets are directed. Any IP packet which contains a network management command get routed to the proxy agent process 18 via data path 58.

Standard SNMP compatible agent processes can be used to implement the proxy agent 18. Standard commercially available SNMP agent programs are designed to work with a MIB written in a standard syntax. The agents have protocol stubs therein which are generic before compilation and call for a particular object defined by the MIB. During compilation, these protocol stubs get converted into skeleton function calls which are specific to the functions mapped to the OIDs of specific objects defined in the MIB. In other words, an incoming SNMP packet giving a particular OID will cause the proxy agent to look up that object ID and execute the skeleton function call identified in table 34.

The function of the proxy agent 18 is to communicate with the slave nodes indirectly through the GUMP head process 20, or directly in some alternative embodiments. This is done by the proxy agent reading the OID and the GUMP ID and the get or set primitive from the incoming SNMP packet and using it as a search key for a table lookup in table 34, as symbolized by data path 60, and block 216 in FIG. 9A. This lookup process returns the proper function call to invoke a function or process stored in the GUMP head library which is specially written to carry out the desired get or set operation with the object identified in the OID taking into account the specifics of that object such as data type, GUMP ID etc., including, if necessary construction of a subchannel packet having routing instructions to that particular GUMP ID device and any necessary data and including transmission of the subchannel packet over the subchannel, also as symbolized by block 216.

The proxy agent then makes the function call through an API 62 into the GUMP head process/library 20. In the preferred embodiment, the proxy agent process is a commercially available agent process available from ISI or any other commercially available agent process which has been converted to a proxy agent by the way in which the MIB was written.

The GUMP ID of the object is the specific current identification of the slave hub or node which contains the network object in the class defined by the OID. The OID defines a column in the routing table of FIG. 5, while the GUMP ID is used as an index into that table and indicates the row corresponding to the slave device that contains the network object to be operated upon. The GUMP ID gets appended to the OID in some embodiments and is a separate field in the management packet in other embodiments.

Upon receiving the function call, the GUMP head process executes a C code routine in its library which is linked through the API 62 to the function call executed by the skeleton function call routine executed by the proxy agent as a result of the table lookup in response to the incoming SNMP packet. The GUMP head library contains one of these C code routines for every function call in table 34.

The MIB was written to expose the network objects in such a way that when it is compiled, it causes the table 34 of OIDs to function call mappings to be created and C source code stubs for the GUMP head library to be created. The source code stubs are called extensions. The combination of the proxy agent and GUMP head processes converts the SNMP get and set OIDs for specific objects into specific GUMP type subchannel packets directed to specific objects identified in the management packet for transmission over the subchannel circuitry if necessary and transfers the subchannel packet to the local slave via the serial bus 102 in FIG. 3 for transmission on the subchannel by the subchannel transceiver of the local slave. Sometimes the get or set is directed to an object in the local slave or kept by the GUMP head process such as the routing table CRC or local slave temperature. In such a case, the invoked program does whatever processing is necessary to access the local object such as communication over the serial bus 102. In the preferred embodiment every get or set to any object is accompanied by a corresponding get or set to the local routing CRC object, so each program does both local processing as well as subchannel packet building and transmission if necessary. These processing steps are represented by blocks 220 and 222 in FIG. 9B. A typical subchannel packet with routing instructions is shown in FIG. 7. The routing instructions are a string of bytes representing decimal numbers corresponding to the downlink port number to use at every level of the hierarchy to get to the target slave. A pointer field tells the slave at each level which byte to used to control its multiplexer to switch from the uplink port to the correct downlink port. To build a subchannel packet, the program in the GUMP head process uses the routing table to build routing instructions which include a byte for every level in the hierarchy which tells the slave process at that level how to switch its multiplexer from the uplink port to the correct downlink port to send the subchannel packet on the correct branch of the network tree to get it to the target slave. The GUMP head process also adds a pointer field which is incremented by each relay slave before transmission so that the pointer points to the routing byte the receiving slave should use to control its multiplexer. The subchannel packet is then transmitted via all the subchannel transceivers in the chain to the target slave. The process of building and transmitting the subchannel packet is represented by block 224 in FIG. 9C.

The GUMP IDs change with changing topology, and the NMS software then updates its listing of GUMP IDs. Changes in topology are automatically detected by a process to be described below. The topology is recorded in a routing table such as is shown in FIG. 5, and is encoded in a compact fashion by computing a CRC on the routing table. This CRC is a network object that can be accessed by the NMS process 10. The NMS process 10 is programmed to maintain a record of the CRC of the routing table. The NMS process 10 is also programmed to request the current CRC object prior to issuing any SNMP command. The current CRC which is returned is compared to the CRC held by the NMS process, and if it is different, the NMS process knows the topology has changed and it needs to update its routing table or list of GUMP IDs. The NMS process then requests the current routing table or list of GUMP IDs to be sent to it by the proxy agent. The NMS process then updates its understanding of the topology and then issues the network management command.

In the preferred embodiment, the NMS is programmed to attempt to set the network topology CRC (the CRC calculated on the routing table) before issuing any SNMP or other network management protocol set command. The CRC set operation causes the GUMP head process to compare the value of the CRC sent to it by the NMS process to the current value of the network topology CRC. If the GUMP head process detects a mismatch between the incoming CRC and the current network topology CRC, the GUMP process blocks the subsequent set operation so as to prevent the NMS process from carrying out an invalid set operation and possibly impairing the operability of the network. This processing to verify correct topology information in the NMS for gets and sets is represented by block 226 in FIG. 9C. In alternative embodiments, every time the routing table CRC changes, a trap is sent to the NMS which then updates its topology information and redraws the display.

The GUMP packets that SNMP packets are converted into by the combination of the proxy agent and the GUMP head process have headers that include addresses and routing instructions. These addresses and routing instructions are established according to the then current topology of the network.

The stub routine invoked by the function call causes a call to a subchannel communication process 64. The function call to the subchannel communication process includes the GUMP ID of the object in the network to which point-to-point communication is to be had. The function call to the GUMP head process causes a GUMP synchronous, point-to-point, single-thread, store-and-forward, subchannel communication protocol for out-of-band communication with the slave having the object identified by the original management packet to be executed by a combination of the GUMP head process, all the slave processes and the slave subchannel transceivers. The GUMP head process then sends the GUMP packet to the subchannel physical layer circuitry 66 which interfaces the computer or hub 16 to the FCAL or other network media 68 for transmission. The routing instruction in the GUMP packet basically cause each subchannel transceiver in the hierarchy to switch from the uplink port to the designated downlink port when the packet is relayed. The slave processes at every level of the hierarchy cause the multiplexers to stay switched to that downlink port until a reply is received from the downstream target slave or a timeout occurs. This is the meaning of opening up a wormhole through the hierarchy and is also the meaning of "single-thread". Only one slave device is talked to at any particular time. Every slave is supposed to respond within a certain time, and that is why the subchannel communication protocol is called synchronous.

The main genus of the invention is useful in managing any type of network using a form of DC-balanced, high speed data encoding which suppresses energy content in a lower frequency subchannel portion of the Fourier spectrum such that subchannel communications of management and control data can be made in this subchannel portion.

The alternative genus of the invention that does not use subchannel communication to share the same media as the high speed data but which uses automatic topology discovery and separate data paths for the management and control data is useful in any type of network to lower the cost by the use of proxy agents to avoid the need for an SNMP license and SNMP/UDP/TCP-IP/Ethernet stack at every slave wherein the proxy agent uses a light weight point-to-point communication protocol that needs only one transceiver per slave that is multiplexed between all the slave ports.

The function of the subchannel physical layer transceiver 66 is to receive the GUMP packet and transmit it out-of-band in a frequency band on the network media which does not contain much energy from the spectrum of the high speed FCAL data transmitted on the same media by circuitry which is not shown. Out-of-band means that the GUMP packet data is not encapsulated in any packet of the high speed data. This is an advantage because the high speed data packets are very large and the management and control data is very small so waste of bandwidth by not fully using all bit positions of high speed data packets carrying management and control data is avoided. Also, there are no known processes to look into every high speed data packet for management and control data, so the expense of designing such a process is avoided. Further, to subject every high speed data packet to such a search process would create a bottleneck and delays in the system.

The out-of-band GUMP packet is received by all the subchannel receivers of all the slaves, of which transceiver 70 is typical. The GUMP packet is then passed to the GUMP root process (also sometimes referred to herein as the slave process) on every slave hub, of which GUMP slave process 72 is typical. The GUMP slave process in all the slaves except the slave to which the packet is directed forwards the packet by switching the subchannel transceiver to the designated downlink port, increments the pointer and does nothing further until a reply is received or a timeout occurs. The GUMP slave process of the slave to which the packet is directed determines that the packet is directed to it and carries out the desired operation on the object therein which is identified by the OID in the packet.

If the management packet is a get operation requesting data from the OID identified therein, the requested data is read by the GUMP slave process 72 in the slave and sent to the subchannel transceiver 70. The communication process then reverses itself to send the data all the way back to the NMS process 10. The upstream packet needs no routing instructions in the preferred subchannel communication process, because each slave in the chain simply keeps its multiplexer on the downlink port until a reply is received. As soon as the upstream reply packet arrives, the slave switches its multiplexer to its uplink port and relays the packet. This happens all the way up the chain until the packet reaches the GUMP head process, as symbolized by block 228.

The GUMP head process 20 includes a process to receive reply or acknowledgement packets from the target slave and transmit them by any interprocess data path to the proxy agent process 18. The data is then encapsulated in an SNMP packet in the proxy agent, encapsulated in an IP packet in the UDP/IP process 54 and encapsulated in an Ethernet packet in Ethernet layer process 52 and sent across the Ethernet media. The various layers of encapsulation are reversed in the Ethernet/IP/SNMP stack of processes on computer 8 until the SNMP packet is finally transmitted to the NMS process via data path 38. All this processing is represented by block 230 of FIG. 9C.

GUMP Automatic Topology Discovery Process

The GUMP head process 20 carries out a topology self discovery process at each power up and from time to time thereafter. In the preferred embodiment, the GUMP head process "time division multiplexes" itself between servicing get and set requests and doing topology discovery (actually done by calls at different times to different subroutines in a main loop to do automatic topology discovery and NMS request processing). In some embodiments, an automatic topology discovery process is carried out whenever a topology change is detected and the routing table is rebuilt from scratch. In some alternative embodiments, the routing table is manually written by the network administrator when the network is wired and rewritten whenever a change in the topology is made.

Knowledge of the topology of the network and arrangement of the nodes of the network into a hierarchically arranged set of parent-child relationships greatly simplifies the communication protocol that is implemented by the GUMP head process and the slave nodes in the preferred embodiment. Use of the simple subchannel communication protocol enables the use of a single subchannel transceiver in every slave with a single multiplexer in the preferred embodiment thereby reducing hardware costs for every node.

The object of the automatic topology discovery process is to build the routing table shown in FIG. 5 (or the end objective of the manual building of the routing table in some embodiments). The first column 101 in this routing table contains the GUMP ID/OID of the GUMP head process each slave in the network. The GUMP IDs in column 101 correspond to the IDs shown for the slaves and GUMP head process shown in FIG. 3. The GUMP head process has ID 0, and the local slave has ID 1. The remaining slaves have IDs 2, 3 and 4, respectively. The second column 103 contains the ID of the parent slave of the device identified in column 101 of the same row. Thus, the parent of local slave ID 1 is the GUMP head process ID 0, and the parent of slave ID 3 is slave ID 1, etc. Column 109 contains the parent downlink port number, i.e., the number of the downlink port on the parent which is coupled to the device identified in column 101. Thus, the port number of the parent ID 1 which is the downlink to slave ID 3 is port number 4. The next column, 107 contains the uplink port number for the slave identified in column 101. This is the number of the port on each slave which is coupled to the parent out which upstream messages are to be transmitted. The four columns 101, 103, 109 and 107 completely define the topology of the network. The routing table may contain other items of information as well, but the other information is not essential to defining the topology.

In alternative embodiments, the number of columns in the routing table can be extended to include more entries such that topologies other than hierarchical topologies defined by parent-child relationships can be recorded by data in the table.

The routing table of FIG. 5 is stored by the GUMP head process in the master node 20, and a CRC value is calculated on the data therein to act as a compact representation of the topology for purposes of detecting a change. This CRC value is calculated by the GUMP head and is stored as a network object which the NMS process can request by a get or can attempt to set the value of by a set command.

The automatic topology process involves sending a probe packet to each slave and waiting for a reply to determine if the slave is still there. The probe packet also requests the slave to report if there are any other devices connected to any of its ports. If the reply from any slave indicates there are devices coupled to any of its ports, the particular ports to which there are devices coupled are reported in the reply. The GUMP head process then sends probe packets out to the devices connected to the ports of all slaves that reported other devices connected to them. The probe packets ask the same questions of the devices connected to the slave ports, i.e., do you have any other devices connected to your ports, and, if so, to which ports are they connected? This probing process continues until all devices on all branches are located. The topology is then recorded in a topology or routing table and a CRC of the table is calculated and stored.

Referring to FIGS. 6A through 6C, there is shown a flowchart of the preferred process for automatic topology discovery. Step 100 is the process carried out by the GUMP head process during initialization of repetitively transmitting Hello packets or messages on serial bus 102 in FIG. 3 (or all downlink ports if there are more than one). The local slave 64/66 in FIG. 3, has a plurality of high speed media ports marked 1, 2, 3 and 4 and a single bidirectional serial communication port 104 coupled to the GUMP head process by a serial bus 102 that is dedicated to management data only. One or all of these high speed data ports can be connected by high speed media such as FCAL copper or fiber optic media links to other slaves or devices. The other slaves each have one or more high speed data ports by which they receive both high speed data transmissions and subchannel transmissions. In the preferred embodiment, each slave has a single subchannel transceiver that has a transmit output and a receive input. In the preferred embodiment, the transmitter output and the receiver input are ganged together and are switched between the various ports by a multiplexer the switching of which is controlled by the slave process, of which slave process 72 in FIG. 4 is typical. In the preferred embodiment, each slave's subchannel transceiver can transmit and receive only on one port at a time, with the port selection being controlled by the multiplexer. In alternative embodiments, each port can have its own dedicated subchannel transceiver. In another alternative embodiment, a single transceiver is used with its transmit and receive ports being separately controlled by separate multiplexers such that the transceiver can be simultaneously receiving on one port and transmitting on another port.

The initialization process is a top down chain reaction that involves each slave including the local slave listening on each of its ports for a Hello packet saying essentially, "I am your parent and your uplink to the GUMP head process, and here is my ID number". There is no actual need in the preferred embodiment for each slave node to know the ID of its parent since all it needs to know to communicate with its parent in embodiments where a single transceiver for the subchannel is shared between all ports is the uplink port number. Only the GUMP head process needs to know the parent ID of each node for the topology information in the routing table. Thus, in the preferred embodiment, the hello messages do not need to include the parent ID number. In some embodiments, each hello message also includes the downlink port number from which the parent transmitted the hello message. The process starts with all slaves including the local slaves entering their initialization modes symbolized by step 102 and repetitively listening on each port. Simultaneously, the GUMP head process entering its initialization mode represented by block 100. The GUMP head initialization mode is to transmit Hello packets repetitively on serial bus 102 in FIG. 3 to local slave 64/66. The local slave process 64 in FIG. 4 will eventually command the local slave multiplexer (not shown) to switch the port of transceiver 66 to listen to the serial bus port 104 coupled to a serial bus 102. The Hello packets being repetitively transmitted on the serial bus 102 will be heard, and the local slave will then set its configuration data to establish that its uplink port to its parent is the serial bus interface port 104, as symbolized by block 111 and record what its parent's ID number is (the ID of the master node 20), and then the local slave node sends back a confirmation message to the master node 20 in FIG. 3.

In each slave node that received a hello message, the local slave process starts transmitting Hello packets downstream, i.e., out every other port but the uplink port, as symbolized by block 106. This process is started only after the slave has located its parent, knows its parent's ID number and its uplink port number to monitor for GUMP packets from the parent. These Hello packets essentially say, "I am your parent, here is my ID number, and use the port you received this packet on for upstream transmissions to the GUMP head process through me."

Each other slave that has one of its ports coupled to the local slave by the high speed data media is repetitively listening to each of its ports for Hello packets. When a Hello packet is heard from the local slave on a port, the slave which heard it records that port number as its uplink port from its parent, records its parent ID number and transmits back a confirmation message including at least its ID, and, preferably, its uplink port number, one or both of which are recorded in a register of the parent device. This process is represented by block 108. Thereafter, the slave will continually monitor that uplink port for requests and commands from the parent.

This hierarchical parent-child network structure simplifies the communication protocol since the slaves do not need complicated peer-to-peer communication algorithms and can simply wait for a request or command in the form of a GUMP packet from the GUMP head process arriving at one known uplink port and then either act on it if the object of the operation is in that slave or pass it on per the routing data in the GUMP packet. This enables use of a single subchannel transceiver with multiplexers coupling its inputs and outputs to the various ports and a simple light weight communication process 72 (see FIG. 4) on each slave. Because each slave knows that packets to it or packets passing through it to other slaves will always arrive from the parent, the slave process 72 can control the multiplexer with a simple protocol that says listen for incoming GUMP management packets on only the port that is coupled to the parent slave. Likewise, every slave knows that if a GUMP packet is only passing through it to another slave, that GUMP packet with have routing instructions in the form of a separate routing field in the GUMP packet header for each level in the hierarchy. If the slave is at the second level of the hierarchy, the slave process 72 will know that there is a routing field in the GUMP packet header that applies to it and instructs it as to which port to use in transmitting the packet to another slave. This routing field is used to control the multiplexer of the subchannel transceiver 70 to switch to the appropriate port. These simple rules of communication greatly simplify the point-to-point communication protocol that is implemented by the slave communication processes such as process 72 in FIG. 4.

The slaves in the preferred embodiment can be very simple and have no knowledge of the overall network topology other than which port is their uplink port and which ports are coupled to their child slaves, if any.

After the GUMP head process has received confirmation that at least one of its children has discovered the GUMP head process as its parent, the GUMP head process begins building the routing table. To do this, the GUMP head process polls the local slave process 64 or, if there is no local slave process, polls each of its child slaves to determine if any of them have discovered any child slaves of their own, and also requests the child's uplink port number, all as symbolized by block 110 on FIG. 6B. The slave processes, like the GUMP head process record in a register or other memory the port numbers upon which they transmitted Hello packets that received replies indicating that port is connected to a child slave unit and also record their port number upon which they received a Hello packet from their parent. In some embodiments, each confirmation message sent by a child slave node includes the child slave nodes uplink port number and this uplink port number is recorded in the parent slave node which receives the confirmation message for supplying to the master node upon being polled for recording in the routing table.

Any child of the GUMP head 20 replies to the request for its uplink port number by sending its uplink port number on which it received a Hello packet from its parent. This is symbolized by block 112 on FIG. 6B. In the preferred embodiment, the child slave receives separate query packets requesting three items of information. The first query packet requests that the child send back its uplink port number. The next query inquires whether the child has discovered any children of its own and invokes an upstream packet replying either Yes or No. The third query is sent in response to a Yes response to the second query, and requests the child slave to send the contents of its register storing its downlink port numbers for ports which are coupled to grandchildren slaves. In alternative embodiments, any query packet structure and process that results in these three items of information getting to the GUMP head 20 from each slave which has discovered children will suffice.

As an example of one method of operating, suppose local slave ID 1 has not yet discovered its two child slaves ID 2 and ID 3 in FIG. 3. It then receives a single query from the GUMP head process requesting its uplink port number and inquiring if it has discovered any children of its own. It replies with its uplink port number of 5 and replies to the query regarding if it has discovered a child of its own by replying "No". At this point, the GUMP head 20 has enough information to fill in columns 101, 103, 109 and 107 of the routing table of FIG. 5. This is because the GUMP head knows that it has received a reply from ID 1 giving port 5 as the uplink port number for ID 1 so it can fill in columns 101 and 107 of row 109 of the routing table of FIG. 5 with a 1 and a 5, respectively. The GUMP head 20 also knows that it is the parent of ID 1 and that local slave. ID 1 is coupled to port number 1 of the GUMP head 20 since it only has one port in this embodiment. This data is used to fill in columns 103 and 109, respectively, of row 109.

In embodiments where the GUMP head process drives a transceiver with multiple ports which are coupled to multiple children, the GUMP head 20 broadcasts Hellos out from all the ports and records the port numbers upon which replies were received and then polls all its children and all their children and so on, one at a time in the manner described herein, until the topology of the entire hierarchy is determined. The reply to the request for the uplink port number of the local slave therefore completes row 109 of the routing table.

As symbolized by block 114 on FIG. 6B, the GUMP head 20 repeats the query to any child or children slaves that reply that they have not yet discovered children from time to time to ask if they have discovered any new children.

When one of the GUMP head's child slaves replies that it has discovered one or more child slaves, i.e., grandchild slave devices of the GUMP head, the GUMP head then reads the register of the child that replied to determine the downlink port numbers to use in routing packets to the grandchild slaves discovered by the child slave. The GUMP head 20 uses the downlink port number contents of the child's register for use in building a query packet for each grandchild slave device so revealed, as also symbolized by block 112. A query packet to grandchild slave ID 3 is shown in FIG. 7 and will be explained below. The query packet addressed to each grandchild slave is then sent to the child device that is the parent of that grandchild for routing to the grandchild slave, as symbolized by block 114. The query packet requests the grandchild slave's uplink port number and inquires if the grandchild slave has discovered any children of its own.

In general, query of grandchild slaves is accomplished by building a query packet using the downlink ports numbers of the downlink ports of the child slaves that are connected to the grandchild slaves. These downlink port numbers are supplied by the child slaves in response to the query from the GUMP head process after the grandchild slaves were discovered. The query packet has routing instructions in it like a typical GUMP management packet that instruct the child slaves which ports to use in routing the query packet to the grandchild slaves.

For example, suppose local slave ID 1 in FIG. 3 has discovered its two child slaves ID 2 and ID 3 and has recorded that ID 2 is coupled to its downlink port 1 and ID 3 is coupled to its downlink port 4. The register in the local slave will then record ports 1 and 4 as its downlink ports having valid child slaves coupled to them. The GUMP head process 20 will upload these two downlink port numbers for local slave ID 1 when the local slave replies to a query from the GUMP head that it has located two children.

Now suppose the GUMP head 20 wants to query the grandchild slave ID 3 coupled to downlink port number 4 of the local slave. FIG. 7 shows the structure of typical query packet including routing fields from the GUMP head 20 to the grandchild slave ID 3. In this case, the routing instructions are a single jump from the hierarchical level of the local slave to the hierarchical level of slave ID 3. That routing instruction is included in field 115 as 0.1.4 meaning the packet is sent out port 1 of the GUMP head 20 and out port 4 of the local slave ID 1 to get it to grandchild slave ID 3. A pointer field 117 is used to indicate which byte in the routing field 2 the slave at each hierarchical level is to use in controlling its multiplexer when switching from receiving data from its uplink port to sending data on a downlink port. The pointer is originally set to point to, the byte of the routing field that encodes 0.1 to control the transmission from the GUMP head 20 and is then incremented so that it points to the byte of the routing field that encodes 0.4 before sending the GUMP packet to the local slave ID 1. The local slave process looks at the routing instruction of 0.4 and controls its multiplexer to switch to port 4 and puts the packet into the input pipeline of its subchannel transmitter.

In the simple, light weight communication protocol implemented by the GUMP head process and the slave processes, all communications are synchronous, single-string, point-to-point, in a store-and-forward mode and only one subchannel transceiver is used by the local slave and all other slaves. In the claims, the subchannel communication protocol described in the following two paragraphs is referred to as a synchronous, single-string, point-to-point, store and forward protocol using packets having routing instructions contained therein. Each slave has a single multiplexer to couple both the transmit and receive ports of the transceiver to the proper port with the multiplexer switching controlled by the slave process. The meaning of synchronous in this context is that the slave processes continually listen to their uplink ports for requests and commands. When a request or command arrives from the parent, the routing instructions in the request or command are used by the slave process to control switching of the multiplexer to the port number pointed to by the pointer field. The pointer field is then incremented by the slave which is relaying the packet from its uplink port to a downlink port, and the packet is transmitted out the designated downlink port. The slave process then keeps the multiplexer switched to the downlink port until either a reply is received or a timeout occurs. Replies are required to be sent within a predetermined time which is a matter of design choice and which is not critical to the invention. A timeout will occur when an interval longer than the specified time occurs without receiving a reply. When either a timeout occurs or a reply is received, the slave process controls the multiplexer to switch back to the uplink port. If a reply was received, the upstream packet is then transmitted out the uplink port to the parent. The parent slave process will also control its subchannel multiplexer to stay on the downlink port from which the last transmission was sent until a reply is received or a timeout occurs. This behavior is "single string" and is implemented in all slaves at all levels in the hierarchy such that when a downstream message is sent, all slaves in the chain stay tuned to the downlink ports out which the message was sent until a reply is sent or a timeout occurs.

"Single string" means no upstream or downstream collisions between different GUMP packets can occur in the light weight GUMP communication protocols. For example if the GUMP head 20 queries grandchildren slaves ID 2 and ID 3 in FIG. 3, these queries will be sent out one at a time, and, for the first query, the slaves in the chain will stay tuned to their downlink ports until a reply or timeout occurs. Then they will switch back to their uplink ports, and receive the next query, transmit it to the next grandchild slave, and stay tuned to their downlink ports in the chain to the grandchild slave being queried until a reply or timeout occurs. Single string behavior would also be utilized to avoid collisions in embodiments where the GUMP head process 20 drove multiple serial interface circuits like the one driving serial bus 102. In these embodiments, the GUMP head 20 could have multiple local slaves within the same enclosure. The embodiment shown in FIG. 3 uses only one local slave which has four downlink ports, but any number of downlink ports could be used on the local slave.

In this example of the GUMP head 20 sending a query packet to grandchild ID 3, there is only one jump from the local slave level to the level of slave ID 3. Thus, only one routing instruction field is needed and the pointer field 117 is set by the GUMP head 20 to have a content of 2 indicating to the local slave that the switching instructions the slave process 64 in FIG. 4 is to use in controlling the multiplexer of its subchannel transceiver are located in field 2. This causes the slave process 64 of the local slave to receive the query packet on its uplink port #5 (104 in FIG. 3), and then switch its multiplexer to port #4 and transmit the query packet to slave ID 3. In one embodiment, Field 3 of the query packet shown at 119 in FIG. 7 contains an operation code or other content that causes the slave process of slave ID 3 to understand that the GUMP head process is requesting it to send its uplink port number and to tell the GUMP head 20 whether the grandchild slave ID 3 has discovered any children of its own, and to send the contents of its register to tell the GUMP head 20 what its downlink ports are if the target slave indicates it has discovered children of its own. In the preferred embodiment, these three items of information desired by the GUMP head 20 are the subject of three separate query packets, each with an operation code or other indicator therein which indicates which of these three items of information are requested. The process of the target slave (in the example given, a grandchild slave) replying to the probe with its uplink port number and whether it has discovered any children of its own is symbolized by block 116. Block 116 also symbolizes the process of the GUMP head 20 responding to the notification that children of the grandchild slave have been discovered by sending another query packet requesting the grandchild slave to send the contents of its register giving the downlink port numbers of its ports coupled to children of its own. The downlink port numbers are not recorded in the routing table in the preferred embodiment, but they could be in alternative embodiments. The GUMP head 20 does save these downlink port numbers for each slave ID though for use in building its topology discovery query packets. Block 116 also represents the process of all the intermediate slaves in the chain between the GUMP head 20 and the target slave keeping their subchannel multiplexers tuned to their downlink ports until a reply is received or a timeout occurs.

In some embodiments, symbolized by block 118 on FIG. 6C, the topology probing process carried out by the GUMP head 20 continues until all slaves have been discovered and queried for the uplink port numbers and downlink port numbers if any. The GUMP head 20 can determine that all slaves have been found in any way such as by a timeout on further Yes replies to its queries regarding whether any slave has found further children. The GUMP head 20 then builds the routing table in step 120 with the gathered information, and computes the CRC of the routing table and compares it with the old CRC, as symbolized by block 122.

Block 124 is a determination of whether the CRC on the current routing table has changed. If not, processing flows on path 126 back to step 100. If the CRC has changed, processing is vectored on path 128 to step 130 which represents the process of getting the information that the topology has changed to the NMS process somehow and blocking any NMS set operations until the NMS process has updated its understanding of the network topology. After the process represented by block 130, processing returns to step 100 via step 132 which can represent a delay if the topology probing processing is to be made periodic rather than continuous.

There are multiple ways of getting the information that the topology has changed to the NMS process 11 in FIG. 4. Any process to get the new topology information, and specifically the GUMP IDs to the NMS process will suffice. In one embodiment, when step 124 determines that the CRC of the routing table has changed, a trap is sent by the GUMP head process to the proxy agent through its API. The proxy agent then sends the trap to the NMS process causing a trap service routine to run to send requests for the new topology information to the proxy agent. In an alternative embodiment, whenever the proxy agent or GUMP head 20 determines that a change in topology has occurred, it can send whatever topology data the NMS process uses to the NMS process with a message saying, "use this as your current topology database" and include the latest CRC.

In another embodiment, the NMS process can periodically do get requests for the OID which is the current CRC stored by the GUMP head 20 and compare the returned CRC value to the value of the CRC the NMS has stored to determine if there has been a change. In other words, the NMS process constantly polls the current CRC in the background, and, when a change is detected, it updates its understanding of the topology.

In another embodiment, the fact that the topology has changed is communicated to the NMS process by special processing of its gets and sets to be described below in connection with the description of FIGS. 8A and 8B. Basically, in this embodiment, the NMS process requests the current CRC from the proxy agent each time a get is sent. The proxy agent responds with the requested data from the object and the current CRC which the NMS process then compares to the CRC it has stored. If the CRCs do not match, the NMS agent then requests at least the GUMP IDs of all objects exposed to it in the network. In some embodiments, the NMS process may request the entire routing table and the downlink port numbers for every slave in one or more queries directed to the proxy agent, and then updates its graphical display of the topology. Sets are specially processed in this embodiment by the NMS process attempting to set the CRC each time it does a set operation on another object in the network. The current CRC is an SNMP MIB object with its own OID which the NMS process can perform gets and sets on. The proxy agent then compares the value the NMS process is trying to set into the CRC object with the value of the current CRC object and blocks the set operation on the other network object if there is a mismatch. The proxy agent can then tell the NMS process it has blocked the set or let the NMS process figure that out for itself by a timeout on the window for a confirmation message confirming the set has been accomplished.

In either type embodiment, when the NMS learns of the topology change by whatever mechanism is used, the NMS process then takes steps to update its understanding of the topology.

In updating its understanding of the topology, the NMS process only really needs the GUMP IDs in the broadest definition of the invention. This is because the OIDs of all the objects to be managed are in the MIB, and the rest of the topology information regarding which ports of which device having GUMP ID X are coupled to which ports of which other devices having GUMP IDs Y and Z is only important if the NMS process 11 displays the network topology in a graphical form. In the broadest definition of the invention, the NMS process only needs to be able to manage the network and a graphic display is not necessary to this minimal management function. A simple listing of the devices which can be managed and their GUMP IDs is adequate.

The reason the NMS process needs a correct understanding of which devices correspond to which GUMP IDs is so that properly structured request and command packets can be sent to the proxy agent process which correctly identify the device to be operated upon in the current routing table. The SNMP or other protocol management packets generated by an NMS process within the definition of the invention include both an OID concatenated with a GUMP ID. The OID identifies the particular type of object to be operated upon by the get or set packet. For example, temperature might have an OID of 1.4.4 and power supply status might have an OID of 1.4.5 and fan status might have an OID of 1.4.6. The GUMP ID will be a number that is appended to the OID in the management packet that identifies the specific slave device from which the temperature, power supply status or fan status is to be obtained. The SNMP or other management packet also includes a field which identifies the type of desired operation on the device specified by the concatenation of the GUMP ID and the OID, i.e., a get or set.

When the management packet arrives at the proxy agent, a table lookup is performed in table 34 in FIG. 4 to find the right function call to invoke to carry out the operation. Different functions are necessary to, for example, get the temperature from the local slave ID 1 than from the great grandchild slave ID 4 in FIG. 3. This is because to get the temperature from ID 4, a GUMP packet must be assembled and this packet must be transmitted out on serial bus 102 with the proper routing instructions in it to get it to slave ID 4 which causes the local slave to switch its multiplexer to port 4 and put the GUMP packet in the input pipeline of the subchannel transceiver. The function call may also set a timeout period which is sufficient to wait for a reply to be generated by slave ID 4 and be relayed through slave ID 3 and slave ID 1.

In contrast, to get the temperature from local slave ID 1, it is only necessary to send a query packet over serial bus 102 to the local slave indicating a get operation on OID 1.4.4. and receive the data back on the serial bus. No subchannel transmissions are involved in this latter operation.

The OIDs are used to define the columns in the function call table 34 and the GUMP IDs define the rows. The entries at each intersection of a row and column is the particular function call to make to invoke the function necessary to do the proper processing to assemble a GUMP packet and get it to the proper object in the proper slave device. This function call is invoked, and the operation code that defines the type of operation desired is passed as an argument to the GUMP head 20. That function is then invoked and the GUMP packet is assembled with proper routing instructions.

The routing instructions to get a packet to each of the four slave devices shown in FIG. 3 are shown above the upper right hand corner of each box, of which the routing instruction 0.1.4.3 shown at 132 for great grandchild slave ID 4 is typical.

In FIG. 6C, a process to calculate CRC only after a complete topology discovery process has been completed is shown. In an alternative embodiment, the routing table is updated each time a new child slave is found and has been queried for its uplink port number, and a CRC is calculated each time the routing table is updated and stored. The NMS process then asks for the current CRC before or with each management request or command and compares it with the CRC the NMS process has stored. If there has been a change, the NMS process requests that the proxy agent send it the new topology data. Any form of transfer of the topology data will suffice.

The automated topology discovery process is carried out periodically or continuously in the preferred embodiment. In the preferred embodiment, the routing table is rebuilt from nothing each time a CRC mismatch is detected.

In the light weight communication protocol defined above, it is assumed that there is only one subchannel transceiver per slave and that the subchannel transceiver can only transmit from or listen to one port at a time. In alternative embodiments, multiple subchannel transceivers in each slave can be organized as one devoted to each port, or held in a standby pool and switched into communication with a port when incoming traffic is detected or switched into communication with a port when traffic to be transmitted on that port is received. In another alternative embodiment, two separate multiplexers may be used one to connect the transmitter output of each subchannel transceiver to one port and another to connect the transceiver receive input to another port so that transmission on one port and reception on another port may simultaneously occur. Suitable changes to the slave processes to implement these physical differences will be necessary.

Referring to FIGS. 8A and 8B, there is shown a flow chart for the preferred portion of the processing of the NMS process to determine when topology changes have occurred and update its understanding of the new topology. Step 134 represents the process of initializing and, optionally, determining which proxy agent to talk to. In some networks, there may be more than one proxy agent, and the NMS process can either determine which one to address its management packets to by receiving a command from the network administrator, looking it up in configuration data or automatically finding all proxy agents and asking the network administrator to select one. The process of automatically finding all proxy agents can be carried out by sending a packet to every IP address saying, "Are you a proxy agent? If so, please so advise."

From step 134, processing vectors to step 135 to determine if a request for information has been received from the network manager. If so, processing is vectored to step 136. If not, processing is vectored to step 137 where a determination is made whether the network manager has requested data to be written to an object in the network. If so, processing is vectored to step 150. If not, processing is vectored back to step 135.

The GUMP IDs "float" in the sense that when a new slave is plugged into some level in the hierarchy, the GUMP IDs will change. In fact, when a new slave is plugged into a middle level of the hierarchy, all the GUMP IDs of the slaves below the new slave in the hierarchy will all be incremented.

Step 136 is performed next representing the process of receiving any subsequent requests for data from the network administrator and generating a get packet in response. Whenever a get packet is generated, the NMS process automatically also requests the proxy agent to send the CRC of the latest routing table. The get packet will have an OID with an appended GUMP ID to identify the particular object in the particular slave from which data has been requested. This packet is then sent to the proxy agent.

The proxy agent examines the OID and GUMP ID in the packet and tries to do a table lookup on that object. If a topology change or something else has happened that makes the target object unavailable, the proxy agent sends back a fail message, and, preferably sends back the latest CRC on the routing table, as represented by test 137. In some embodiments, the proxy agent only sends back a fail message. To represent these embodiments, block 137 represents the reply only with a fail message, and block 139 in dashed lines is shown representing a separate request for the latest CRC generated by the NMS process when a fail message is received. In either type embodiment, when a fail message is received, processing is vectored directly to block 140 representing the process carried out by the NMS process of comparing the CRC it received from the proxy agent to the last known CRC it has previously recorded as having received from this proxy agent. If the proxy agent does not send a fail message, it performs the process symbolized by block 138 by sending back the data from the object identified in the get request along with the current CRC of the routing table. The processing proceeds to step 140 where the CRCs are compared.

Test 142 represents the vectoring for a CRC match or mismatch condition. If the CRC received from the proxy agent matches the CRC on file in the NMS process for that proxy agent, the data received from the get request is processed normally by the NMS process such as by displaying it to the network administrator. If the CRC comparison results in a mismatch, the possibility exists that the data obtained by the get was not obtained from the correct object. In such a case, the processing of block 146 is performed to discard any data received in response to the get, if any was received, and to update the NMS process topology database. After the topology database is updated, the NMS process repeats the get request. In the preferred embodiment, the NMS topology database is updated by one or more requests from the NMS process to the proxy agent to get all the data in the routing table and the downlink port numbers for every slave device. This information is necessary for the NMS process to redraw the topology graphic which is displayed to the network manager. The optional process of redrawing the topology is represented by block 148. In the broadest definition of the invention, the NMS process does not have to have a graphical user interface or draw the topology of the network and can simply present the network manager with a list of objects that can be managed with their current GUMP IDs and, optionally, the name or serial number of the slave device that contains each object. Each slave device optionally contains a nonvolatile or hardwired serial number or name memory which is an object which can be the subject of a get request. Thus, in embodiments where graphical user interfaces are not used, the GUMP IDs from the routing table and a series of gets to each GUMP ID can be used to obtain a meaningful listing of objects and slave devices with their names for display to the network manager.

Processing then proceeds from step 144 or 148 or 146 to step 150 on FIG. 8B. Step 150 represents the processing of any subsequent requests to write data specified by the network manager to any object in the network. The NMS process responds by generating a set packet identifying the object selected by the network manager by OID and GUMP ID and including the data to be set into that object. Any such set packet also includes a set request identifying the current proxy agent CRC by its OID (it is local to the proxy agent so it does not need a GUMP ID) and including the latest CRC on file in the NMS process received from this proxy agent as the value to set into the CRC object.

The proxy agent responds to this set request in step 152 by comparing its latest CRC on the routing table with the value in the set request for the CRC object. Test 154 represents the branching which occurs as the result of the comparison with a perfect match resulting in step 156 being performed. A mismatch results in step 158 being performed wherein the proxy agent sends a trap to the NMS process indicating there has been a topology change from the topology the NMS process thinks still exists. This results in the NMS process performing step 160 to make one or More requests to the proxy agent to send the latest topology information. The topology information in the NMS is then updated in the same ways as discussed for step 146. Finally, the NMS agent optionally redraws the topology graphic display in step 162, and processing vectors back to step 164 where processing is vectored back to step 135 to process any further gets or sets.

Preferred Automatic Topology Discovery Process

Figure 10A:
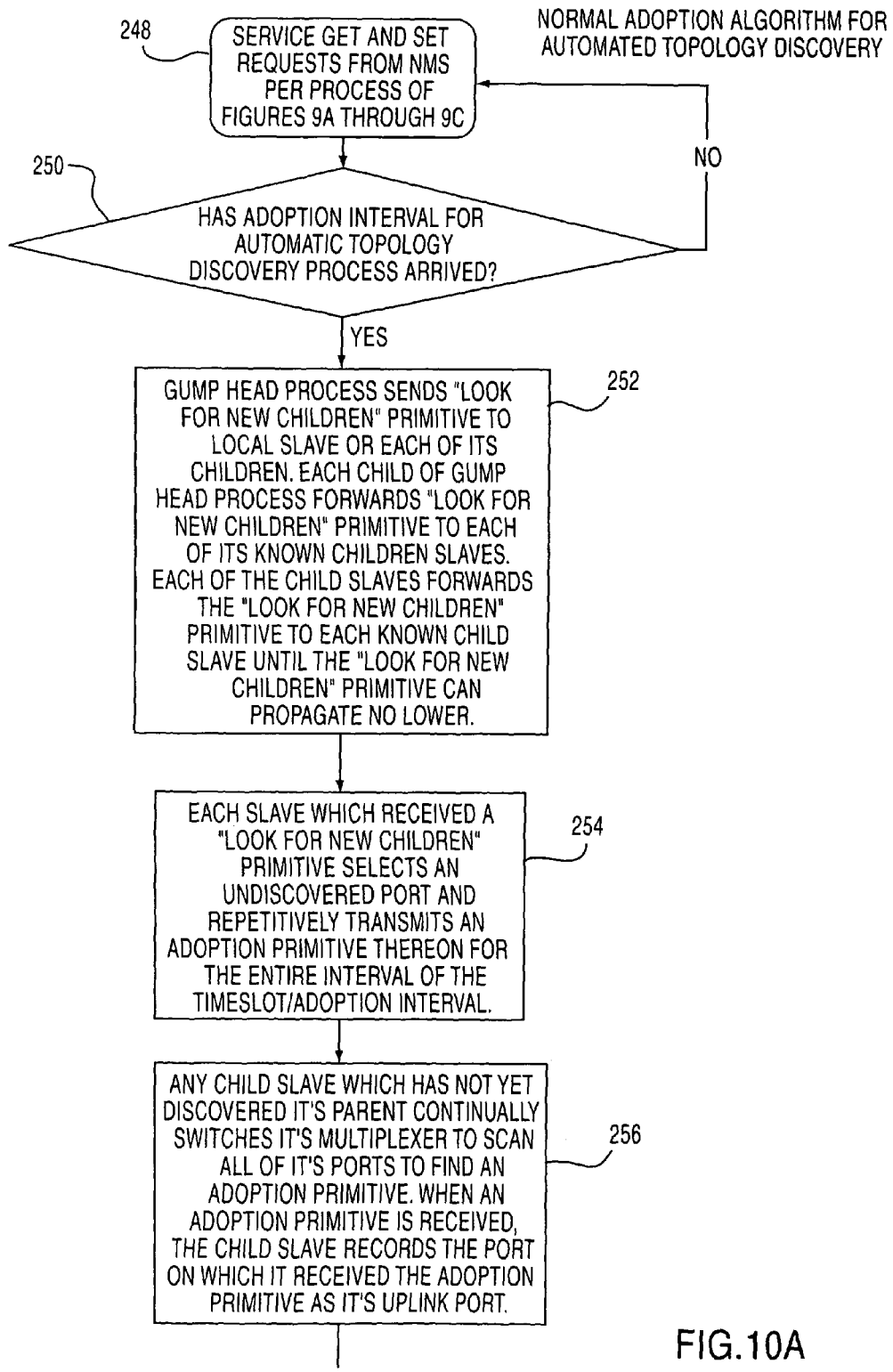
FIGS. 10A and 10B are a flowchart of the preferred form of automatic topology discovery.
Figure 10B:
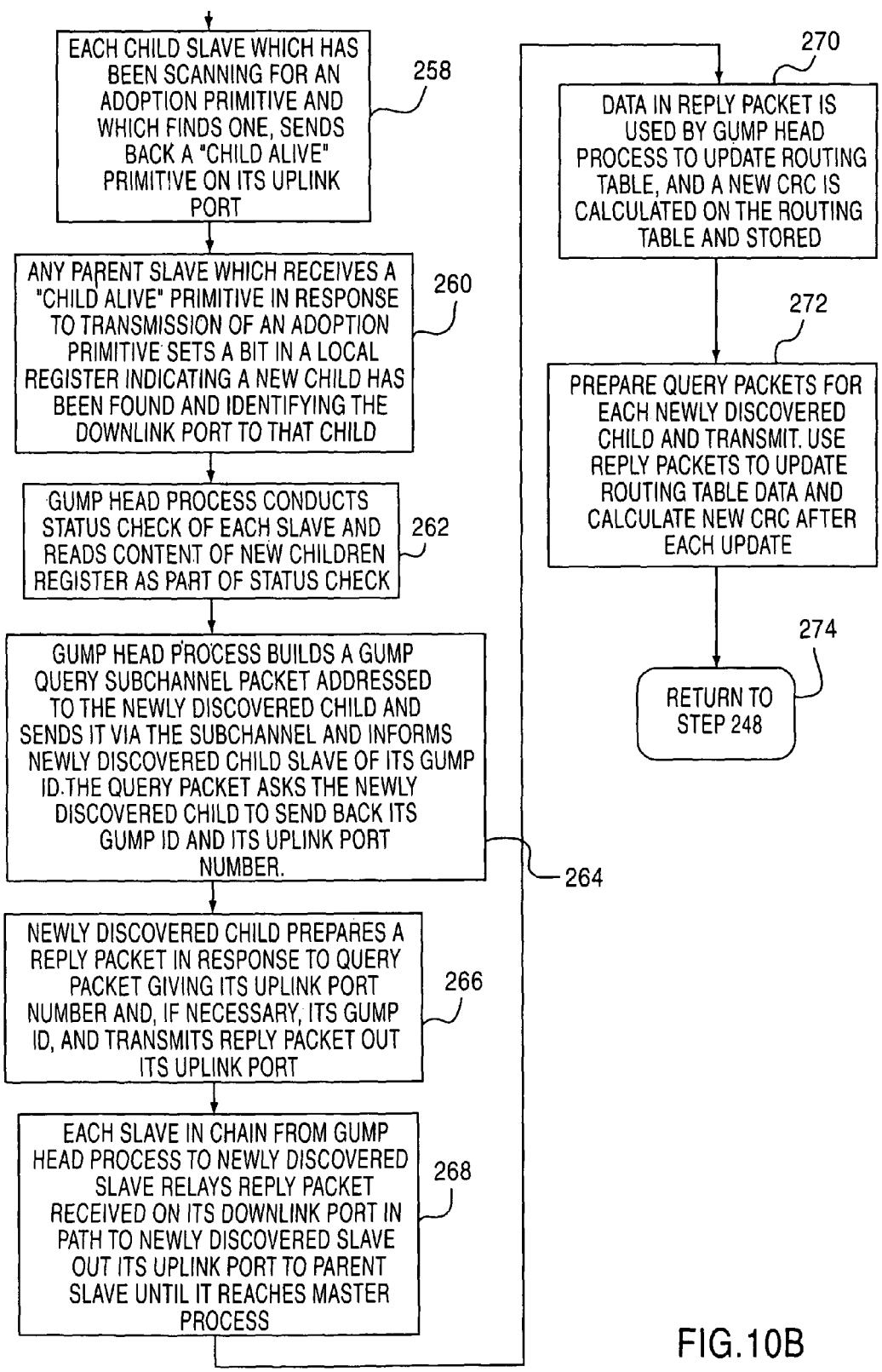

Referring to FIGS. 10A through 10B, there is shown a flowchart of the preferred form of automatic topology discovery process. This process is time division multiplexed by the GUMP head with its process for servicing get and set requests described in FIGS. 9A through 9C.

The automatic topology process'starts with step 248 representing the process of processing get and set requests from the NMS system in accordance with the process of FIGS. 9A through 9C. Next, in step 250, the GUMP head process determines if the timeslot for topology discovery has arrived. The term "timeslot" is used herein only to refer to an event that occurs in a round robin fashion and not in the sense of a fixed interval timeslot such as are used in time division multiplexed buses. The event that occurs is the call of a subroutine devoted to topology discovery and polling of all the child slaves for status. This subroutine is called when an internal timer generates a software interrupt in some embodiments or is called on every pass through the main program loop.

Step 250 is supposed to represent the beginning of processing of this subroutine. The not branch out of step 250 simply represents the fact that the processing represented by block 248 continues until it is time to execute the subroutine. When the subroutine is called, processing proceeds to step 252 wherein the GUMP head process sends an "Look for new children" primitive to each of its children slaves. In the network shown in FIG. 3, the GUMP head process has only one child, the local slave 64/66, so the adoption primitive is sent on serial bus 102 to the local slave. Each child slave forwards the "Look for new children" primitive to each of its known children, and the process continues until the "Look for new children" primitive can propagate no lower in the hierarchy.

Each slave device that receives the "Look for new children" primitive reacts in the same way to begin searching for new children slaves on any ports remaining in the slave which do not have known children attached thereto. Only one "undiscovered" port (meaning no known child attached thereto) is used for interrogation during each timeslot in each slave. In other words if slave ID 1 in FIG. 3 has two known children and two undiscovered ports, and slave ID 2 has no known children and 3 undiscovered ports, during the current topology discovery process, each of slave IDs 1 and 2 are going to interrogate only one of their undiscovered ports in the preferred embodiment with only a single multiplexer. Interrogation of one of the undiscovered ports is accomplished by repetitively transmitting an adoption primitive out the selected undiscovered port using the subchannel transmitter for the entire adoption period, i.e., the entire timeslot devoted to topology discovery. The adoption primitive basically says to any child that receives it, "Hello, I am ID whatever, and I will be your parent." This process of interrogating one undiscovered port for a new child is symbolized by block 254.

Any child slave which has not yet found its parent will be scanning all of its ports at a high rate to find such an adoption primitive. When it receives an adoption primitive, the new child slave records the port number it received it on as its uplink port in its configuration data, as symbolized by block 256.

Next, any child slave which has newly discovered its parent sends back a "child alive" primitive on its uplink port, as symbolized by block 258. The child alive primitive is the same for every child slave and contains no information specific to that child slave such as its ID in the preferred embodiment. In alternative embodiments, it could contain the port number of the slave's uplink port.

Any slave which receives a "child alive" primitive in response to the transmission of an adoption primitive responds by setting a bit in a register therein. This bit indicates that a new child has been found and indicates on which downlink port it was found, as represented by block 260.

On a subsequent call of the topology discovery subroutine, the GUMP head process conducts a status check of each slave and gather status information from each slave. Part of this status information is the content of the "new children" register which has the bit set in it indicating a new child has been found, as represented by block 262. This status check can take any form such as a poll of all known children by sending a query packet to each one using appropriate routing instructions from the routing table and requesting that the contents of the register be sent back to the GUMP head process.

The content of the new children register of any slave which has found new children is used to update the topology data stored by the GUMP head process. Since the position of the bit in the "new children" register indicates the downlink port number, the GUMP head process has all the information it needs to build a query packet to the newly discovered child, and this is done either on the same pass through the subroutine or on a subsequent pass. This processing is represented by block 264. The process of building the GUMP subchannel query packet addressed to the newly discovered child using routing data gleaned from the data obtained from the status check of the parent that discovered the new child and sending it via the subchannel is represented by block 264. The query packet informs the newly discovered child slave of what GUMP ID has been assigned to it. The routing fields are the same as explained elsewhere herein. This query packet asks the slave to send back its GUMP ID and its-uplink port number in embodiments where the GUMP ID of every slave is fixed or just its uplink port number where the ID has been assigned although if multiple new child slaves have been discovered, the reply packets should each include the GUMP ID even if the master node assigned it to each child slave so that replies from different slaves can be kept straight. In the preferred embodiment, the GUMP ID is assigned by the GUMP head process and the new slave is informed of its GUMP ID in the query packet.

The newly discovered child receives this query packet and responds by generating an upstream packet which contains its uplink port number and, if necessary, its GUMP ID, as symbolized by block 266. This upstream packet needs no routing instructions since all slaves in the chain from the GUMP head to it still have their multiplexers tuned to the downlink ports used to relay the query packet to the newly discovered slave and will remain tuned to that port until the reply packet has been received and relayed out the uplink port to the parent slaves all the way up to the GUMP head process 20, as represented by block 268. This aspect of the process works the same as subchannel transmissions of GUMP packets to process NMS get and set operations.

The uplink port number (and GUMP ID in some embodiments) in the reply packet are used by the GUMP head process to update the routing table, and then a new CRC is calculated on the routing table and stored, as symbolized by block 270.

The process of preparing a query packets for any other newly discovered children and sending them and receiving the reply packets and updating the routing table and calculating a new CRC upon each update is symbolized by block 272. That ends the automatic topology discovery process, so processing returns to step 248 to process get and set packets from the NMS process, as symbolized by block 274.

In alternative embodiments with dual multiplexers for each slave, each slave's subchannel transmitter can send out an adoption primitive on each of its undiscovered ports during the execution without waiting on the port for a reply. This is done by switching its transmit multiplexer to each undiscovered port just long enough to send the adoption primitive and then switching to the next undiscovered port and sending another adoption primitive. The receive multiplexer is then switched repetitively between all the undiscovered ports in a polling process and listens on each port for a short time for a reply from a newly discovered child slave. Any undiscovered child slaves which receive an adoption primitive sends back a "child alive" primitive on a repetitive basis until it receives an acknowledgment from its parent that its child alive primitive has been received. The parent with the newly discovered child slave then updates its newly found children register by setting bits in all the locations corresponding to ports with newly found children. This data gets uploaded to the GUMP head process on the next status check. The GUMP head process responds by preparing query packets for all the newly found children and transmitting them to their respective parents. For any parent with more than one newly found child, the transmitter multiplexer is operated to send the query packet for each newly found child to that child, and then switches back to the uplink port. The receive multiplexer then switches back and forth between the ports having the newly found children listening for replies and sends the reply data to the subchannel transmitter for transmission on the uplink port.

Dual Multiplexer Servicing of NMS Management Request

Referring to FIGS. 11A through 11D, there is shown an alternative embodiment for a subchannel communication protocol which may be used where there is a single subchannel transceiver in each slave node and in the GUMP head process computer or its local slave and where there is a separate multiplexer for each transmit and receive port of each subchannel transceiver, as shown in FIG. 2. The basic idea behind this protocol is to achieve performance enhancements by using the transmit multiplexer to transmit topology probe packets or GUMP packets out to each target slave which has such a packet waiting in a queue in the GUMP head process in without waiting for a reply. Then the receiver of each subchannel follows behind the transmitter and polls all ports for replies. When a reply is received, the data is sent to the transmitter for transmission on the uplink port. While the receiver multiplexer of the local slave or the children of the master process are busy monitoring downlink ports, the master cannot communicate with its children, so it uses this time to receive NMS requests directly or out of an input buffer, build any necessary subchannel packets and store them in an output buffer.

The process starts at 290 representing the top of the main loop of processing by the master process 119. No processing by the proxy agent process is depicted as that is the same regardless of whether there are one or more subchannel transceivers in each slave and regardless of the number of multiplexers. The master process 119 in FIG. 2 receives any get and set requests from the NMS in the form of a function call from the proxy agent followed by a request from the process that is launched to the proxy agent to send data from the management packet for use in building any necessary subchannel packet and identifying the object to be operated upon. In some embodiments, this data is sent initially as arguments to the function call. The data from the management packet is then stored in a receive FIFO section of an I/O buffer 131 in FIG. 2 (a FIFO need not be used if the order of receipt and processing of the management packets is not important), as symbolized by block 292. This allows incoming NMS requests to be received and stored for later processing even when the master process is busy building subchannel packets, transmitting them, doing topology discovery and when the downlink port or serial bus out of the circuitry executing the master process is not available for downstream transmissions.

In step 294, the master process prepares subchannel packet for each management packet in the receive FIFO and stores it in a FIFO transmit buffer which is also part of I/O buffer 131.

In step 296, the master process takes the next subchannel packet to be processed out of the transmit FIFO and examines its content to determine what operation it is commanding. If the content of the packet indicate it is commanding the target slave to set up for a firmware download, this fact is recognized by test 298, and processing is vectored to step 300 to set up a hardware pipeline. A hardware pipeline is a wormhole through the hierarchy of slaves from the master process 119 to the target slave where each slave in chain has its receive multiplexer 109 set to the uplink port and its transmit multiplexer 105 set to the appropriate downlink port to relay data from the master process to the target slave. The subchannel transceiver 66 also has a data path switched therein to a state whereby data received from the uplink port by the receiver section is fed directly into the input of the transmitter section and gets immediately transmitted without any interrupt to the slave process or subchannel communication software 117 or interaction therefrom. This speeds up operation considerably by cutting out any software processing in the relaying process. Step 300 represents the process of preparing this "hardware pipeline" by preparing a pipeline primitive in the master process and transmitting it to the child slave of the master process which is the first slave in the chain to the target slave. The pipeline primitive has routing bytes and signals every slave in the chain to set up its multiplexers and switching in its subchannel transceiver to establish the pipeline when it sees a lockup primitive come back from the target slave. The process of each slave in the chain receiving the pipeline primitive, recording its routing instructions for purposes of setting up the switching of the multiplexers and forwarding the primitive to the next slave in the chain is represented by block 302. Block 302 also represents the process of, after forwarding the pipeline primitive, switching the receive multiplexer of each slave in the chain to the downlink port in the chain to listen for a lockup primitive propagating back up the chain to the master process from the target slave.

In step 304, the target slave receives the pipeline setup primitive through its receiver and receive multiplexer which is always monitoring the uplink port until instructed otherwise by the master process. The target slave responds to the pipeline setup primitive by switching its transmit multiplexer to the uplink port and transmitting a "lockup primitive" up the chain, and then sets up its internal switching to receive the firmware download, as symbolized by block 304.

Each slave in the chain between the master process and the target slave receives the lockup primitive on its downlink port and forwards it out the uplink port until it reaches the master process, as symbolized by block 306. This informs the master process that it may start transmission of the firmware download image.

Immediately after each slave in the chain forwards the lockup primitive, each slave in the chain switches its receive multiplexer to the uplink port and switches its transmit multiplexer to the downlink port identified in the original pipeline setup primitive and sets up the data path in its subchannel transceiver between the receiver section and the transmitter section to establish the pipeline, all as symbolized by block 308.

Figure 11A:
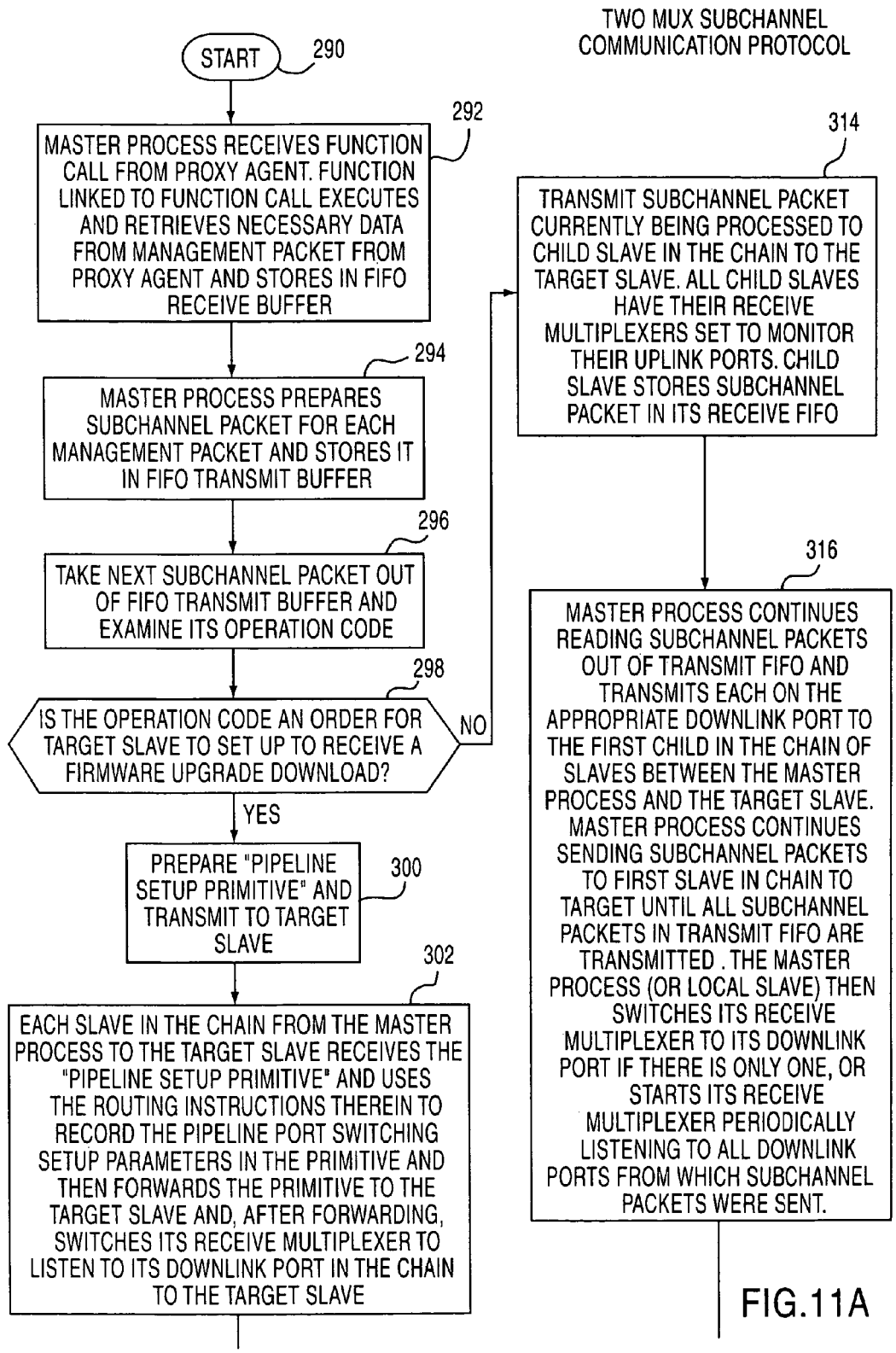
FIGS. 11A through 11D show an alternative embodiment for a subchannel communication protocol which may be used where there is a single subchannel transceiver in each slave node and in the GUMP head process computer or its local slave and where there is a separate multiplexer for each transmit and receive port of each subchannel transceiver.
Figure 11B:
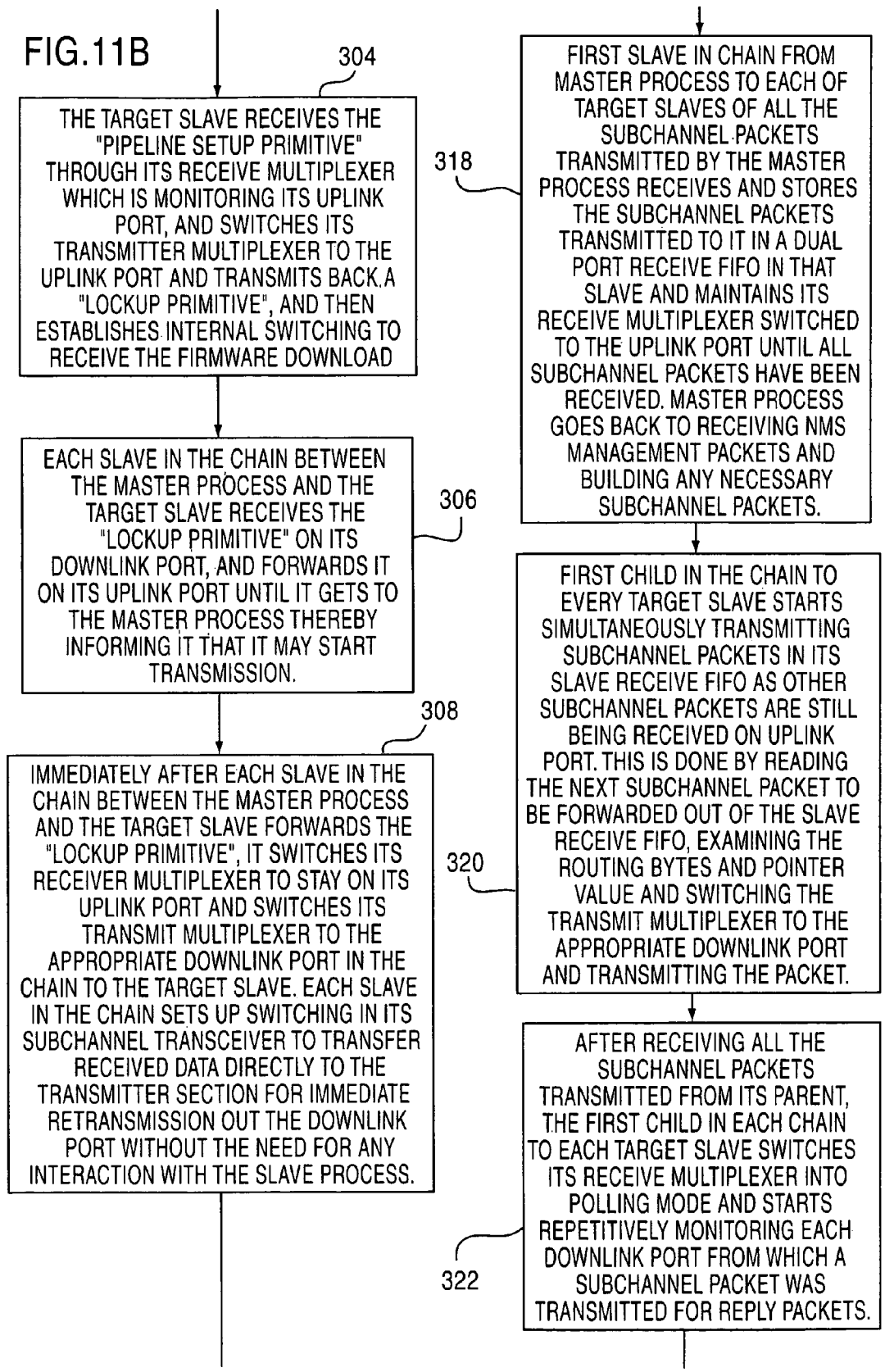
Figure 11C:
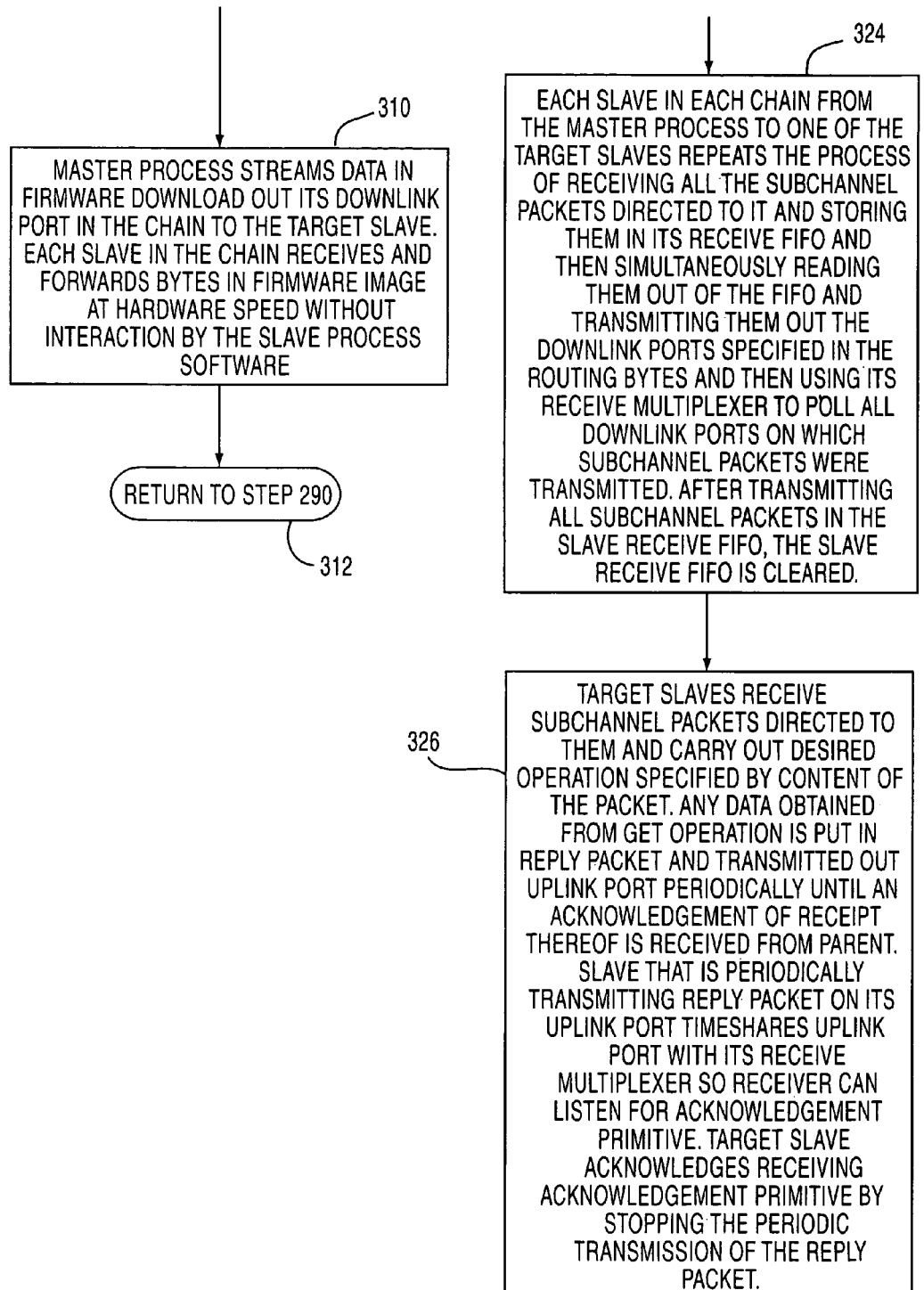
Figure 11D:
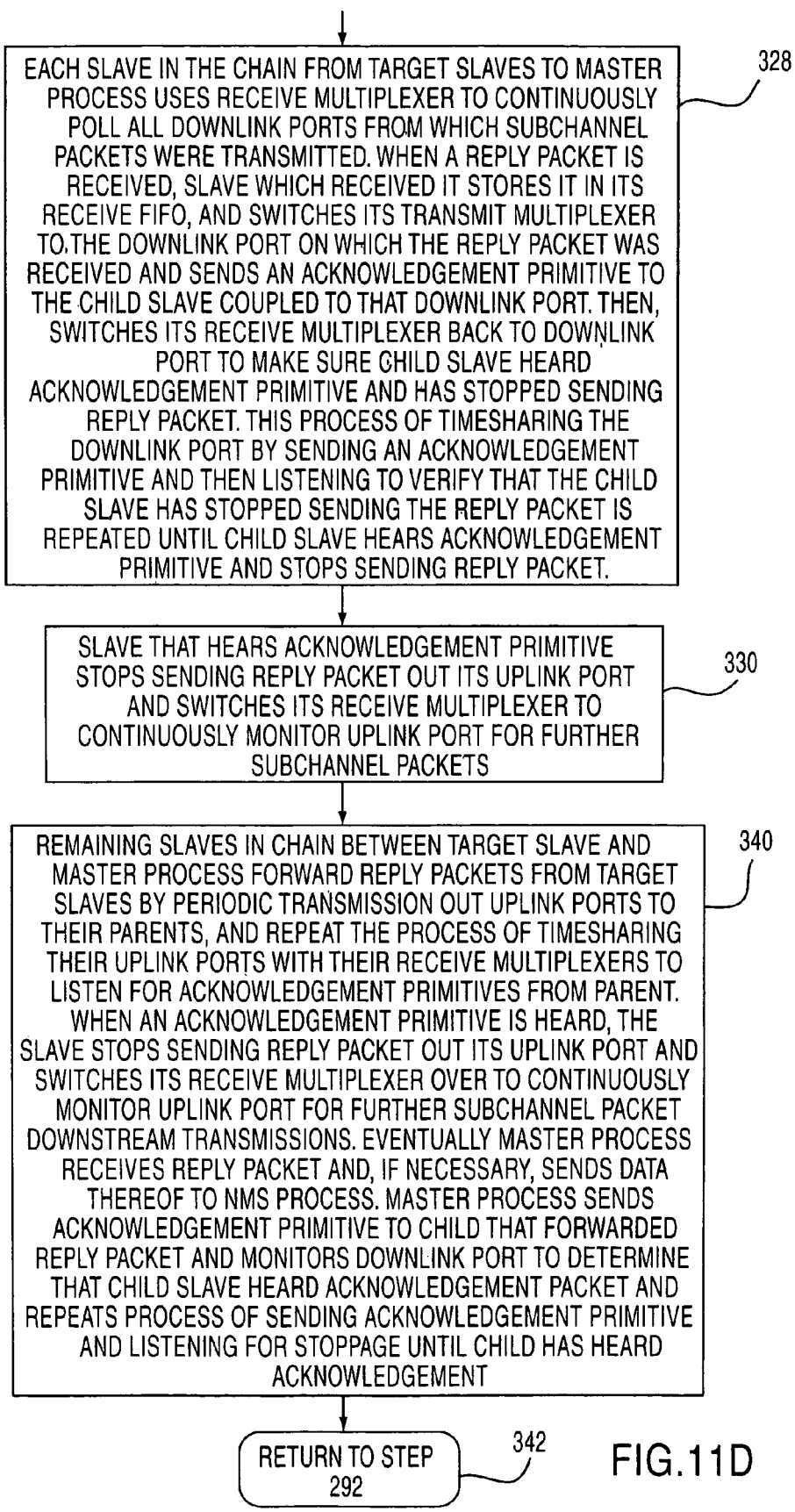

Block 310 in FIG. 11B represents the process of the master process putting the data of the firmware download image into the pipeline as a continuous stream of data by transmitting it out its downlink port to the first slave in the chain. The first slave and all subsequent slaves receive the stream of bytes and forward them at hardware speed to the target slave without any software interaction with the subchannel communication process. Processing then returns to step 290 to start the loop over again and receive more NMS requests.

If, in step 298, the master process determines that the subchannel packet is not a request to set up a firmware download, processing is vectored to step 314. Step 314 represents the process of transmitting the next subchannel packet in the FIFO ready for transmission to the first child in the chain of slaves to the target slave. All the slaves have their receive multiplexers set to monitor their uplink ports. The first child slave in the chain stores the subchannel packet in a receive FIFO in some embodiments to prepare for multiple subchannel packet transmissions. In other embodiments, the slave process of the first child slave receives an interrupt or is otherwise passed the subchannel packet as soon as the first subchannel packet arrives and proceeds to examine its routing instructions, switches the transmit multiplexer to the appropriate downlink port in the chain and transmits the subchannel packet to the next child slave in the chain.

Step 316 represents the process of continuing to read the remaining subchannel packets waiting for transmission out of the transmit FIFO of the master process and transmitting each one out the appropriate downlink port to the first child in the chain to their respective target slaves. This process continues until the master process has sent every subchannel packet in its transmit FIFO to the appropriate first child in the chain. The master process then switches its receive multiplexer to monitor its downlink port if there is only one downlink port or starts its receive multiplexer on a polling process to repetitively and periodically listen to all downlink ports from which subchannel packets were sent. In embodiments such as are represented by FIG. 3 where the master process 20 only has a serial bus 102 connecting it to a local slave 64/66, the master process continuously monitors its serial bus or simply uses its serial bus to retrieve upstream data from the local slave in the process of executing an interrupt service routine when the local slave generates an interrupt indicating that upstream data has been received and stored in a predetermined location. The local slave will monitor its downlink ports in the manner described below and generate and transmit acknowledgement primitives to child slaves from which reply packets have been received. In embodiments where the master process has no local slave but has one or more downlink ports, the master process will act like the local slave in polling its downlink ports and generating acknowledgement primitives. Where there is a local slave, all reply packets generated in response to subchannel packets will eventually reach the local slave and will be transmitted one at a time to the master process. This can be done by generating a single interrupt when each reply packet is received or by receiving and storing all reply packets in the slave upstream FIFO and generating an interrupt when they are all stored and storing in a known register a starting address for the block of reply packets and the length of the block of memory in which the reply packets are contiguously stored. Then the interrupt service routine reads the known register and reads all the reply packets starting at the starting address given to it. The slave upstream FIFO is part of slave FIFO 5 in FIG. 2. This FIFO contains both a downstream FIFO which stores subchannel packets and an upstream FIFO that stores reply packets and is present in every slave.

Step 318 represents the process carried out by the first slave in the chain from the master process to each of the target slaves for each subchannel packet transmitted by the master process receives and stores each subchannel packet transmitted to it in a dual port receive FIFO in that slave. Each such slave maintains its receive multiplexer switched to the uplink port until all subchannel packets have been received. This can be detected by a timeout on receive data activity on the uplink port or by a primitive sent by the parent on all downlink ports when all subchannel packets have been transmitted. After transmitting all the subchannel packets in its transmit FIFO, the master process goes back to receiving function calls from the proxy agent, storing NMS management packets in its receive FIFO and processing the NMS management packets in the receive FIFO into any necessary subchannel packets.

Step 320 represents the process carried out by each first child in the chains of slaves from the master process to each of the target slaves of starting transmission of the subchannel packets in the slave receive FIFO even before all the subchannel packets have been received by the slave. This is done by reading the next subchannel packet to be relayed out of the slave receive FIFO, reading the appropriate routing byte, and switching the transmit multiplexer to the appropriate downlink port for each subchannel packet and transmitting the subchannel packet. This simultaneous processing of receiving subchannel packets while simultaneously transmitting subchannel packets is repeated by each slave in the chain to each target slave.

Step 322 represents the process carried out by the first child in every chain of switching its receive multiplexer over to a polling mode after all subchannel packets have been received by that child. In polling mode, the receive multiplexer repetitively monitors each downlink port from which a subchannel packet was transmitted to listen for reply packets.

Step 324 represents the process of each slave in a chain from the master process to one of the target slaves repeating the process of receiving all the subchannel packets directed to it and storing them in its receive FIFO. Then, before reception is done, starting to transmit them by reading them out of the receive FIFO, reading the appropriate routing byte and switching the transmit multiplexer to the appropriate downlink port and sending the packet on the subchannel. After all the subchannel packets have been received, the receive multiplexer is switched in polling mode to monitor all downlink ports for replies from the target slaves. Each slave in each chain clears its receive FIFO after all subchannel packets stored therein have been forwarded.

Step 326 represents the process of each of the target slaves receiving the subchannel packets directed to them and carrying out the operation requested by the content of the packet. Any data to be sent back to the master process, such as data obtained from a get operation, is put into an upstream reply packet and transmitted out the uplink port periodically until an acknowledgement of receipt thereof is received from the parent. The upstream reply packets in this embodiment do not need routing instructions since each parent slave that receives a reply packet on a downlink port knows that the packet is directed to the master process and relays it out the uplink port of that parent. Step 326 also represents the process carried out by the target slaves of timesharing their uplink ports between their transmitters which are periodically sending the reply packets out the uplink port and their receivers which are listening on the uplink port for the acknowledgement primitive. When the acknowledgement primitive is received, the target slave acknowledges this fact by stopping the periodic transmission of the reply packet, as represented by block 326. This same behavior is exhibited by every slave in the chain to the master process in acknowledging receipt of the acknowledgement primitive by stopping the periodic transmission of the reply packet out the uplink port, as represented by block 330.

Block 328 represents the process carried out by each slave in the chain from the target slaves to the master process using its receive multiplexer to continuously poll all downlink ports from which subchannel packets were transmitted listening for reply packets. When a reply packet is received, the slave that received it stores it in its receive FIFO, and switches its transmit multiplexer to the downlink port on which the reply packet was received and sends an acknowledgement primitive to the child that either sent or relayed the reply packet. Then, the slave switches its receive multiplexer back to the downlink port to listen to make sure the child slave heard the acknowledgement primitive and has stopped sending the reply packet out its uplink port. If the child slave is still sending the reply packet, the transmit multiplexer is switched to the downlink port again and another acknowledgement primitive is sent, and the receive multiplexer is switched to the downlink port again to listen for an extended stop in transmission by the child which is long enough to indicate the child heard the acknowledgement. This process is repeated until the child has heard the acknowledgement and has stopped sending the reply packet, all as symbolized by blocks 328 and 330. Block 330 also represents the process of the child slave which has heard the acknowledgement primitive switching its receive multiplexer to continuously monitor the uplink port for further downstream subchannel packets.

Step 340 represents the process carried out by each slave in the chain between each target slave and the master process of forwarding reply packets received on the downlink port in the chain. The forwarding is by storing received reply packets in the receive FIFO and then periodically transmitting them out the uplink port and timesharing the uplink port between the transmitter and the receiver so that the receiver can listen for acknowledgement primitives. Again, when the acknowledgement primitive is heard, the slave stops sending the reply packet out its uplink port and switches its receive multiplexer to the uplink port to continuously monitor it for further downstream subchannel packets. Step 340 also represents the process of the master process eventually receiving the reply packet, sending the data thereof to the NMS process if necessary and sending an acknowledgement primitive to the child that forwarded the packet. The master process then listens to make sure the child has heard the acknowledgement primitive and repeats the process of sending it and listening to determine if the child has stopped sending the reply packet. When stoppage is detected, the master process knows that every child in that chain has switched back to monitoring the uplink port for further downstream subchannel transmissions.

Step 342 represents the process of returning to step 292 to start the process over again.

Device Event Objects

A unique structural feature of some embodiments of the GUMP master process 21 in FIG. 1A (and optionally of all the master or GUMP head processes disclosed herein) operating in conjunction a management information base is the exposure to the NMS process of a unique object called an event indicator. The event indicator is a Last-In-First-Out (hereafter LIFO) stack that contains GUMP IDs of all slaves which have experienced a general fault such as a temperature exceeding limits, fan failure etc. This LIFO stack is shown at 7 in FIG. 1A. The flowchart of FIG. 12 represents the process carried out by the proxy agent of using the LIFO stack 7 to provide a single integer fault indicator for the entire topology.

The basic idea behind the event indicator object is to minimize traffic on any LAN coupling the NMS to the proxy agent by providing a single object that can be read by the NMS process to determine if there has been a fault anywhere on the network. If a fault has occurred in a slave, that slave's GUMP ID is stored in the stack. If there have been no faults, the stack stores only zeroes. This single object is polled periodically, and when anything other than a zero is returned, the NMS process knows there has been a fault, and invokes a procedure to do whatever is necessary to find out more information about the fault or correct it. Typically, the NMS process will perform a number of get requests to the objects in the slave that had the fault to determine the source of the fault and then display the data or perform, other appropriate operations to correct the fault. The advantage of exposing a single device indicator to the NMS process is that it eliminates the need for the NMS process to continually poll all devices in all slaves to determine their status or other such processing that generates excess traffic on the LAN.

Figure 12:
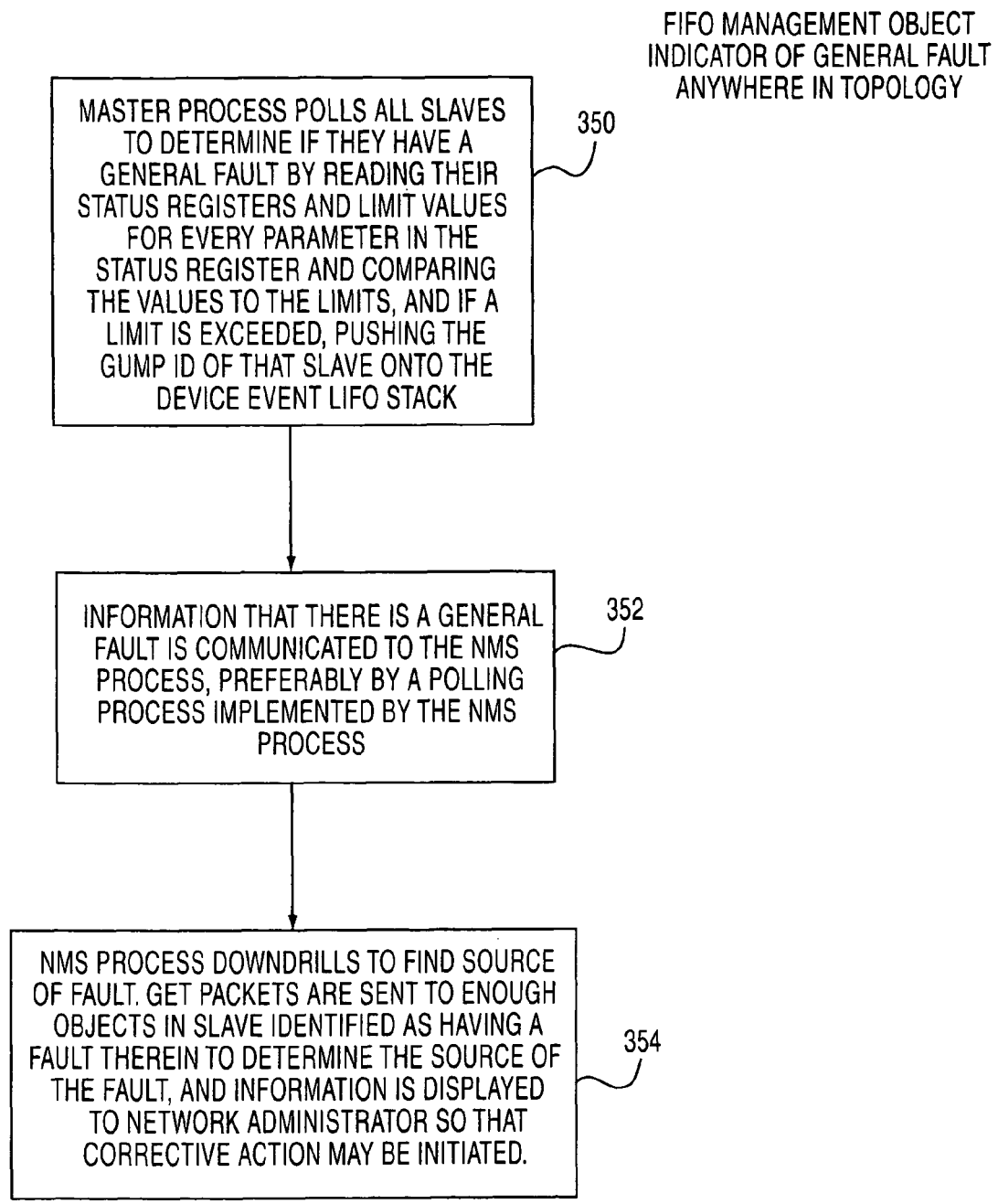
FIG. 12 represents the process carried out by the proxy agent of using a LIFO stack as a management object to provide a single integer fault indicator for the entire topology.

The flowchart of FIG. 12 symbolizes a process of the master process polling the slaves, reading their status registers and limit values, determining when there has been a fault, putting the GUMP ID of the slave with the fault in the LIFO stack and providing information from the LIFO stack to the NMS process when requested. Step 350 represents the process carried out by the master process 21 of preparing a query subchannel packet for every slave device requesting that slave to send back the contents of its status register. The status register contains the value of every object in the general fault category such as temperatures, fan status etc. The status register may also contain the limits for every value or those limits may be stored in another register in the slave. In alternative embodiments, the limits for every object in the network that falls in the general fault category may be stored in a table in the master hub which is accessible by the master process. Step 350 represents the preferred embodiment of the process wherein the master process compares every returned value to its limits to determine if a fault has occurred, and, if so, pushing the GUMP ID of the slave that experienced the fault onto the Device Event LIFO stack 7. Normally, this stack contains all zeroes when no faults have occurred in any slave. In alternative embodiments, each slave stores its own limits and does its own comparisons, and simply stores data in its, status register indicating whether or not it has had a fault. The master process reads these registers and pushes the GUMP IDs onto the stack. The status registers are read one at a time in the preferred single-thread subchannel protocol, but in the broadcast or multiple multiplexer subchannel protocols described herein, each slave can prepare a reply packet which includes its status register contents and its GUMP ID and which may also include a destination address for the master process.

Step 352 represents the process of communicating the information that there has been a general fault in a particular slave to the NMS process 11 in FIG. 1A. Preferably this communication is achieved by the NMS process periodically polling the LIFO stack 7 by performing a get that effectively pops the top GUMP ID off the stack. In alternative embodiments, the information that a GUMP ID other than zero is in the LIFO stack could also be communicated to the NMS process by generating a trap. In the preferred embodiment, regular polling is performed and a trap is also generated whenever a GUMP ID is pushed onto the stack. Step 352 is intended to cover any way of getting the fact that a nonzero GUMP ID has been pushed onto the stack to the NMS process. Polling is preferred because it eliminates the complexity of trap processing and it give more certainty since it is possible for a single trap to not be seen by the NMS.

If the GUMP ID returned as a result of reading LIFO stack 7 is anything other than zero, the NMS process performs a downdrilling process to perform gets on enough of the objects in the slave reported as having a fault to determine the source of the fault and reporting that information to the network manager so that corrective action can be initiated. This process is symbolized by step 354.

Subchannel Transceiver Descriptions

The species of subchannel transceivers disclosed herein fall into either of a first or second genus. Both classes share the common characteristic that the subchannel data can be sent out of band over the high speed data media without substantially increasing the bit error rate of the high speed data receivers. All the specific species disclosed herein for subchannel transmitters and receivers could also be implemented using suitably programmed digital signal processors.

The preferred genus has as a principal characteristic that all species therein are backward compatible with existing high speed data transmitters, media interface devices and high speed data receivers and do not require any changes thereto nor does the existence of the subchannel signals degrade the bit error rate of the high speed data transmissions. This means, among other things that no access to the internal circuitry of the high speed data receivers or media transceivers is necessary to make changes to implement the subchannel scheme, and, further, that data is transmitted in the format which the high speed data receivers are designed to understand (NRZ for 1 GB Ethernet™ and Fibre Channel™ standards). In contrast to the Forsberg prior art (U.S. Pat. No. 4,677,608), no species within the preferred genus of the subchannel transmitter transmits RZ data as that would be incompatible with all existing gigabit receivers for Fibre Channel or One Gigabit Ethernet LANs. All species in both the backward compatible and proprietary link classes transmit the combined high speed data and subchannel signal in NRZ format with the high speed data encoded with a DC balanced encoding scheme. Further, all species in the backward compatible genus which depend solely upon pulse width modulation to transmit the subcarrier signal also work best when the encoding scheme has a bounded transition density which will never fall below a certain figure (0.3 for 8b/10b encoding meaning for 10 bits of 8b/10 encoded data there is guaranteed to be at least 3 transitions and could be up to 10) regardless of the content of the data. The digital embodiment of the subchannel receiver is more sensitive however, and therefore transition densities less than 0.3 may also work. The reason for the preferred transition density is that the amplitude of the subchannel signal at the subchannel receiver in all species which rely solely on pulse width modulation is directly proportional to the transition density of the high speed data. This varies with the content of the data, so the amplitude of the subchannel signal can fall lower or go higher than the nominal values depending upon the gigabit data content. In contrast, the RZ format described in the Forsberg prior art reference has an essentially constant transition density. Further, if too much subchannel energy is injected, jitter in the high speed data receiver is caused which can cause bit errors or loss of synchronization. High speed data receivers can withstand 60-70% eye closure on bit times caused by jitter before losing synchronization. These issues of excessive jitter and subchannel amplitude that is dependent upon transition density and the need for an encoding scheme with a bounded transition density are issues that Forsberg does not recognize and upon which he adds no teachings to the content of the prior art.

Another significant characteristic that all species in this preferred backward compatible genus share is that where alteration of the times of reference voltage crossings is the mechanism by which the subchannel data is transmitted through digital buffers in the media interfaces, the subchannel carrier amplitude actually summed with the high speed data will have to be limited to prevent excessive jitter in the high speed data receivers. Every device in a subchannel system contributes some jitter. Fibre Channel systems allow up to 500 picoseconds of jitter in one gigabit systems. The preferred subchannel species disclosed herein are designed to contribute to the system jitter budget approximately 15 picoseconds of jitter or less in the high speed data receiver caused by injection of the subchannel signal. To sum up this principal characteristic of the preferred genus, the subchannel circuitry, modulation scheme and subchannel carrier amplitude and all other characteristics must be such that the high speed data link behavior works the way it has always worked and is independent of the presence or absence of subchannel circuitry on the transmitter or receiver end and requires no changes to the circuitry of the high speed data transmitter or receiver or any of the media interface devices. Species in the preferred genus do not use modulators that modulate the high speed data with the subcarrier data. The subchannel data is simply summed with the high speed data and received at the receiver side using a low pass filter and narrow band receiver tuned to the center frequency of the subchannel carrier. There is no demodulation of the subchannel data from the high speed data at the receiver side in the preferred species and no pulse width demodulator is used. The preferred species simply discriminates the FSK modulated subchannel carrier to recover the subchannel data. By not using a pulse width demodulator, the detection margins are smaller, but the circuit is less complex. Generally, angle modulation techniques such as phase or frequency shift keying of the subchannel carrier by the subchannel data works better than amplitude modulation techniques. This is because of the backward compatibility issue and because of the amplitude modulation caused by random variations in transition density with NRZ format high speed data content.

The other defining characteristics of the preferred backward compatible genus are as follows.

First, the subchannel link is compatible with standard media interface components and modules for either compensated copper, uncompensated copper or fiber optic media types. This means that with suitable adjustments of injection amplitude (or use of a two value attenuator) and injection type (differential or single ended), the subchannel circuitry can be used with either copper alone or fiber alone or with GBIC modules for field interchangeability between either copper or fiber.

Next, the high speed data stream is in NRZ format and is encoded with a code such as 8b/10b which is DC balanced so that at frequencies around the subchannel carrier frequency there is much less energy content in the Fourier spectrum components than in the higher frequency components. The subchannel data is used to modulate a subchannel carrier which is within the link passband (including any lower frequency limitations caused by PC blocking capacitors used for AC coupling) and is also in the portion of the low frequency portion of the spectrum of the high speed data which is heavily suppressed by the DC balanced encoding.

The high speed data usually has a bit rate of 1 GB or faster although the data rate of the high speed data stream is not actually intended to be a claim limitation or a defining characteristic of the preferred genus.

The preferred species within the preferred backward compatible genus is designed for use with GBIC media interface technology and a selectable attenuator such that it can be used with either copper or fiber optic media. Switching of the media in the field can be done by changing the GBIC media adapter to the type used by the desired media and by adjusting the level of attenuation of the subchannel carrier so as to obtain acceptable levels of jitter in the high speed data receivers. The required attenuation of the subchannel carrier amplitude is greater in the copper media case than for the fiber optic case.

One preferred species in the backward compatible genus of the invention uses frequency shift keying modulation of the subchannel carrier and mixes the subchannel carrier so modulated with the high speed data pulse train by addition or superposition. This causes raising and lowering of the amplitudes of all points in the waveform of the high speed data pulse train in accordance with the modulated subchannel carrier signal waveform instantaneous amplitude. This is because the frequency of the subchannel carrier is so much lower than the 1 GB frequency of the high speed data. This combined signal will be passed through the media and the high speed data and subchannel receivers on the opposite end of the link if analog line drivers are used, so transition density of the high speed data would not be an issue in such a species. However, If any digital line driver for either copper or optical media is interposed between the summing junction and the media itself or exists at the receiver end, the resulting changes in amplitude level of the high speed data waveform does not survive transition through the digital line driver since the output voltage levels of a digital driver are not a function of the input voltage levels and are only a function of whether the input is a logic 1 or 0. In this case, the only effect of the presence of the subchannel data is pulse width modulation of the high speed data pulses. Transition density of the high speed data then becomes a key factor in whether or not sufficient energy from the subchannel data gets through to the subchannel receiver to be detected.

Fundamentally, any type of subchannel system that can communicate data bidirectionally or unidirectionally using a portion of the bandwidth provided by the media which is not carrying much energy of the high speed data spectrum which uses any modulation scheme not found in the prior art of subchannel systems falls within one of the two classes of species that define an acceptable subchannel transceiver.

Figure 13:
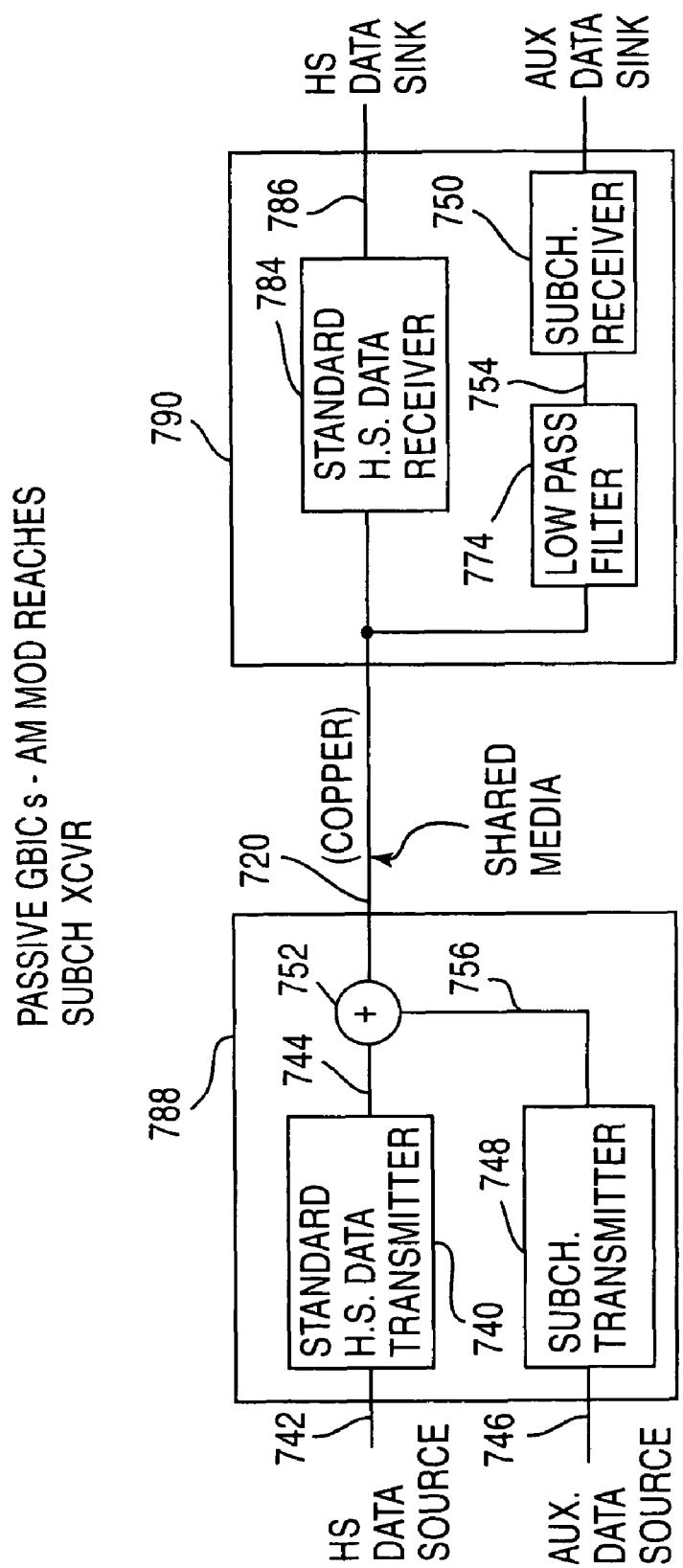
FIG. 13 illustrates one species of a subchannel system in the backward compatible genus wherein copper shared media is used and no limiting drivers or digital buffers are present to "filter" out amplitude changes in the combined signal and a linear subchannel receiver is used.

Referring to FIG. 13, there is shown a block diagram of one species of a subchannel system wherein copper shared media 720 is used and no limiting drivers or digital buffers are present to "filter" out amplitude changes in the combined signal and a linear subchannel receiver is used. An example of such a species would be where the combined signal generated at the output of a summing junction 752 was launched directly into a compensated or uncompensated copper media 720 using a passive GBIC interface (not shown) with no digital buffer stage therein and including only AC coupling capacitors. Another example is a copper media species where no GBIC technology is used and the combined signal from the summing junction is launched directly into the copper media through an AC coupling capacitor (not shown). AC coupling capacitors would be used in both these examples on the receiver side, but no media interface receiver or GBIC technology would be interposed between the media and the high speed data receiver.

In the embodiment of FIG. 13, a standard prior art high speed data transmitter 740 receives high speed data on bus 742 and outputs an NRZ waveform of 8b/10b encoded data having a data rate of 1.0625 gigabits per second on line 744 (the data rate and type of encoding can varies from species to species within the subclass represented by FIG. 13). The subchannel data in the form of an asynchronous binary data stream having a low data rate, typically 9600 baud, arrives on line 746. In the preferred embodiment, the subchannel data follows the RS-432 standard and is not DC balanced in that it can spend an arbitrary amount of time in the mark state before switching back to the space state. A subchannel transmitter 748 preferably converts the auxiliary data into a frequency-shift-keyed subcarrier with a center frequency of from about 500 kHz to about 1.5 mHz. This range is not exclusive and any frequency for the subchannel carrier giving adequate signal to noise ratio at a subchannel receiver 750 will suffice. FSK is not the only form of modulation that can be used in the subchannel transmitter. Any other form of modulation such as amplitude modulation etc. can also be used which cause either amplitude, frequency or phase variations of the subchannel carrier in accordance with the subchannel data. This is true since there are no amplitude excursion limiting circuits such as digital buffers present after the summing junction 752 or before the input 754 of the linear subchannel receiver 750 in species of this subclass which would limit transfer of the subchannel information to only perturbations of the zero crossing times of the leading and trailing edges of pulses in the high speed data signal. Preferably, the subcarrier frequency is 1.152 mHz and the FSK is used which shifts this frequency plus 29 kHz for logic 1 and minus 29, kHz for logic 0. The voltages of the modulated subcarrier on line 756 are added to the voltages of the high speed data signal on line 744 in summing junction 752, and the combined signal is launched directly into shared copper media 720 without the need for any media interface.

Figure 14:
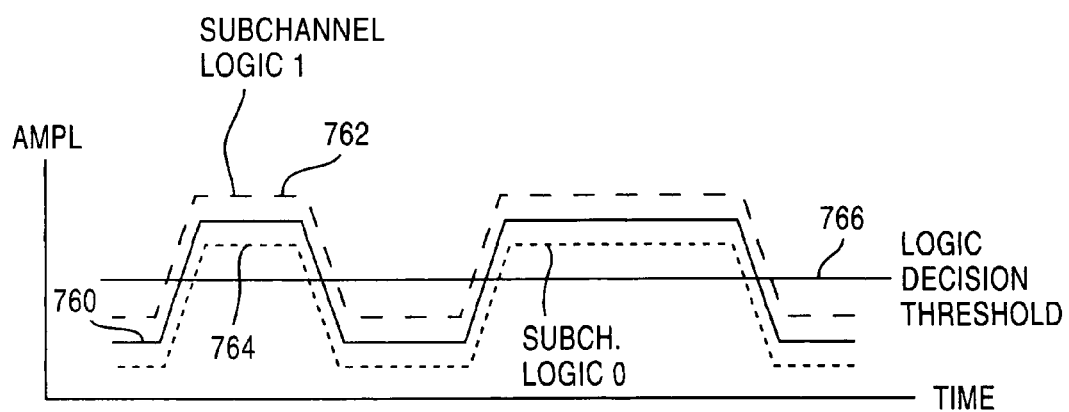
FIG. 14 illustrates the combined signal on the shared media resulting from the superposition at a summing node of the modulated subcarrier and the high speed data signal.
Figure 15:
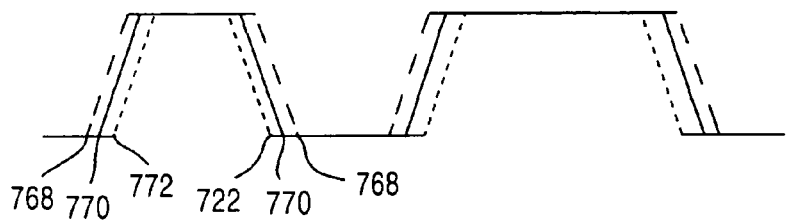
FIG. 15 shows the effect of passing the combined signal of FIG. 17 through a digital buffer thereby leaving the subchannel data present only in the form of pulse width modulation.

FIG. 14 illustrates the combined signal on shared media 720 resulting from the superposition at summing node 752 of the modulated subcarrier and the high speed data signal. This figure is applicable regardless of what type of modulation scheme is being used in all species using addition of the subcarrier to the high speed data at a summing node. Because the frequency of the subcarrier is so much lower than the bit rate of the high speed data, during any pulse interval in the NRZ high speed data, the subcarrier voltage appears to the high speed data as a constant value which either increases the amplitude or decreases the amplitude of the NRZ pulse. The NRZ high speed data signal on line 744 is shown as waveform 760. Waveform 762 represents the combined NRZ signal on media 720 when the subcarrier is in a positive half cycle. Waveform 764 represents the combined NRZ signal when the subcarrier is in a negative half cycle. Reference voltage 766 represents the logic decision threshold that is used on the receiving end to decode whether the voltage of the combined signal on media 720 is a logic 1 or logic 0 during any particular bit time. For copper media, this logic decision threshold is usually 0 volts. For fiber optic media, it is usually ½ power where the highest amplitude in the waveform is defined as full laser power and the lowest amplitude in the waveform is defined as 0 laser power. Note how the amplitude variations also perturbs the times of crossing of the logic decision threshold at both the leading and trailing edges of each NRZ transition because of the non-zero rise and fall times of these transitions. FIG. 18 shows the effect of passing the combined signal of FIG. 17 through a digital buffer. The digital buffer removes the amplitude variations and leaves only the perturbations of the times of crossing of the logic decision threshold. Waveform 768 represents the resulting combined waveform during positive half cycle of the subcarrier waveform and waveform 772 represents the resulting combined waveform during a negative half cycle of the subcarrier waveform. Waveform 770 is the resulting combined waveform when no subchannel carrier voltage is present. It is apparent from FIG. 15 that the subchannel information in cases where limiting digital buffers are present between the summing junction and the subchannel receiver is passed via only pulse width modulation of the NRZ format high speed data. The pulse width modulation of the NRZ signal caused by the subcarrier shown in FIG. 15 appears to the high speed data receiver as jitter. Therefore, it is important to limit the amplitude of the subcarrier injected into summing junction 752 so as to limit the amount of jitter seen by the high speed data receiver to an amount that is tolerable and which will not cause loss of synchronization lock by the high speed data receiver.

Figure 16:
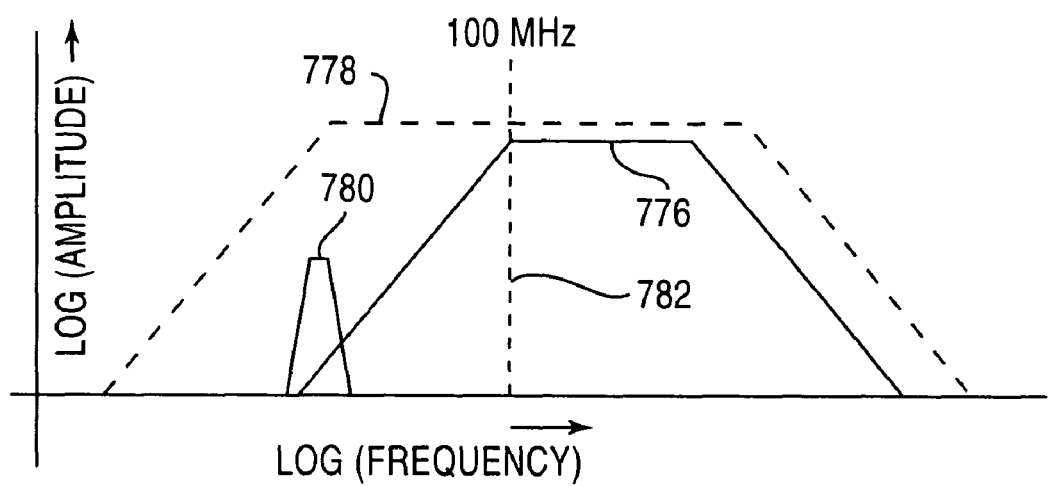
FIG. 16 shows the relationship between the Fourier spectrum of the high speed NRZ data, the bandwidth of the link, and the Fourier spectrum of the subchannel signal for one gigabit NRZ 8b/10b encoded data and a subchannel carrier frequency of approximately 1 mHz.

Returning to the consideration of the receiver side of the system of FIG. 13, the combined signal on shared media 720 is applied directly to the input of a conventional high speed data receiver. Also, the combined signal is applied to the input 754 of a linear subchannel receiver 750 through a low pass filter 774 which functions to separate the subchannel signal from the high speed data signal and prevent the high-power, high-speed data signal from overwhelming the subchannel receiver. FIG. 16 shows the relationship between the Fourier spectrum 776 of the high speed NRZ data, the bandwidth 778 of the link, and the Fourier spectrum 780 of the subchannel signal for one gigabit NRZ 8b/10b encoded data and a subchannel carrier frequency of approximately 1 mHz. The bandwidth 778 of the link rolls off at some frequency above zero because of AC coupling requirements. The 3 dB rolloff 782 of the spectrum of the high speed data is at about 100 mHz, but the energy in the high speed data spectrum in the vicinity of the subchannel carrier is nonzero.

In the embodiment of FIG. 13, the amplitude of the frequency components in the subchannel spectrum 780 of FIG. 16 must be sufficiently high to be detectable over the noise from the high speed data signal that gets through low pass filter 774, but not so high as to cause excessive jitter in the high speed data receiver 784. Excessive jitter is defined as enough to cause either an unacceptably high bit error rate in the recovered high speed data stream on line 786 or loss of synchronization by the high speed data receiver 784. The amplitude variations caused by addition of the subcarrier signals directly affect the amount of jitter. Thus, the amplitude of the subchannel carrier on line 756 must be controlled so as to get sufficient amplitude to detect the subchannel signal without causing excessive jitter. Where the amplitude variations get through the link, this is easy since more subchannel signal energy gets through the link in the embodiment of FIG. 13 than in embodiments were digital buffers are present to remove the amplitude variations and leave only pulse width variations.

Because one example of a species in accordance with the teachings of FIG. 13 is use of a known passive GBIC, there is the possibility that a user may try to use the subchannel technology of FIG. 13 with either a known active GBIC adapted for copper media or a known active GBIC adapted for fiber optic media. The subchannel transceiver embodiment of FIG. 13 will work in such situations so long as certain adjustments are made. GBICs are media interface devices that accept digital data and drive it onto a particular media type and which can be plugged into or unplugged from sockets on the circuit boards of the hub or node in which the subchannel transmitter resides. With either active copper GBICs or active fiber GBICs, a digital buffer is in the GBIC circuit which will eliminate any amplitude variation of the combined signal launched into the shared media from the GBIC leaving only the pulse width modulation of the NRZ combined signal to carry the subchannel information. In such a case, the injection amplitude of the subcarrier on line 756 must be adjusted to inject a little more power. The amount of power injected must be enough to force the amplitude of the subchannel components in spectrum 780 to be high enough to be detected over the noise at input 754 to the subchannel transceiver in the frequency range of the subcarrier but not so high as to cause excessive jitter.

To aid in the reception process, the upper corner of the low pass filter 774 is set so as to exclude as much low frequency energy as possible from the high speed NRZ data spectrum in the vicinity of the subcarrier frequency while passing the subcarrier spectral components. The low pass filter is designed to have a high input impedance so as to not load down the high speed data signal and distort it at the input to the high speed data receiver. For a subcarrier having a frequency of 1 mHz, the upper 3 dB corner of the low pass filter transfer function is set at approximately 3 mHz. Note that no high pass or bandpass filter is put between the shared media 720 and the high speed data receiver 784. This is done so as to not remove any low frequency components of the combined signal from the input to the high speed data receiver since removal of these low frequency components distorts the high speed data waveform, and the subchannel spectral components are not powerful enough to impede normal reception in high speed receiver.

The low pass filter output 754 is coupled to the input of the subchannel receiver which amplifies the subchannel signal which recovers the subchannel data therefrom.

A subclass of subchannel transceivers is represented by FIG. 16 with copper high speed data transmission media and passive GBIC. In this subclass, no active GBICs with digital buffers are present to block amplitude variations in high speed data waveforms on the shared media caused by the subchannel data injection. This subclass of subchannel transceivers where amplitude variations in the combined signal reach the subchannel receiver 750 is much less susceptible to noise interfering with reception of the subchannel signal. This is because the voltage of the subchannel Fourier components are much higher than in the genus of subchannel transceivers where digital buffers are present to eliminate the amplitude variations and leave only pulse width modulation of the high speed data to carry the subchannel information. The subclass of subchannel transceivers using passive GBIC where amplitude variations in the high speed data waveform caused by the injection of subchannel information and these amplitude variations reach the subchannel receiver is not dependent upon transition density of the high speed data and do not require a bounded transition density. As such, in networks where passive GBIC can be used, this subclass of subchannel transceivers is preferred.

Figure 17:
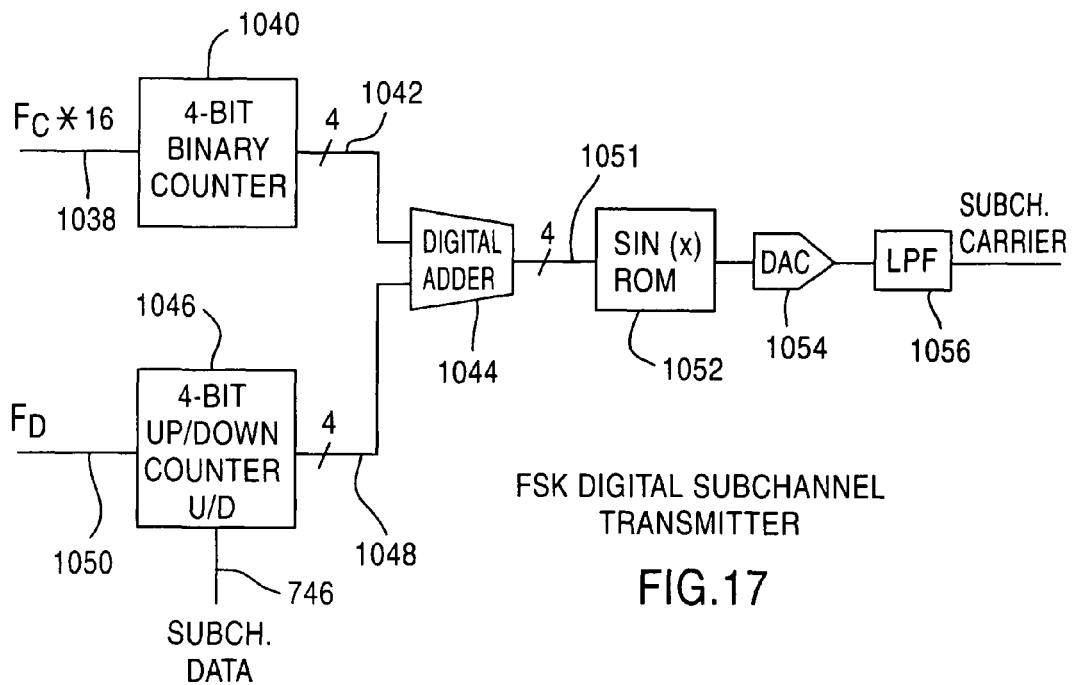
FIG. 17 is a diagram of a less expensive frequency shifted keyed subcarrier transmitter.
Figure 18:
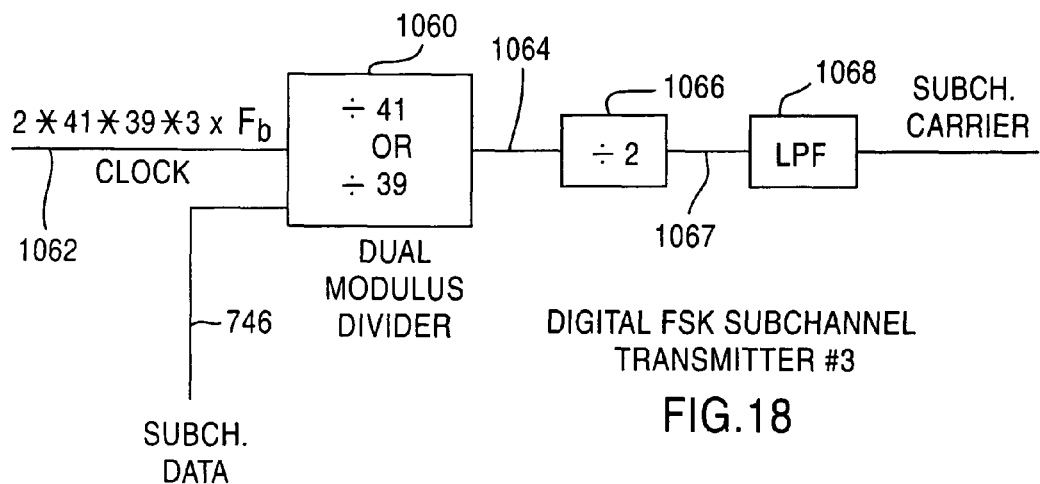
FIG. 18 is a block diagram of a simple subchannel FSK transmitter using a dual modulus divider.

FIG. 17 is a diagram of a less expensive frequency shifted keyed subcarrier transmitter. A four bit binary counter counts clock pulses of a clock signal on line 1038 and outputs the count on bus 1042 which is coupled to one input of a digital adder 1044. The clock signal on bus 1038 is 16 times the frequency of a desired center frequency $F_c$ for the subchannel carrier. A four bit up/down counter has its output coupled via bus 1048 to the other input of digital adder 1044. The count input of the up/down counter is coupled to a clock via line 1050 which has a frequency which is equal to the 16 times the amount of deviation in frequency desired for the mark and space frequencies from the center frequency of the subchannel. The up/down control input of the up/down counter is coupled to receive the subchannel data via line 746. The output of the digital adder 1044 is a stream of phase numbers which are coupled to the address input of a sin(x) ROM 1052 that stores the corresponding amplitude values of a sine wave for each phase value in a storage location corresponding to each phase value. The output amplitude numbers from the ROM are input to video speed DAC 1054 for conversion to an analog signal which is smoothed out by low pass filter 1056. Typical clock rates are $F_c$=120 times the bit rate of the subchannel data, $F_b$, and $F_d$=3 times $F_b$. A typical value for $F_b$ is 9.6 kHz. The deviation $F_d$ is actually more than is needed for this bit rate $F_b$, so higher bit rates for the subchannel data can be supported. Conversely, a smaller deviation may be selected, and this improves the signal-to-noise ratio in the receiver because a narrower bandpass filter bandwidth may be selected. With the current deviation, the mark and space frequencies are about 60 kHz apart and this requires a bandpass filter in the receiver with a bandwidth which is large enough to pass both frequencies. With currently available filter chips, a 100 mHz bandwidth filter is the closest choice available, and this causes excess noise to be let into the frequency demodulation part of the receiver. If a custom bandpass filter is built, a smaller bandwidth can be designed in, and this problem is mitigated. However, it is cheaper and easier to buy a filter chip, and since the deviation is more than is needed for detection, a smaller deviation can be chosen to give adequate detection while allowing a bandpass filter which is commercially available with a smaller bandwidth to be selected.

In operation, the transmitter of FIG. 17 generates 16 amplitude values at the input of DAC 1054 for every 16 ticks of the clock on line 1038 absent the effect of the subchannel data. When the subchannel data is a logic 1, the up/down counter 1046 counts up at the rate of $F_d$, and these numbers are added to the numbers on line 1042 thereby causing digital adder 1044 to reach the maximum number that can be expressed in 4 bits sooner and roll over to 0000. The roll over to 0000 marks the end of one cycle. This shortens the period thereby raising the frequency $F_c$ by the value $F_d$, i.e., the mark frequency. When the subchannel data is logic 0, the up/down counter counts down from zero at the rate of $F_d$ and these negative numbers, when added to the numbers on bus 1042 cause the digital adder to reach it maximum and roll over to 0000 slower than otherwise would be the case if the up/down counter was inoperative. This lowers the frequency of the sine wave generated by the DAC to the space frequency.

It is possible to further simplify the transmitter of FIG. 17 in some embodiments by eliminating the DAC and sin(x) ROM and use only the low pass filter 1056 fed by the most significant bit on bus 1051. If the up/down counter 1046 is not operating, the MSB will be at logic 1 for 8 ticks of the clock on line 1038 and logic zero for the next 8 ticks thereby establishing a square wave at the frequency $F_c$. If the subchannel data is logic 1 and the up/down counter is working, the MSB will be advanced in phase by one tick of the clock on line 1038 every 40 ticks thereof. In other words, the mark frequency will be generated as $F_m$=41/40*$F_c$. Likewise, if the subchannel data is logic 0, the MSB will be retarded in phase by one tick of the clock on line 1038 every 40 ticks thereof to generate a square wave having the space frequency of $F_s=39/40*F_c$. The problem with this square wave subchannel carrier frequency generation process is that the Fourier spectrum of a normal square wave with a regular period contains only odd harmonics of the fundamental $F_c$, while the perturbed period square waves at the mark and space frequencies all have spurious frequency components which are an additional source of noise to the subchannel receiver.

An even simpler form of FSK subchannel transmitter is shown in FIG. 18. In this embodiment, a dual modulus divider circuit 1060 is used to divide the clock signal on line 1062 by a divisor of either 41 or 39 depending upon whether the subchannel data on line 746 is a logic 1 or logic 0 and a mark or space frequency is to be generated. The clock signal on line 1062 has a frequency which is twice the lowest common multiple of the deviation frequency $F_d$. The clock frequency on line 1062 is $2*41*39*F_d$.

The output of the dual modulus divider on bus 1064 is divided by 2 by circuit 1066 and the resulting square wave represented by the MSB on line 1067 is filtered by a low pass filter 1068. The advantage of the embodiment of FIG. 18 is that it does not generate any spurious noise. The embodiment of FIG. 18 may be further simplified by eliminating the divide by two circuit 1066 and reducing the frequency of the clock on line 1062 to $41*39*F_d$.

Figure 19:
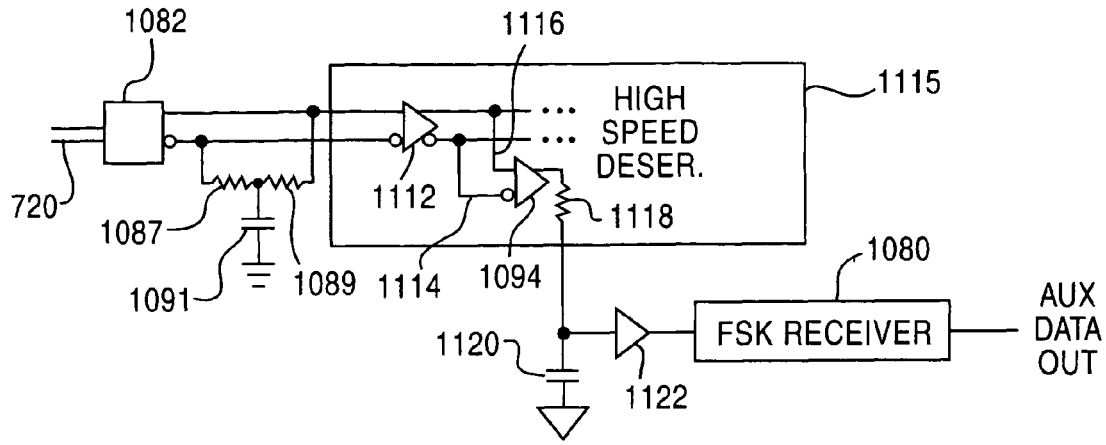
FIG. 19 is an alternative embodiment of a subchannel receiver which is useful in a proprietary link where access to the internal circuitry of the high speed data receiver is possible.
Figure 21:
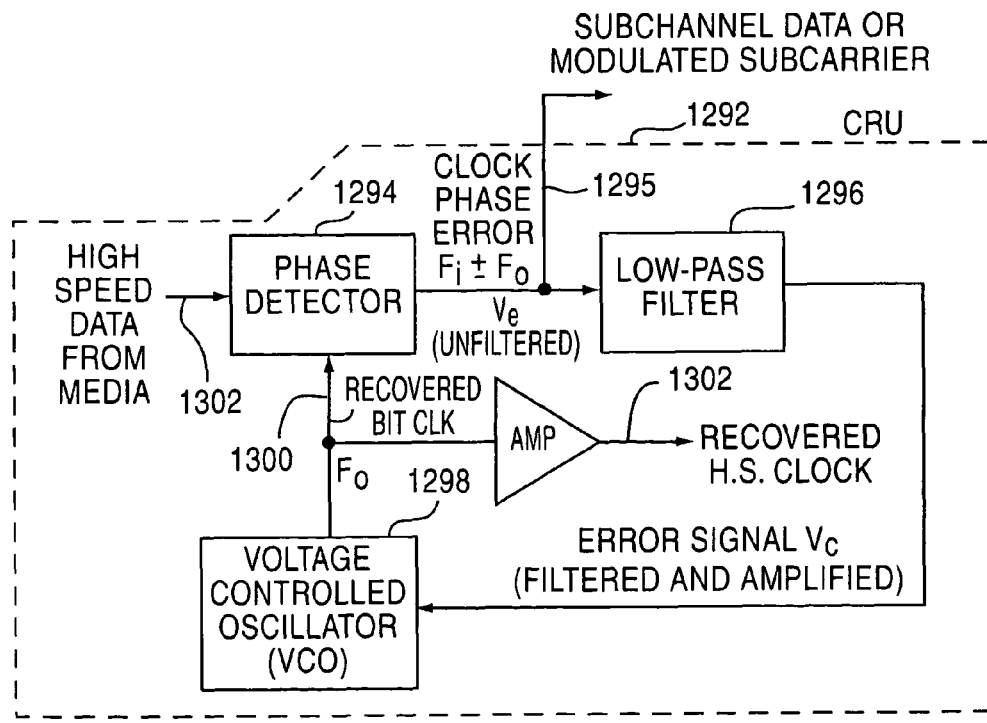
FIG. 21 is a block diagram of a phase locked loop clock recovery circuit which is used both to recover the high speed clock as well as the subchannel data for the transmitter of FIG. 31.

Referring to FIG. 19 there is shown an alternative embodiment of a subchannel receiver which is useful in a proprietary link where access to the internal circuitry of the high speed data receiver 1115 is possible. In this embodiment, the subchannel tap is taken after the digitally buffered input stage 1112 of the high speed data receiver. A pair of lines 1114 and 1116 carry the combined differential signal to differential amplifier 1094 for common mode rejection and conversion to singled ended operation. The output of amplifier 1094 is passed through an RC low pass filter comprised of resistor and capacitor 1120. Amplifier 1122 couples the filtered signal to the input of the FSK receiver 1080. The advantage of this embodiment is that the gigabit data path is not connected to any subchannel circuitry so no parasitics from subchannel circuitry can load down or distort the high speed data. Further, the function of common mode rejection and conversion to single-ended operation is now done on the high speed receiver chip and does not have to be performed by external components thereby reducing the cost of the receiver.

Other Alternative Embodiments

Figure 20:
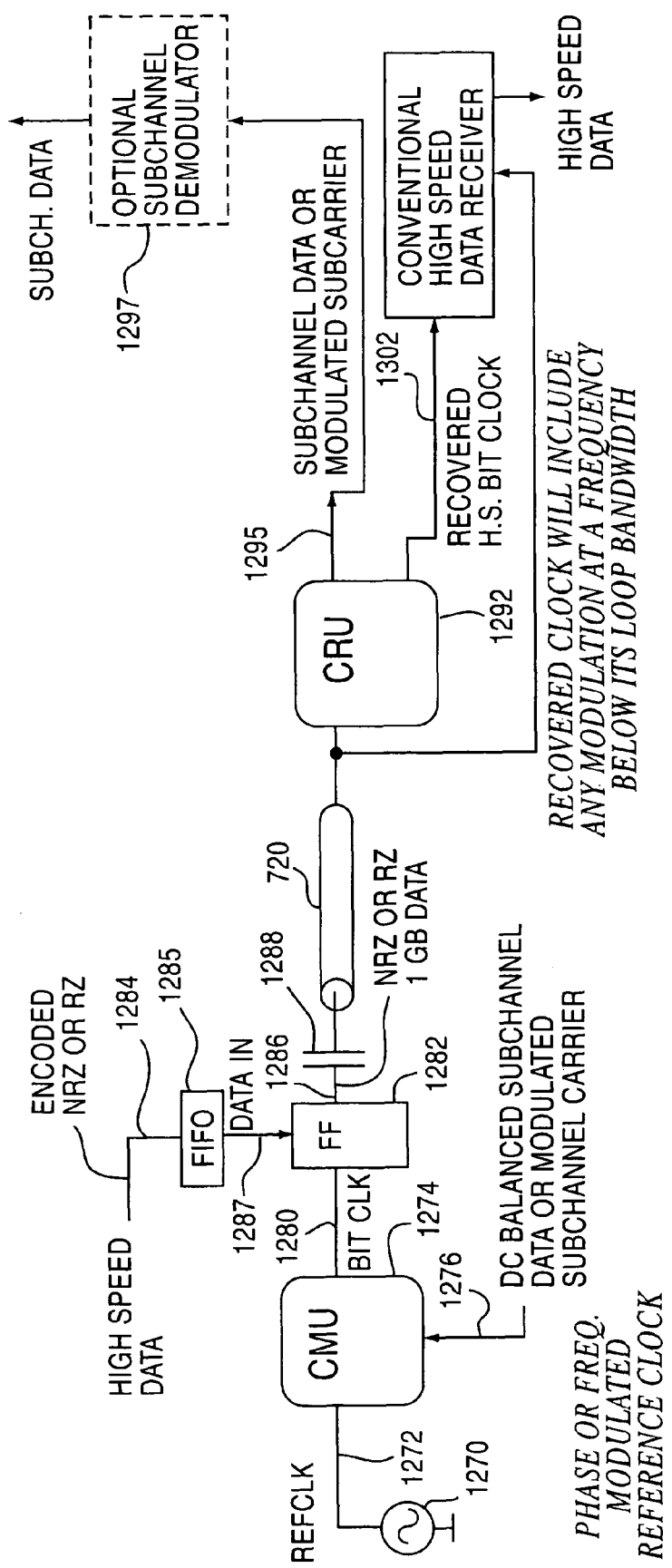
FIG. 20 shows an alternative subchannel embodiment in the proprietary link genus using modulation of the phase or frequency of the high speed data clock using the subchannel data.

FIG. 20 shows an alternative embodiment using modulation of the phase or frequency of the high speed data clock using the subchannel data. This species is in a subclass of clock modulation species within the proprietary link genus since it requires access to the high speed transmitter circuitry so as to modulate the high speed data clock before it is used to synchronize the high speed data to the bit times defined by the high speed clock. The characteristics that all species within this genus of non-backward compatible clock modulation species share are: either frequency or phase modulation of the high speed data clock with the subchannel data is used; either RZ or NRZ format high speed data can be sent; the subchannel data does need to be DC balanced or is modulated onto a subcarrier frequency so that the average clock frequency feeding the high speed data re-clocking circuit is equal to the bit generation frequency of the high speed data source to prevent FIFO overflow or emptying; there is no need for a DC balanced encoding scheme for the high speed data and transition density bounding is not required, but the high speed data does need to be encoded in such a way that the clock can be recovered from the high speed data bitstream.

In this embodiment, a high speed data clock 1270 generates a constant phase clock signal on line 1272. A Clock Modulation Unit (CMU) 1274 receives the constant phase clock signal on line 1272 and receives the subchannel data on line 1276. The CMU alters the phase or frequency of the clock signal in accordance with the subchannel data. These alterations are small enough in phase or frequency so as to prevent the phase locked loop in the clock recovery unit of the high speed data receiver from losing lock but large enough to convey the subchannel data.

The resulting modulated clock signal is coupled via line 1280 to the clock input of a flip flop 1282. This flip flop receives at its data input via line 1284 the encoded RZ or NRZ format high speed data bitstream from a FIFO buffer 1285. The FIFO buffer is used because the clock rate of bit clock 1270 normally matches the rate of generation of bits of the high speed data stream, but when the clock rate is modulated, there is slippage between the two rates. The FIFO 1285 functions to "take up the slack" when necessary.

The FIFO presents data on line 1287 in the order received such that the data is clocked into the data input port of flip flop 1282 at the rate of the modulated bit clock on line 1280 so as to be resynchronized with the bit clock on line 1280 and then is presented on line 1286. Because a sustained difference in the clock rate of clock 1270 and the rate of generation of the high speed data bits would result in overflow or complete emptying of the FIFO, the subchannel data on line 1276 is encoded so as to be DC balanced, or is modulated onto a subcarrier frequency so that the average clock frequency on line 1280 is equal to the bit generation frequency of the high speed data source. If the subcarrier approach is used, the high speed data does not need to be DC balanced encoded because the high speed data Fourier spectrum frequency components do not affect the recovered clock phase in which the subchannel information is carried. However, regardless of whether a subcarrier is or is not used, the high speed data coding and transmission format must be compatible with the high speed data receivers in the system.

The high speed data re-clocking flip flop 1282 synchronizes the high speed data bitstream to the modulated clock and outputs the result on line 1286. The resulting combined signal is AC coupled to the media via capacitor 1288 and is injected into the shared media 720 using an appropriate media interface (not shown). Any of the media interface adapters previously described or direct injection (copper only) can be used.

At the receiver end of the shared media, a conventional clock recovery unit (CRU) 1292 receives the high speed data signals and recovers the clock signal using a phase locked loop like that shown in FIG. 32. The phase locked loop has a control loop with a loop bandwidth which is large enough to include the Fourier spectrum of the subchannel modulation. That is, a phase detector 1294 in the CRU PLL must be able to detect the highest rates of expected changes in phase or frequency in the high speed clock signal caused by the subchannel data. Also, a low pass filter 1296 must have a passband sufficient to pass substantially all the Fourier components in the error voltage on line 1295 generated by the phase detector including, the Fourier components in the low frequency range generated by the subchannel modulation. The low pass filter 1296 is present to filter out high frequency products of the mixing of the frequencies of the output of a voltage controlled oscillator 1298 on line 1300 with the incoming noise corrupted NRZ or RZ format high speed data stream on line 1302. The signal on line 1300 is the recovered high speed data bit clock.

The phase detector detects the phase difference between the recovered high speed clock on line 1300 and the transitions in the high speed data signal that occur on clock transitions at the transmit end. Because the passband of the low pass filter in the phase locked loop is selected such that the spectrum of phase or frequency changes in the bit clock caused by the subchannel data pass through the filter as part of the error signal output on line 1295 by the phase detector, the error signal output by the phase detector is the encoded subchannel data or the modulated subchannel carrier (called the subcarrier). In the case where the subchannel data was DC balanced encoded, the subchannel data on line 1295 can be used directly. However, in the case where the subchannel data was modulated onto a subcarrier, optional subchannel demodulator 1297 is coupled to line 1295 to recover the subchannel data by demodulating the subcarrier.

The error signal on line 1295 causes the voltage controlled oscillator 1298 of the phase locked loop to change its frequency of operation to track the phase changes in the clock signal encoded in the high speed data. Thus, the cleaned up recovered clock signal on line 1302 will also be phase modulated in accordance with the subchannel data. The subchannel data can be recovered from the error signal on line 1295 by decoding it or applying the modulated subchannel carrier to a subchannel demodulator.

Figure 22:
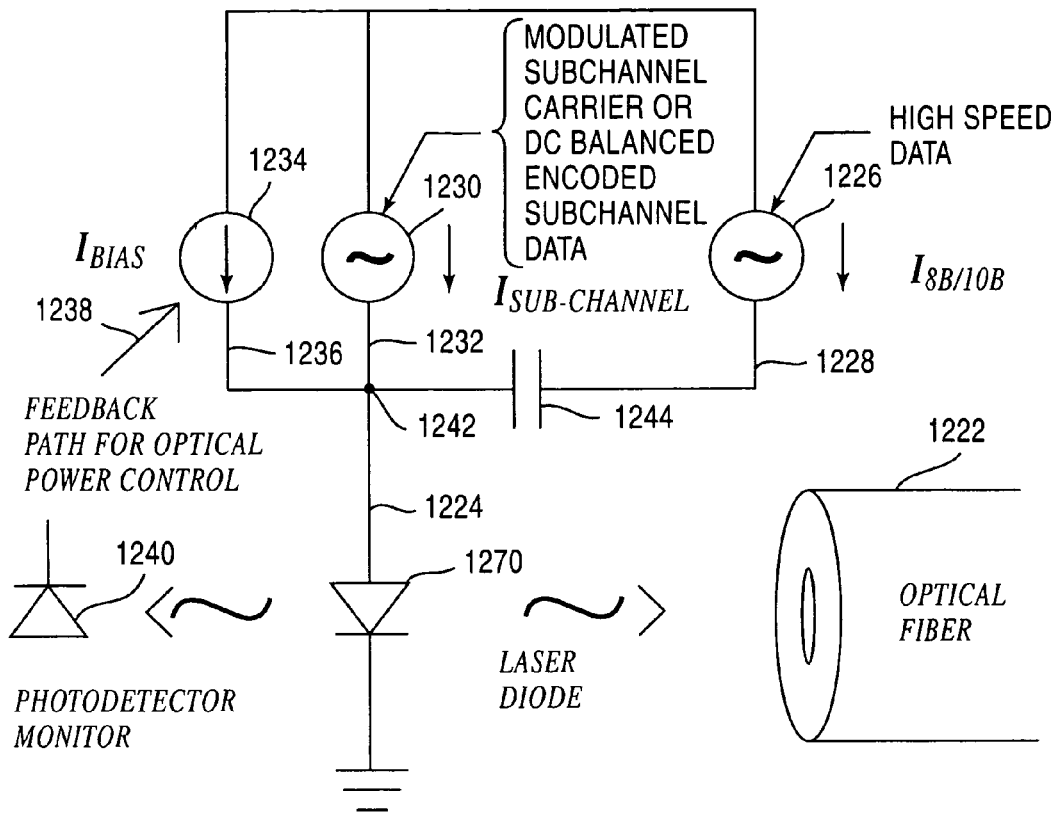
FIG. 22 schematically illustrates a subchannel species in the proprietary link genus having a transmitter structure to implement modulation of laser diode power simultaneously with subchannel data and high speed data.

FIG. 22 schematically illustrates a subchannel species in the proprietary link, non-backward compatible genus having a transmitter structure to implement modulation of laser diode power simultaneously with subchannel data and high speed data. In this embodiment, a laser diode 1220 generates light the intensity of which is proportional to the current passing through the laser diode. The current on line 1224 coupled to the anode of the laser diode is modulated by three current sources. Current source 1226 outputs current on line 1228 which is modulated in accordance with the high speed DC balanced data, e.g., 8b/10b data encoded NRZ baseband transitions. Current source 1230 outputs current on line 1232 which is modulated in accordance with either encoded subchannel baseband data which is DC balanced or a subcarrier in the 1 mHz frequency range which is modulated in any fashion with the subchannel data. Of course if AC coupling capacitors exist anywhere in the transmitter or receiver which would block the baseband subchannel data signal from getting through to the subchannel receiver, then a subchannel carrier modulated with the subchannel data must be used. This modulation can be phase, frequency or amplitude modulation. Further, the subcarrier signal on line 1232 can be pulse position modulated, or QAM or QPSK modulation of two subcarriers at a frequency in the suppressed portion of the high speed data spectrum but separated in phase by 90 degrees. Also, the signal on line 1232 can be straight baseband subchannel data as well. Basically, any conventional modulation scheme will work to modulate the subcarrier, and a conventional demodulator may be used in the subchannel receiver after separating out the low frequency subcarrier from the high speed data using a low pass filter.

When the subchannel current on line 1232 is summed with the high speed data current on line 1228, the resulting light intensity variations would be the superposition of the low frequency subchannel signals and the high frequency transitions of the 8b/10b encoded NRZ or RZ baseband transitions. The resulting transmitted signal would be baseband 8b/10b encoded NRZ or RZ format data expressed as light intensity variations which have a baseline or reference level which varies with the subchannel data.

Alternatively, the subchannel current source 1230 can be used to generate a current the instantaneous value of which is used to multiply the high speed data current in line 1228. Assuming that a proprietary link is in use with no digital buffers between the transmitter and the subchannel receiver, the subchannel data could be extracted by peak detecting the high speed data and integrating the output of the peak detector.

Returning to the consideration of FIG. 22, the embodiment shown uses a summing approach because the currents from the three current sources sum at node 1242 to drive the laser diode.

Because of the inherent low frequency noise of laser diodes, bias current source 1234 modulates the current on line 1236 in accordance with a feedback error signal on path 1238. Laser diodes are unstable in terms of the light intensity they put out in the frequency range below 50 mHz, and they therefore need stabilization of their light intensity output absent any incoming drive signal just to quiet the quiescent signal down to an acceptable level of noise. This is done by the combination of a photodetector 1240 and current source 1234. The photodetector is positioned so as to sense the intensity of light output by the laser diode, and generates a signal proportional to that light intensity. This signal is used to generate an error signal on data path 1238 which controls the amount of current injected into line 1236 by the bias control current source 1234. Because of the noisy nature of laser diodes at low frequencies where the subchannel signal will reside, forward error correction or Viterbi decoding can be used to reduce the bit error rate in the subchannel data. Further, higher error rates can usually be tolerated on the management and control channels because traffic volumes are lower. Therefore, larger numbers of retries do not adversely affect throughput enough to be a problem.

The three modulated currents on lines 1228, 1232 and 1236 are summed at node 1242 and the sum current drives laser diode 1220. A DC blocking capacitor 1244 couples the high speed DC balanced data modulated current on line 1228 to node 1242 while blocking the low frequency modulated currents on line 1232 and 1236 from entering line 1228.

Figure 23:
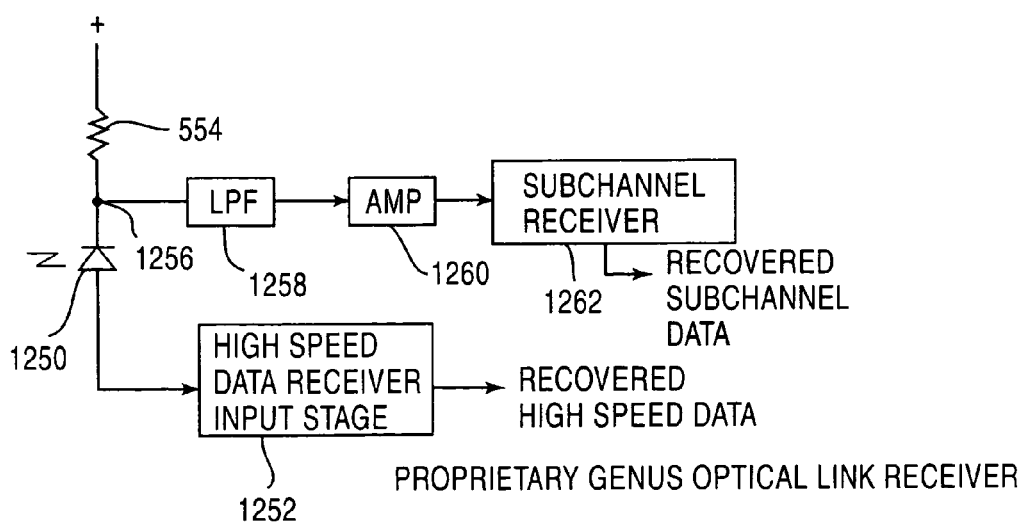
FIG. 23 represents a proprietary link receiver system for the transmitter design of FIG. 33.

FIG. 23 represents a proprietary link receiver system for the transmitter design of FIG. 22. A photodiode 1250 senses the light pulses arriving from the shared media and creates a current therethrough which varies with the intensity of the light pulses. A high speed data receiver with a low input impedance transconductance amplifier input stage (not shown) is connected to the anode of the photodiode to receive the combined signal and recover the high speed data therefrom. The cathode of the photodiode is coupled to a bias source through a biasing resistor. The current flow variations in resistor 1254 caused by the light intensity variations in the fiber optic media are converted to voltage variations on node 1256. Low pass filter 1258 blocks high frequency components from the high speed data from reaching the narrowband subchannel receiver 1262 through narrowband preamplifier 1260. Optionally, a narrow bandwidth bandpass filter with a center frequency centered on the frequency of the subchannel carrier and an adequate bandwidth to include the subchannel spectrum may be inserted between the amplifier 1260 and the subchannel receiver. The subchannel receiver includes a demodulator which is appropriate to whatever type of modulation is in use.

Figure 24:
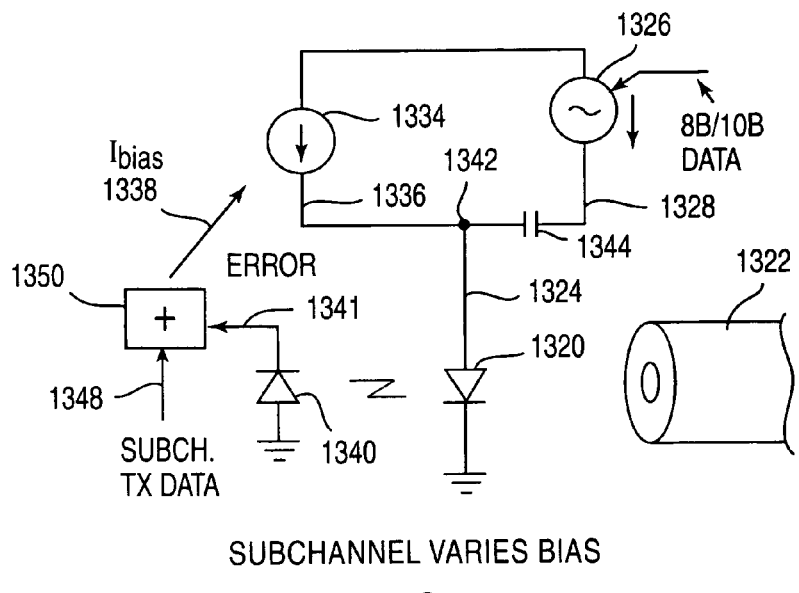
FIG. 24 represents an alternative embodiment for an optical subchannel transmitter wherein the subchannel information to be transmitted is injected into the bias control current source to alter the bias.

FIG. 24 represents an alternative embodiment for an optical subchannel transmitter wherein the subchannel information to be transmitted is injected into the bias control current source to alter the bias. Specifically, the laser diode 1320 is driven by two currents one of which represents the high speed DC balanced 8b/10b encoded data on line 1328, and the other of which represents the bias and subchannel data on line 1336. Current source 1334 generates a bias current which is modulated by the subchannel information and which varies with feedback information to stabilize the diode. Feedback information is generated as follows. Photodetector 1340 picks up light intensity from the laser diode 1320 and generates a proportional signal on line 1341. This signal is summed with a signal on line 1348 representing the subchannel transmit data in a summer 1350. The subchannel data on line 1348 is presented in DC balanced encoded form or as a subcarrier having a frequency in the portion of the suppressed spectrum of the high speed data and above the intrinsic laser diode noise is input on line 1335 to a control port of current source 1334, the subcarrier being angle modulated by the subchannel data. Of course if AC coupling capacitors exist anywhere in the transmitter or receiver which would block the baseband subchannel data signal from getting through to the subchannel receiver, then a subchannel carrier modulated with the subchannel data must be used.

The summer 1350 is a simple summing junction. Alternatively, circuit 1350 can be a differential amplifier which outputs error signal 1338 as the difference between the signals on lines 1341 and 1348. The combination of the signals on lines 1341 and 1348 is output as the error signal on path 1338 which controls the amount of current injected into line 1336.

Figure 25:
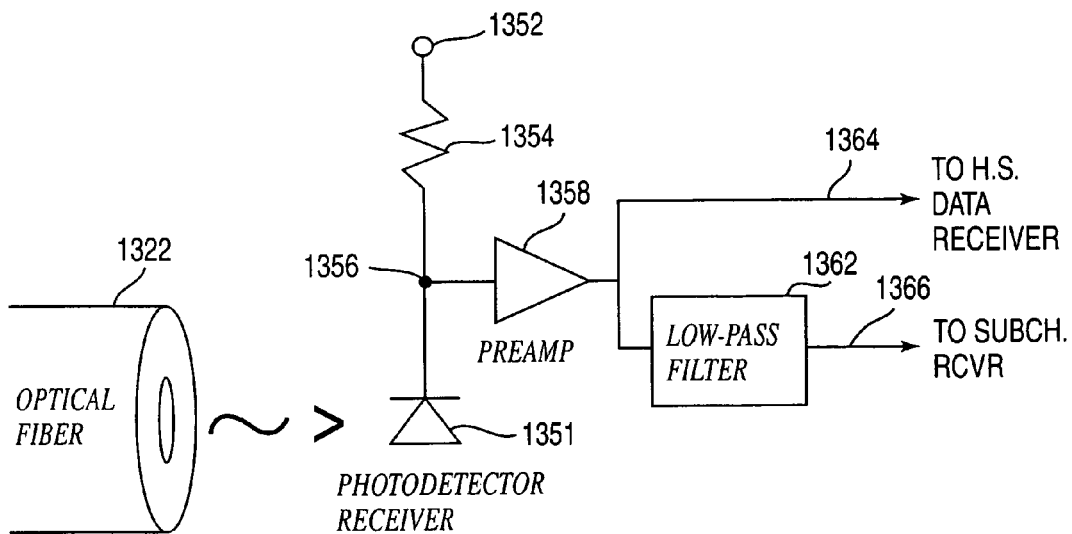
FIG. 25 represents a block diagram of an alternative receiver input network for a proprietary link where access to the media interface device design is available and where the shared media is an optical fiber.

FIG. 25 represents a block diagram of an alternative receiver input network for a proprietary link where access to the media interface device design is available and where the shared media is an optical fiber. The modulated light waves exit fiber 1322 and impinge upon photodetector diode 1351. This diode is coupled to a bias voltage supply (not shown) coupled to node 1352 through a load resistor 1354 which controls the level of quiescent bias current. The changing light intensity causes variations in current through the load resistor which causes changing voltage at node 1356. A wide bandwidth preamplifier 1358 amplifies the voltage signal at node 1356. The amplified signals are coupled directly to the input of a high speed data receiver (not shown) via line 1364 and to the input of a subchannel receiver (not shown) through a low pass filter 1362 and line 1366. The low pass filter has a passband with sufficient bandwidth and an upper rolloff frequency selected so as to pass all of the Fourier spectral components in the subchannel spectrum but to heavily suppress the higher power high frequency components of the high speed data spectrum. The subchannel receiver includes a demodulator/decoder appropriate to whatever form of modulation or encoding of the baseband subchannel signal has.

Preferred Digital Transmitter

Figure 26:
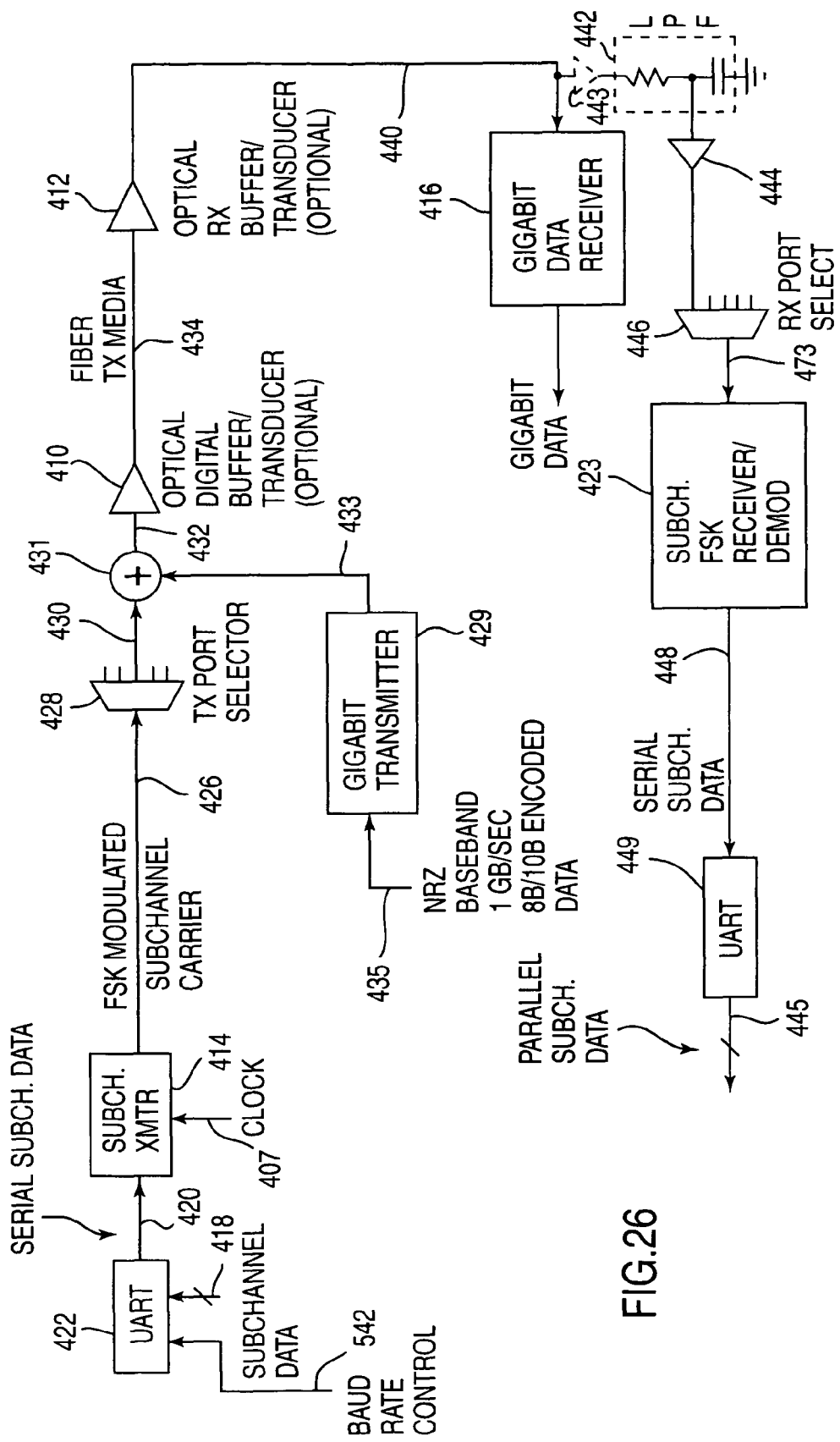
FIG. 26 is a block diagram of one FSK based species within the genus of embodiments that comprise the invention for use in systems where digital buffers at the input and output of the shared media.
Figure 29:
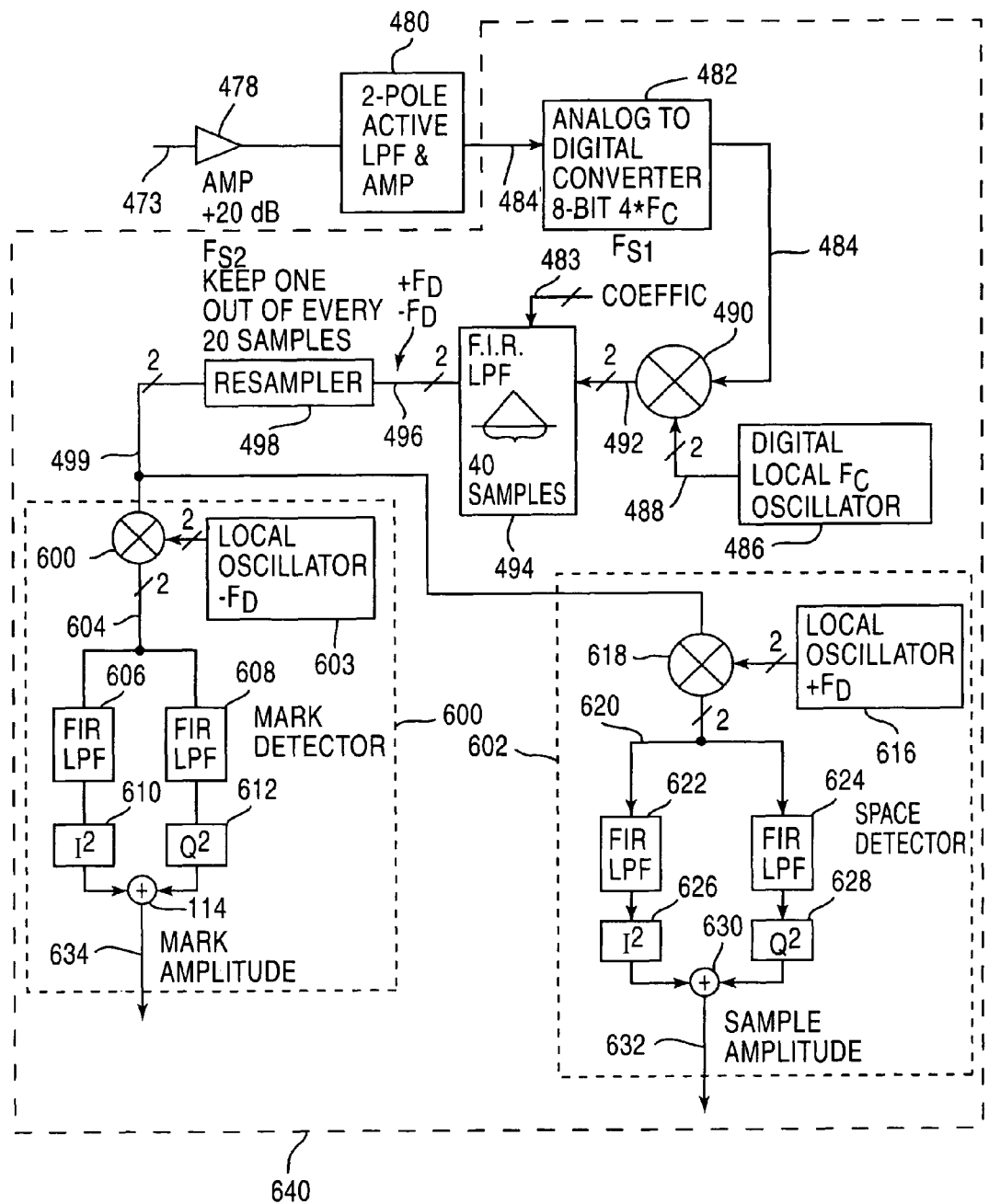
FIG. 29 is a block diagram of the preferred form of subchannel receiver to detect Mark and Space frequencies using narrow passband digital IF bandpass filters and separate detectors using digital filters designed to detect the relative intensity of Mark and Space frequencies in the output of the narrow passband IF filter.

Referring to FIG. 26, there is shown a block diagram of the preferred digital FSK based subchannel transmission system. This embodiment uses frequency shift keyed modulation implemented by subchannel transmitter 414. Although any commercially available frequency shift keying modulator chip such as the digital synthesizer chip disclosed in one of the parent applications and its equivalents may be used, a simple and inexpensive custom circuit embodiment is shown in FIG. 29. The subchannel transmitter receives a clock signal on line 407 which is set at 18.423 MHz in the preferred embodiment which is 1920*$F_b$ where $F_b$ is the baud rate of the subchannel data, which, in the preferred embodiment is 9600 baud.

FSK modulation is used so as to allow the subcarrier information to pass successfully through optional digital buffers 410 and 412. Since these buffers have outputs which have fixed logic levels, amplitude modulation of the high speed data by the subcarrier would not make it through the buffers 410 and 412. These electrical-to-light signal transducers 410 and 412 are digital because the amplitude of the output light from transducer 410 does not depend upon the amplitude of the incoming electrical signals. Whatever light intensity for a logic 1 is produced whenever the input signal exceeds the discrimination threshold on the input, regardless of by how much that threshold is exceeded. Similarly for the logic 0 light output intensity.

However, in systems where digital buffers 410 and 412 are not used such as where the high speed 1 Gbyte data is launched directly onto copper media, for example, other types of modulation could be used. Typically, for copper media connecting the gigabit transceivers together, digital buffers 410 and 412 are not used.

Systems which use other types of modulation such as modulation of the clock with the subchannel signal or amplitude modulation of the laser signal intensity on fiber media using the subchannel data, are disclosed in the parent application. Likewise, even in embodiments where digital buffers 410 and 412 are used, other types of modulation which can successfully pass through the digital buffers and not cause excessive jitter in the gigabit data receiver 416 could also be used.

In the embodiment shown in FIG. 26, parallel format subchannel data is supplied on bus 418 from any hardware or computer process source. This data is converted to a serial data stream on bus 420 by UART 422. This UART is of conventional design and is coupled to the data input of subchannel transmitter 414. The UART is optional, and in other embodiments, the parallel data on bus 418 can be applied directly to the data input of the subchannel transmitter. Likewise, in other embodiments, the hardware or software process which is supplying the subchannel data can supply serial format data to the subchannel transmitter. In the case where the subchannel transmitter receives parallel format data, it converts it to serial format data for use in generating Mark and Space carrier frequency shifts.

The UART 422 is structured, in the preferred embodiment, to have a flexible output baud rate of from 9.6 Kbaud to 56 Kbaud in small steps such that the baud rate can be changed by inputting one or more command bytes on bus 542 from the process controlling the subchannel computer (not shown). Any conventional UART design, including known variable baud rate designs can be used to implement UART 422. Since the subchannel receiver 423 is digital and uses digital passband filters (not shown in FIG. 26), the passband and selectivity of the receiver can be modified simply by changing the filter coefficients. The advantage of this structure is that when noise conditions are favorable, the UART can be ordered to send serial data at a higher baud rate, and the receiver filter coefficients can be changed to give the receiver passband the necessary wider bandwidth needed to receive the higher baud rate subchannel data. When noise conditions become less favorable, the UART 422 can be ordered to slow down its output baud rate and the filter coefficients of the subchannel receiver 423 can be changed to narrow the passband down to a bandwidth suitable for receiving a 9600 baud subchannel signal thereby rejecting greater amounts of noise and giving the receiver greater sensitivity and selectivity.

The subchannel transmitter, in this embodiment, implements frequency shift keyed modulation by generating a subchannel carrier at a frequency $F_c$ of 1.152 MHz and converts the digital subchannel data to subchannel carrier frequency shifts to Mark and Space frequencies, $F_m$ and $F_s$, respectively, which are, respectively:

$$F_m = \frac{41}{40} * F_c$$

$$F_s = \frac{39}{40} * F_c$$

The FSK modulated subchannel carrier is output on line 426 to the input port of a port selector switch 428 which functions to select to which output port of the host hub or switch to direct the subchannel transmissions. This switch 428 is present because the subchannel transmitter is usually implemented in a high speed data hub with many ports coupled to drop lines which are connected to various pieces of equipment in the network. The management and control process (not shown) needs to be able to communicate bidirectionally with each of the nodes on the network to manage the network. Since management and control data does not have to be sent to or gathered from all nodes simultaneously, it is less expensive to include only one subchannel transmitter in the hub and have the management and control process control switch 428 in accordance with which piece of equipment to which a management and control packet is to be transmitted.

The signal on line 430 is input to a summer 431. In reality, the summer 431 is just a summing junction since the signals to be added are analog and can be added by superposition. The other input to the summer is the gigabit data signal on line 433. This signal is output by conventional gigabit transmitter 429 acting on the NRZ baseband 8B/10B encoded data input on line 435.

One of the problems with the prior subchannel transceiver arrangements designed by the assignee is that manufacturing tolerances of the slew rate of the gigabit transmitter 429 caused unpredictable changes in the intensity of the subchannel modulation. The intensity of the subchannel pulse width modulation changes with the rise time of the gigabit data signal. This is because the intensity of the subchannel pulse width modulation is proportional to the ratio between the slew rate and the subchannel carrier voltage. Faster slew rates reduce the degree of deviation of the zero crossing for a given subchannel carrier voltage. Thus, if the slew rate were to be consistently faster, a higher subchannel carrier voltage could be applied to achieve the desired degree of deviation of the pulse width modulation. The problem with the prior design was that from one gigabit transmitter chip set to the next, the slew rate/rise time would change. This meant that with a fixed subchannel carrier voltage excessive zero crossing deviation would be produced in some units and not enough in others. Not enough deviation of the time of the zero crossings is a problem because the subchannel data cannot be recovered from the noise. Too much deviation of the time of the zero crossings is a problem because it is interpreted as jitter in the gigabit receiver and can cause loss of synchronization. There is a jitter budget in the gigabit receivers, but too much subchannel carrier voltage or any other factor that results in too much deviation of zero crossings will interfere with the reliability of the gigabit data transmissions.

As a measure of the degree of this problem, a 2:1 variation in the rise time from one gigabit transmitter to the next translates into a 6 dB uncertainty in the strength of the subchannel signal.

The combined signal on line 432, as modified by the digital buffer 410 (if present) propagates on fiber or copper media 434 to the receiver side. There another optional digital buffer 412 converts the signal from light to electrical. If buffer 412 is not present, it usually will be in embodiments where media 434 is some form of copper media. The output 440 of the buffer 412 is coupled to the input of gigabit data receiver 416 as well as to the input of a low pass filter 442. In alternative embodiments, an optional digital buffer 443 can be interposed between line 440 and the input to the low pass filter 442 functioning to isolate the filter 442 and minimize loading down of the high data signal on line 440 by the presence of the subchannel receiver. The function of the low pass filter 442 is to pass the subchannel frequency components while rejecting most of the high speed data frequency components. Since the subchannel carrier is nominally at approximately 1 MHz, the low pass filter 442 is designed to have an upper rolloff frequency which is usually between 2 and 5 MHz. The preferred 3 dB upper corner frequency is 1.6 MHz although this upper corner frequency is not particularly sensitive. This corner frequency will cause some attenuation at the subchannel carrier frequency, but the intensity of the subchannel FSK modulation is selected to be high enough that the attenuation is not a problem.

Typically, the subchannel receiver will be shared between multiple ports in a hub or switch, but there will be a gigabit receiver 416 and a low pass filter 442 for every port. The output of the low pass filter is coupled through an optional amplifier 444 to one input of a receiver port selector multiplexer 446. Each port will be coupled to one of the ports of this multiplexer. The output of the multiplexer is coupled to the input of the subchannel receiver 423 which functions to recover the subchannel data from the frequency shift keyed subchannel carrier signal output by the low pass filter 442, and output it in, typically, a 9600 baud serial data stream, on line 448. This serial data stream is converted back to a parallel data formation bus 445 by optional UART 449.

The Preferred Subchannel FSK Transmitter

Figure 27:
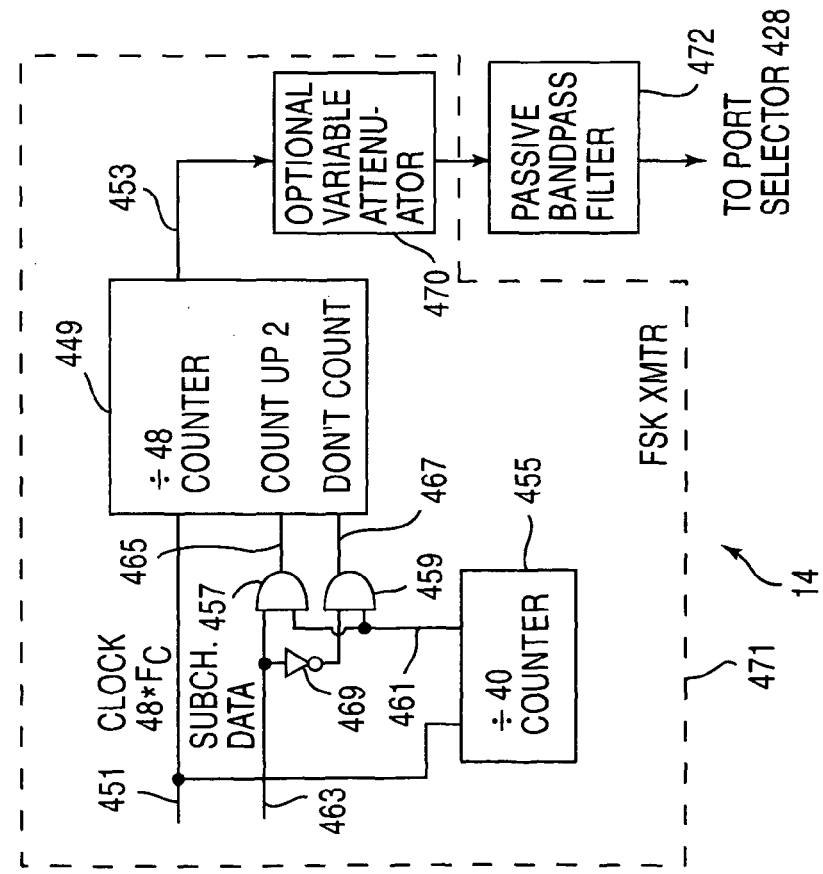
FIG. 27 is a diagram of the preferred form of digital FSK subchannel transmitter.

FIG. 27 is a block diagram of the preferred FSK digital subchannel transmitter custom circuit. In addition to the availability of commerically available FSK integrated circuits to perform this function, the FSK modulation of the subchannel data onto a subchannel carrier could also be implemented using a programmable digital signal processor. The control program would simply repeatedly read the logic state of the incoming subchannel data and call either a Mark or Space subroutine to generate an output carrier signal at the proper Mark or Space frequency. Preferably, software interrupts would be used to call the routines immediately upon a change in the logic state of the subchannel data. If a programmable digital signal processor with an on-board digital-to-analog converter is used, the function of the optional variable attenuator 470 can also be implemented on the DSP. The DSP embodiment is symbolized by dashed line 47.

Figure 28:
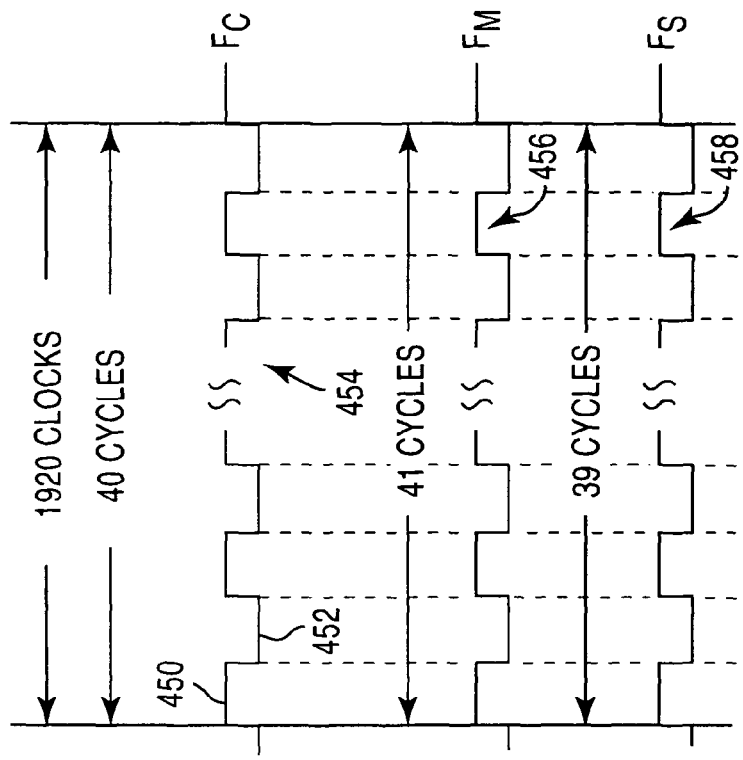
FIG. 28 is a timing diagram that shows how the Mark and Space frequencies for the subchannel carrier are generated over the interval of 1920 clocks.

The embodiment depicted in FIG. 27 is comprised of a divide-by-48 counter 449 which receives at its clock input 451 a clock signal which is 48 times the subchannel carrier frequency, $F_c$. Absent any modulation, during one cycle of the subchannel carrier, the counter 449 will output on line 453 a square wave whose positive half cycles, represented by half cycle 450 in FIG. 28, and negative half cycles, represented by half cycle 452 in FIG. 28, each have a duration of 24 clock periods. Since the Mark and Space frequencies only vary the subchannel carrier frequency by one part in forty, this presents some complications since neither the Mark nor Space period is an integer number of clock cycles. The clock frequency $48*F_c$ was chosen because it can be generated by a standard crystal and is convenient in implementing the subchannel FSK receiver/demodulator. In one alternative embodiment, the clock frequency is an integer multiple of both the Mark and Space frequencies, and a divider with a variable divide ratio is switched to divide the clock frequency down to the Mark frequency or the Space frequency appropriately based upon the input data. In another alternative embodiment, a numerically controlled oscillator (also known as a direct digital synthesizer) may be used to generate both the Mark and Space frequencies directly simply by changing the control bits which control the output frequency. Likewise, the Mark and Space carrier frequencies could also be generated by two separate Mark and Space frequencies oscillators with a switch that multiplexes between them based upon the subchannel input data.

In the preferred embodiment, the Mark frequency is generated by causing the divide-by-48 counter 449 to experience an extra count every 40 clocks. Thus, every 40 clocks of the clock on line 451, there will be an extra count transition on line 453 over the number of transitions that would have occurred if no FSK modulation was present. Thus, over the 1920 clock cycles of the clock on line 451 that it would normally take to output 40 cycles of the subchannel carrier square wave shown generally at 454 in FIG. 5, 41 cycles of the subchannel carrier signal will be counted out on output line 453 thereby defining the Mark frequency, as shown at 456.

Likewise, the Space frequency is generated by causing the counter 449 to skip a count every 40 clocks of the high speed clock on line 451. Thus, over the interval of the 1920 clock cycles that it normally takes to count out 40 cycles of unmodulated subchannel carrier, only 39 cycles of subchannel carrier will be counted out on line 53 thereby defining a Space frequency, as shown at 458.

These two FSK modulation operations are done using divide-by-40 counter 455 and AND gates 457 and 459. When counter 455 reaches a count of 40, it activates line 461. If the subchannel data on line 463 is a one at that time, a Mark frequency must be generated so the extra cycle of the subchannel carrier must be produced over the interval of 1920 clocks on line 451. Since the subchannel data is logic one, and line 461 is a one, AND gate 457 drives line 465 to logic 1. This causes the counter output on line 453 to advance by two counts on the next transition of the clock on line 451. If the subchannel data is logic 0 at the time line 461 is activated, then inverter 469 drives the input to gate 459 to logic 1 at the same time line 461 is logic 1. This causes gate 459 to drive line 467 to logic 1. This causes counter 449 to skip a count on the next transition of the clock on line 451. These extra counts and skipped counts every 40 clock cycles of the clock on line 451 are how the Mark and Space frequencies are generated over the interval of 1920 clock cycles.

An optional variable attenuator 470 is used to provide a selectable amount of attenuation of the amplitude of the subchannel carrier signal. If the type of media 434 is known and never will change, the amplitude of the subchannel carrier can be fixed by a fixed attenuator to give the desired degree of pulse width modulation intensity. However, if the amplitude of the subchannel carrier signal is set to achieve the desired amount of pulse width modulation for a fiber media and the type of media is changed to copper, some additional attenuation must be added to avoid excessive pulse width modulation induced jitter at the gigabit data receiver. This excessive jitter is caused by the switch to copper because of the higher losses in copper than fiber for gigabit signals causes by more leakage of the high frequency components through parasitic capacitances to ground and skin effect losses. The higher losses slows the rise times for the gigabit data, but the higher losses do not affect the lower frequency components of the subchannel signal as much. Thus, at the receiver, the superposition of the slower rise time gigabit data and the unattenuated subchannel causes excessive PWM. Variable attenuator 470 can be adjusted to reduce the amount of PWM at the gigabit receiver if copper media is substituted. The programmable attenuator is used in the embodiments disclosed in the parent case for the same reason.

An optional passive bandpass filter 472 is used to pass the fundamental of the subchannel carrier and reject the third harmonic and a sufficient number of the spurious frequency components caused by the irregular subchannel waveform. The bandpass filter rounds off the edges of the square wave of the subchannel carrier. If the bandpass filter is not used, at least a low pass filter that can suppress the third harmonic and control the slew rate of the subchannel carrier to be less than instantaneous should be used. A bandpass filter is preferred because it has at least two-poles and can be designed to provide very small or no attenuation at the subchannel carrier frequency and significant attenuation at the third harmonic frequency which is the desired characteristic. A simple one-pole low pass filter cannot be made to have this characteristic since even if the upper corner frequency is set at 1.5 times the subchannel carrier frequency, there will still be one or two dB attenuation at the subchannel carrier frequency and not as much attenuation at the 3rd harmonic.

An instantaneous slew rate of a subchannel carrier square wave could have an unpredictable effect on the clock recovery process in the gigabit receiver by causing the pulse width modulation zero crossing to jump too suddenly from one position to another thereby causing a possible loss of synchronization.

The Digital Subchannel Receiver

The subchannel receiver 423 in FIG. 26 is shown in more detail in FIG. 29. The embodiment shown in FIG. 29 is a custom, discrete implementation of digital signal processing circuitry: that is relatively simple and inexpensive. In other embodiments, commercially available digital FSK receiver chips can be used. In still other embodiments, a programmable digital signal processor programmed to perform the functions to be described below in the sequence defined below can also be used, as represented by dashed line 640. If the DSP chip has an on-board analog-to-digital converter, the function of A/D converter 482 can be performed on-board the DSP chip.

The low level filtered analog subchannel signal on line 473 in FIG. 1 is input to an amplifier 478 which provides a +20 dB amplification. The output of the amplifier is coupled to the input of a 2-pole active low pass filter and amplifier 480. The mark and space frequencies are 120+−3)*$F_b$ where $F_b$ is the baud rate. The first order center frequency of filter 480 in one embodiment is 120*$F_b$, and the Q of the filter is 3.5.

The output of filter 480 is coupled to the input of an analog to digital converter with an 8-bit sample output and a sample rate of 4*$F_c$, i.e., 4 times the subchannel carrier frequency. The sample rate is also 480 times the baud rate and 1/4 the clock rate. The deviation frequency $F_d$ is 1/160 of the sample rate. The Nyquist frequency is therefore 2*$F_c$, and any signal that appears at the input 484 of the ADC 82 at 3*$F_c$ would be indistinguishable as an alias of a signal at $F_c$. The purpose the active filter 480 is, among other things, to function as an anti-aliasing filter. The purpose of the amplifier 478 and amplification in the active filter is to provide an amplitude for the subchannel signal at the input of the ADC 482 which approximately matches the full scale range of the ADC to maximize the resolution of the steps. The active filter 480 also act as a buffer to drive the high capacitance of the input of the ADC 482. The active filter anti-aliasing function selectively attenuates alias signals at 3*$F_c$ and 5*$F_c$.

By converting the subchannel signal to digital samples, the entire frequency domain is reduced to the frequencies between zero and half the sample frequency. Conversion to digital also allows the use of a very narrow passband digital filter to perform two functions. The filter functions to reject all signals except signals very close to the subchannel frequency in a first stage to give extremely good receiver sensitivity and selectivity in the presence of noise. In a second stage, the filter works in conjunction with a local oscillator and mixer to discriminate between the Mark and Space frequencies so as to demodulate the subchannel carrier.

The output samples from ADC 482 on line 484 digitally define a frequency spectrum that contains the subchannel data. This spectrum contains a Mark frequency at the subchannel carrier frequency plus the deviation frequency caused by the subchannel Mark bits and a Space frequency at the subchannel carrier frequency minus the deviation frequency caused by the subchannel Space bits. A local oscillator 486 generates a quadrature digital signal that defines a phasor having the subchannel carrier frequency $F_c$. The phasor is defined by an exponential with a magnitude (defining the inphase component) and the exponential defines the quadrature component with the quadrature component lagging in phase behind the inphase component. This phasor is defined by a digital signal on the imaginary component line of bus 488 which varies from 0 to +1 to 0 to −1 over one cycle. In other words, the local oscillator 486 outputs a complex signal $Lo1(n)=lo1\_i(n)$ and $lo1\_q(n)$. These are the real and complex components of $1.0*exp(-j*wc*n)$, where the radian frequency $wc=e*pi*fs1/4$. Numerically, these signals repeat with a period of 4 samples: $(i,q)=(1,0),(0,-1),(-1,0),(0,1)$. In other words, the digital signal on the real component line of bus 488 varies from +1 to 0 to −1 to 0 so as to be in a quadrature phase relationship to the square wave defined by the imaginary component. Thus, multiplication by lo1 is simply addition or subtraction of an i or q term.

These two local oscillator quadrature waveforms are each multiplied by a mixer 490 times the sample values on bus 484. The function of the mixer is to shift the subcarrier signal to baseband. Each sample is multiplied by the imaginary component on bus 488 to generate an imaginary output component on 2-wire bus 492. The complex result is $ifi(n)=rf\_in(n)*lo1(n)$ where $rf\_in(n)$ is the sample stream output from the analog to digital converter. In other words, each sample is multiplied by the real component and the imaginary component on bus 488 to generate a real component and an imaginary component on the inphase and quadrature wires, respectively, of 2-wire bus 492. The multiplications are simple since the local oscillator value varies between 0 to +1 to −1 so the multiplication involves only sign changes and setting to zero of the values of certain samples arriving when the real or imaginary components are 0 at certain times during the local oscillator cycle. The Mark and Space frequencies are + and $-3*F_b$ or + and $-F_s1/160$.

The mixing process creates sum and difference sideband frequencies which are digitally represented as complex quadrature signals on 2-wire bus 492 at the output of the mixer 490. The sum frequencies are generally at twice the subchannel carrier frequency and will be rejected by digital finite impulse response filter 494 which receives the mix products. The difference frequencies are the frequencies of interest since they are generally at baseband since the subchannel carrier frequency has been generally removed. The lowpass filter 494 has a passband that extends from zero to generally between 6 and 12 times the baud rate, $F_b$. The output data stream on bus 496, because of the peculiarities of digital signal processing of complex number representations of frequencies will have only two frequencies, $+F_D$ (the positive deviation frequency) when a Mark is being received, and $-F_D$ (a negative frequency equal to the deviation frequency) when a Space is being received.

The FIR low pass filter 494 has a triangular impulse response in the time domain in the preferred embodiment, which is the best transfer function for performing anti-aliasing prior to resampling by resampler. The resampler 498 resamples at the lower rate $F_s2=F_s1/20=24*F_b=F_c/5$. This triangular transfer function is defined by a series of 40 coefficients which are stored in the FIR or which can be supplied from a register or other memory not shown via bus 483. The impulse response of filter 494 is $f2\_ir(n)$ and the result is $if1f(n)=convolution(if1(n), fe\_ir(n))$.

The difference frequency sideband on bus 492 will contain a Mark frequency component at the deviation frequency $F_D$ where the input Mark frequency $F_M$ at the input to the mixer was $F_M=F_C+F_D$. The difference frequency sideband will also contain a Space frequency $F_{SP}=-F_D$ where the input spectrum to the mixer contained a Space frequency $F_{SP}=(F_C-F_D)$. The corner frequency of the digital low pass filter 494 is set at $2*F_D$ in one embodiment so the upper sideband or sum frequencies are rejected and the output bus 496 contains samples of quadrature waveforms that define only plus and minus deviation frequencies which define the Mark and Space bits of the subchannel carrier. The reason the mixing and filtering was done in the complex, quadrature domain is so that positive Mark frequencies could be distinguished from negative Space frequencies in the samples output from the mixer where the subchannel unmodulated carrier frequency component has been removed. In other words, the difference frequency sideband will be centered on D.C. or zero frequency and have a positive $F_D$ component representing the Mark bits over time and a negative $F_D$ component representing the Space bits over time. The FIR low pass filter 494 is really two FIR filters, one for real and one for imaginary components. These FIR low pass filters pass only the difference frequencies around zero and reject the sum frequencies and a great deal of noise thereby giving the receiver great sensitivity and selectivity. The output of the FIR filter 494 is resampled at a much lower rate $F_s2$ in resampler 498. The resampler resamples the data at a rate which is 1/20 of the sample rate of the analog-to-digital converter 482. The purpose of resampling is to reduce the amount of computation that needs to be done in the Mark and Space detectors that follow. Since the frequencies that remain after mixing are very close to D.C., there is no need for a high sample rate. Fewer samples means less computation and simpler circuitry and software.

In the preferred embodiment, the functionality of the resampler 498 and the FIR filter are combined to save computation in the FIR filter. This is done to save computation in the FIR filter by computing only every 20th output sample instead of all of them. This is done by using one line of computational circuitry that multiplies each of 40 samples times the 40 coefficients and sums the partial products in an accumulator, and another parallel line of computational circuitry that multiplies another block of 40 samples on bus 492 times the 40 coefficients and accumulates the partial products in a second accumulator. This second block of 40 samples is separated in time in the sample stream on bus 492 from the first block of 40 samples by 20 samples. In alternative embodiments, the FIR filter 494 could compute every sample, and the resampler 498 could simply select every 20th sample and throw the rest away.

The result of the resampling is the complex sequence $if\_fs2(m)=if1f(n)$, where $n=20*m$. The "m" will be used to designate all discrete time variables at the lower second sample rate $F_s2$.

In the if_fs2 signal, the Mark and Space frequencies are + and $-F_s2/8$. Instead of using bandpass filters for both the Mark and Space frequencies, which could be done in alternative embodiments, another local oscillator will be used for each of the Mark and Space frequencies to shift them to baseband or zero frequency and then digital lowpass filters (or analog low pass filters with suitable conversion back to analog representation) will be used. This implementation is simplified by the fact that the Mark and Space frequencies are negatives of each other.

To implement this approach, the complex output 499 of the resampler is applied to the inputs of a Mark detector 600 and a Space detector 602. The function of the Mark and Space detectors is to filter out just the frequency components representing Mark and Space bits and determine the relative amplitudes at any particular time. Whichever detector has the higher amplitude output is deemed to represent the actual bit that was transmitted. Both the Mark and Space detectors function by mixing the resampled output with a $-F_D$ or $+F_D$ local oscillator signal, which shifts the target frequency to D.C., and filtering the results in a digital FIR lowpass filter. After filtering, the amplitude of the result is determined by squaring and summing the amplitudes of the inphase and quadrature (real and imaginary) components. The bandwidth of the lowpass filters 606, 608, 622, and 624 is, in the preferred embodiment, variable to accommodate faster or slower baud rates for the subchannel data.

More specifically, in the Mark detector, the output of the resampler is multiplied (complex number multiplication) in mixer 600 by a complex (quadrature) phasor representing a digital local oscillator signal, said signal taking the form of a sample stream representing a frequency of $-F_D$ generated by local oscillator 603. The notation for the output of the local oscillator is lo2(m)=lo2_i(m) for the inphase part and lo2_q(m) for the quadrature part. Like the first local oscillator, this complex phasor is a unit amplitude complex exponential at frequency $-F_s2/8$. Unfortunately, not all the terms are plus or minus 1 or 0; half the samples have i or q absolute values at 0.7071.

The Mark detect product on bus 604 output by mixer 600 is mp(m)=if_fs2(m)*lo2(m) and will have a frequency of zero for a Mark and $-F_s2/4$ for a Space. Mixing by complex number multiplication results in generation of the sum product and no difference product is generated. Thus, the result of this mixing is to move the frequency of a Space $-F_D$ to a frequency of $-2*F_D$ ($-F_D+(-F_D)=-2*F_D$) on output line 604 as the sum product and having some amplitude representing the intensity of the Space signal received. Likewise, if a Mark signal at frequency $+F_D$ is received on bus 499, its frequency is moved 0, i.e., $(+F_D+(-F_D)=0)$ but the result will have some amplitude representing the intensity of the Mark signal received. The individual product terms are:

mp_ii=if_fs2_i*lo2_i mp_iq=if_fs2_i*lo2_q mp_qi=if_fs2_q*lo2_i mp_qq=if_fs2_q*lo2_q.

These individual product terms are combined to form the complex product terms mp_i=mp_ii−mp_qq mp_q=mp_iq+mp_qi The corresponding Space product would be formed using the complex conjugate of lo2, or simply sp_i=mp_ii+mp_qq sp_q=−mp_iq+mp_qi.

Two narrow lowpass (or bandpass in some embodiments) FIR filters 606 and 608 filter the inphase and quadrature components output on bus 604 from the mixer 600. The lowpass filters of the preferred embodiment for the Mark and Space frequencies have a bandwidth of approximately $1*F_b=F_s2/24$. These lowpass filters are preferably 24 point FIR filters with triangular impulse response with the 24 coefficients being programmable so as to adjust the bandwidth of the filter to account for faster or slower baud rates of the subchannel data.

Conceptually, the lowpass filter of the Mark and Space power detector is applied to mp(m) and sp(m), although, with the same amount of calculation, it can be applied to the individual product terms. In either case, the impulse response of the filter is f3_ir(m) and the outputs are mpf(m)=convolution (mp(m), f3_ir(m)) and spf(m)=convolution (mp(m), f3_ir(m)). If f3_ir is nonzero for more than 24 samples, the filter creates intersymbol interference.

In alternative embodiments, the two filters used for each of the inphase and quadrature components in each of the Mark and Space detectors are bandpass filters. The two bandpass filters for the Mark detector have a transfer function in the frequency domain that defines a passband centered on 0 frequency where the Mark signal will be moved by the mixing process. This passband is not wide enough to pass frequencies at $-2*F_D$ so if a Space frequency is present on bus 499, its mix product at $-2*F_D$ on bus 604 will be rejected. If samples encoding a Mark frequency is present on bus 499, the mix product on bus 604 will pass through the FIR filters 606 and 608 without significant attenuation. The mixer 600, FIRs 606 and 608 and the local oscillator are of conventional digital signal processing design. Any conventional design which can accomplish the functions defined herein for each digital signal processing component will suffice to practice the invention. Specific designs are given in the following treatises and databooks which are hereby incorporated by reference: Elliott, *Handbook of Digital Signal Processing Engineering Applications*, Academic Press, Inc., San Diego, ISBN 0-12-237075-9, TK5102.5.H32 (1987); Oppenheim & Schafer, *Discrete Signal Processing*, Prentice Hall, Englewood Cliffs, N.J. 07632, ISBN 0-13-216292-X, TK5102.5.02452 (1989); *Digital Signal Processing Databook*, Harris Semiconductor, (1994).

An indication of the amplitude of the frequency components passed through FIR filters 606 and 608 is generated by squaring devices 610 and 612 and summer 614. The power of a signal having a real (inphase) and imaginary (quadrature) axis component is equal to the sum of the squares of the real and imaginary components. Device 610 calculates the square of the inphase component, and device 612 calculates the square of the quadrature component. This forms mpp(m) and spp(m) which are the power (squared magnitude) of the complex input. Specifically, mpp=abs(mpf)^2=mpf_i*mpf_i+mpf_q*mpf_q and similarly for spp. Summer 614 adds the squares of the inphase and quadrature components and the output is used as an indication of the power of the frequency components that have passed through the FIR filters. Typically, a comparator (not shown) receives both outputs and determines which of the output signals on lines 632 and 634 is greater and outputs either a Mark or Space bit on bus 448 to UART 449. UART 449 resamples the output at $F_b=F_s2/24$.

The Space detector 602 works the same way as the Mark detector except that the local oscillator 616 generates a complex phasor representation of a local oscillator signal at a frequency $+F_D$. When multiplied in mixer 618 times the incoming sample data for the inphase and quadrature components on bus 499 for a Space frequency at $-F_D$, the resulting mix product is at 0 frequency $(-F_D+(+F_D))$ with an amplitude representitive of the intensity of the Space signal being received. If the local oscillator signal is mixed with a Mark frequency at $+F_D$, the mix product on bus 620 is at frequency $2*F_D$. The FIR filters 622 and 624 have coefficients which define a narrow passband centered on zero frequency so as to pass any Space frequency mix product but not wide enough to pass any Mark frequency mix product at $2*F_D$. Squaring devices 626 and 628 calculate the squares of the inphase and quadrature components, and summer 630 sums the squares to generate an indication on bus 632 of the power of the signal received. If the subchannel carrier frequency is at the Space frequency, the signal on line 632 will be greater than the signal on line 634. If the subchannel carrier frequency is at the Mark frequency, the signal on line 634 will be greater than the signal on line 632. These differences are used by a comparator (not shown) to re-generate digital data replicating the original data fed to the subchannel transmitter.

Figure 30:
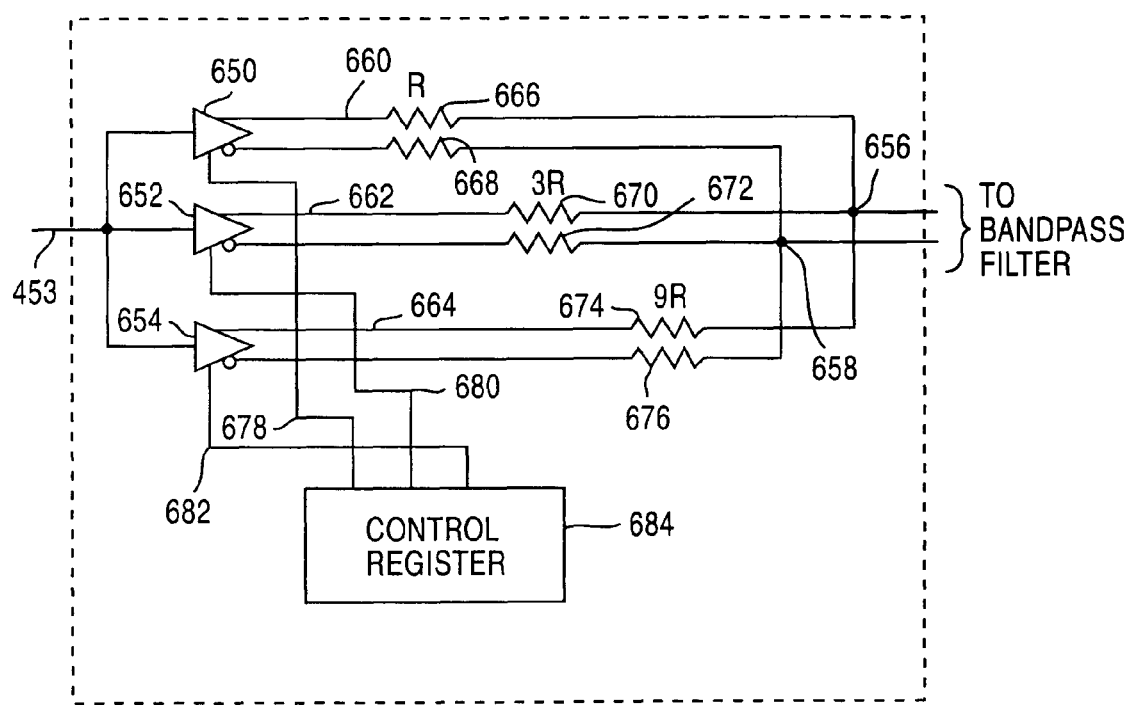
FIG. 30 is a block diagram of the preferred form of variable attenuator.

Referring to FIG. 30, there is shown a block diagram of the preferred form for the optional variable attenuator 470 in FIG. 27. The attenuator receives the FSK modulated square wave output signal on line 453 and applies it simultaneously to the inputs of three complementary output signal buffers 650, 652 and 654. Each of these buffers has a true and complement output signal which is coupled through a resistor to one of two summing junctions 656 and 658. All the true outputs 660, 662 and 664 are coupled through their resistors to summing junction 656. All the complementary signal outputs are coupled to summing junction 658. The values of the two resistors 666 and 668 are set at some value R. The values of the two resistors 670 and 672 are set at a value of 3R or three times higher than R. The values of the two resistors 674 and 676 are set at 9R or nine times higher than R. Each of the buffers receives control bits on buses 678, 680 and 682, respectively. The control bits are stored in a control register 684 and can be changed by any known means. The control bits on bus 678 can control buffer 650 so as to be on or off. The control bits on bus 680 can control buffer 652 to be on or off or invert the signal. The control bits on bus 682 can control buffer 654 to be on or off or invert the signal. By managing the control bits, 13 different attenuation levels can be obtained.

There is a way to simplify the demodulator shown in FIG. 29 such that separate local oscillators need not be used for the Mark and Space detectors and to simplify the computations needed for Mark and Space detections. Namely, there is available some extra economy of computation that arises from the fact that the Mark and Space frequencies are equal and opposite sign frequencies $+F_D$ and $-F_D$ at the output of the first mixer 490 and the FIR low pass filter 494.

Because of the symmetry, there is a way to reduce the amount of hardware needed. For example, the outputs of the Space detector local oscillator 616 can be obtained from the Mark detector local oscillator 602 by simply changing the sign of the imaginary component. The same goes for the mixer 618 and low-pass filter comprised of FIR bandpass filters 622 and 624, if we defer the combination of partial products.

"Deferring the combination of partial products" needs some explaining. We start with the Mark detector case.

The complex IF signal after re-sampling in the resampler 498 is:

$$if\_fs2(m),$$

a complex sequence with the following real and imaginary parts $$if\_fs2\_i(m) \text{ and } if\_fs2\_q(m),$$

where:

"if_fs2" means intermediate frequency signal at sample rate fs2, and where i and q stand for "in-phase" and "quadrature", which are the traditional names of real and imaginary components in complex signal processing.

"m" is the subscript identifying each sample in the sequence.

Now, the second complex local oscillator, 116, generates the sequence $$lo2(m)$$

with real and imaginary parts lo2_i(m) and lo2_q(m).

Similar to the output of the first local oscillator 602 in the Mark detector, the output of local oscillator 616 is a unit-amplitude complex exponential at frequency $-Fs*2/8$.

The Mark detect product $mp(m)=if\_fs2(m)*lo2(m)$ will have a frequency of zero for a Mark and $-Fs2/4$ for a Space. The individual product terms are:

$$mp\_ii = if\_fs2\_i * lo2\_i$$

$$mp\_iq = if\_fs2\_i * lo2\_q$$

$$mp\_qi = if\_fs2\_q * lo2\_i$$

$$mp\_qq = if\_fs2\_q * lo2\_q$$

They are combined to form the complex product terms $$mp\_i = mp\_ii - mp\_qq$$

$$mp\_q = mp\_iq + mp\_qi$$

The corresponding Space product sp(m) would be formed using the complex conjugate of the complex product terms just detailed, or simply:

$$sp\_i = mp\_ii + mp\_qq$$

$$sp\_q = -mp\_iq + mp\_qi$$

This calculation can be done in a programmed digital signal processor to replace both of the local oscillators 602 and 616 and mixers 600 and 618, or a single local oscillator and mixer can be used and the calculation described above can be made in a DSP chip or other circuitry to replace the other local oscillator and mixer.

The next stage of the demodulator is a lowpass filter or bandpass filter shown in the mark detector as comprised of FIR bandpass filters 606 and 608, with a bandwidth of approximately $1*Fb=Fs2/24$. Conceptually this filter is applied to mp(m) and sp(m), although with the same amount of computation it can be applied to the individual product terms.

Here is what we mean by deferring the combination of partial products. Compute the partial products mp_ii, mp_iq, mp_qi, and mp_qq as given above. Apply the lowpass or bandpass filter to each (a lowpass filter will be assumed), giving the results:

$$lpf(mp\_ii), lpf(mp\_iq), lpf(mp\_qi), \text{ and } lpf(mp\_qq).$$

Now we can combine the FILTERED partial products to get the Mark detector signal $$lpf(mp\_i) = lpf(mp\_ii) - lpf(mp\_qq)$$

$$lpf(mp\_q) = lpf(mp\_iq) + lpf(mp\_qi).$$

To get the Space detector signal, simply compute $$lpf(sp\_i) = lpf(mp\_ii) + lpf(mp\_qq)$$

$$lpf(sp\_q) = -lpf(mp\_iq) + lpf(mp\_qi)$$

That is a significant savings because the lpf computation is relatively intensive, and is shared by both the Mark and Space detectors.

In actual ASIC implementations the same results can be achieved without the optimization just described. Specifically, Mark and Space local oscillators, mixers, and lowpass or bandpass filters can each be implemented using independent hardware.

DSP computation for this application is relatively undemanding so any algorithm which does separate calculations for each of the mark and space detectors or which uses the optimizations just described to cut down on computation will suffice to practice the invention.

Other modifications of the described technology will also be apparent to those skilled in the art without departing from the spirit and scope of the invention. For example, analog or digital low pass filters (LPF) instead of digital FIR (Finite Impulse Response) filters can be used in wherever a digital filter is shown with suitable digital-to-analog conversion in cases where analog filters are used. An LPF does not have to be an FIR filter, and an FIR filter does not have to be an LPF. It has been found in actual service that a 40-point triangular FIR filter response works well for filter 494 although a rectangular filter response would also work in alternative embodiments. The low pass FIR filters in the Mark and Space detectors are current 24 coefficient filters, but improved response with a larger number of coefficients.

Redundant Cable Detect Algorithm For GUMP Protocol

Figure 31A:
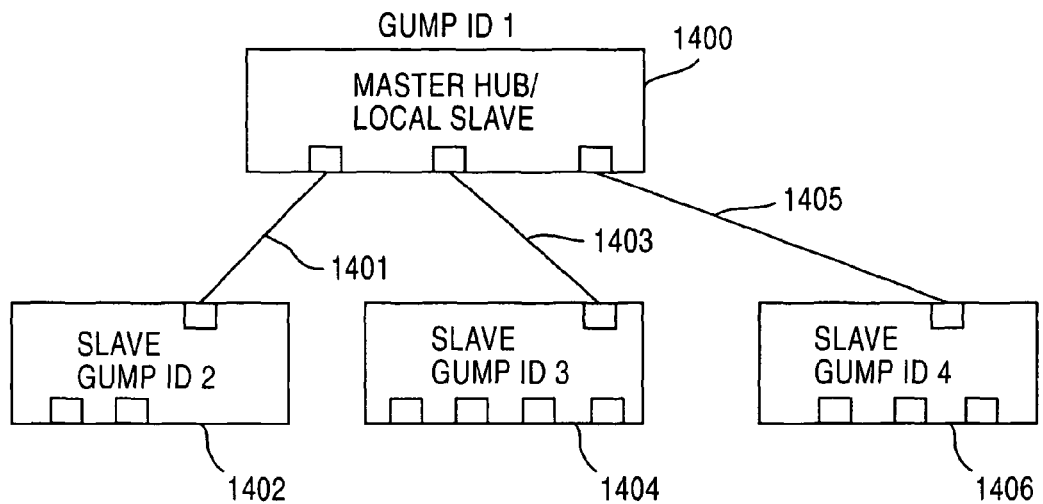
FIGS. 31A and 31B are block diagrams of a network in which the invention can be employed, and a network in which the invention can be employed in which a redundant cable 1407 is present.
Figure 31B:
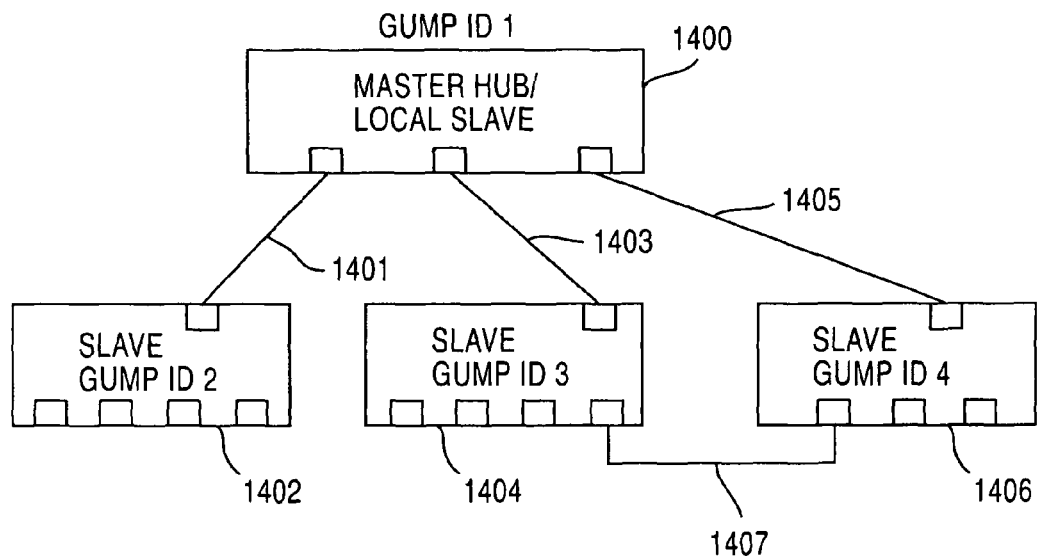
Figure 32A:
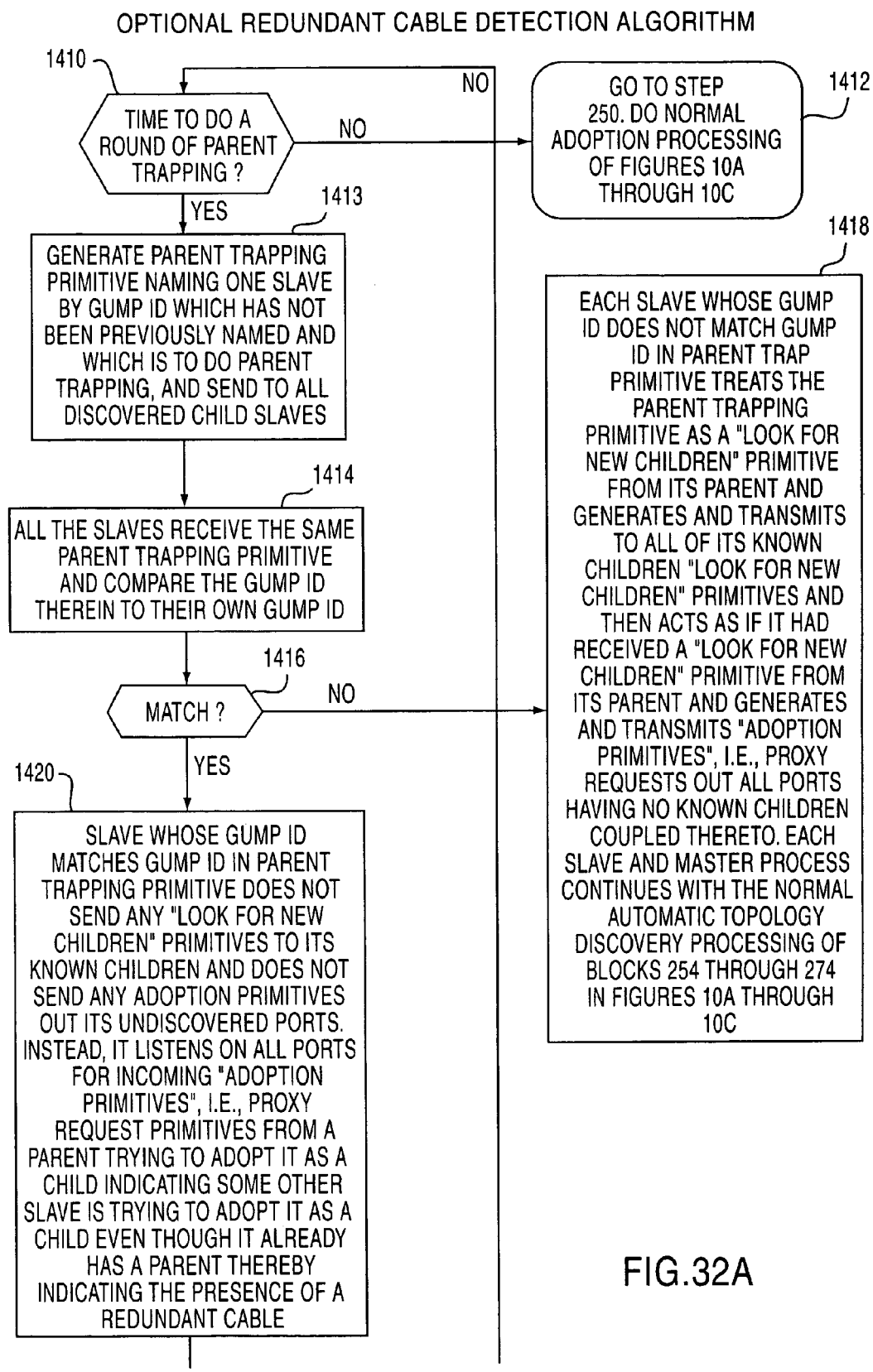
FIGS. 32A and 32B are a flowchart of a process to automatically discover the existence of a redundant cable during automatic topology discovery.
Figure 32B:
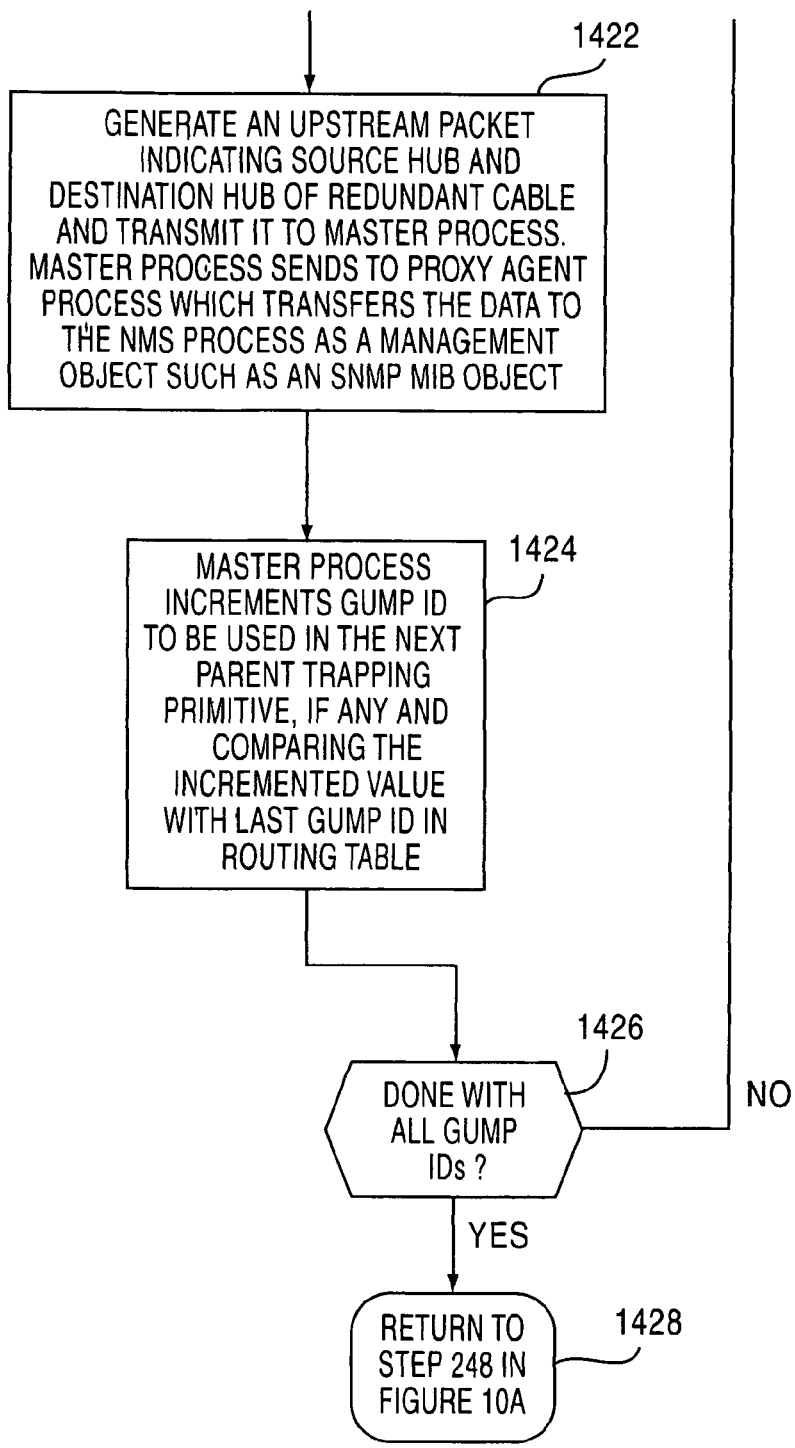

Referring to the block diagrams of FIGS. 31A and 31B, there is shown a correctly wired network and a possibly incorrectly wired network, respectively. FIGS. 32A and 32B are a flowchart symbolizing a process implemented from time to time by the slave processes to discover possible wiring errors.

In FIG. 31A, a master hub, proxy agent process, master hub process and local slave hardware are indicated at 1400. This master hub/local slave has three downlink ports which are coupled by high speed data network links 1401, 1403 and 1405 with three slaves indicated at 1402, 1404 and 1406. No other slaves are connected to the downlink ports of these three slaves but there could be for purposes of practicing the redundant cable detect algorithm.

FIG. 31B shows an identical network to that shown in FIG. 31A except that, either intentionally or unintentionally, a high speed network link 1407 has been added connecting a port on slave 1404 and a port on slave 1406. This redundant cable connection is deemed redundant because both slaves 1404 and 1406 already have a parent slave connection to master hub 1400. Network link 1407 implies that slave 1404 might misinterpret slave 1406 as its parent and vice versa.

The redundant cable connection 1407 does not cause the Fibre Channel communication protocol to fail so no error would be apparent to the user if the redundant connection was unintended. However, the redundant connection does break what would normally be a single loop up into two smaller loops. This has the effect of separating Fibre Channel devices attached to the hubs having GUMP IDs 1-4 into two separate loops possibly rendering them unable to talk to each other. While this may have been the intended effect, chances are quite good that the user did not intend such a result and the redundant cable connection 1407 is a wiring error.

The process symbolized by the flowcharts of FIGS. 32A and 32B is a process which can detect such a wiring anomaly and present information as to its exact location via an SNMP MIB object or other object exposed to the network manager via the NMS process. The process starts at step 1410 with a test to determine whether an adoption interval during which parent trapping is going to be done. If not, processing flows to step 1412 representing a transfer to step 250 on FIG. 10A to start doing normal automatic topology discovery, i.e., adoption processing. If the adoption interval is one during which optional parent trapping is to be done, processing flows to block 1414 symbolizing the process of the proxy agent process or master process generating and sending to all discovered child slaves a special 3-byte "parent-trap" primitive during an adoption period. The parent trapping primitive includes two bytes which identify it as an adoption primitive and a third byte which identifies the slave by GUMP ID which is to perform the parent trapping function during this particular adoption interval. In the preferred embodiment, the adoption interval happens once every 3 seconds, and the master process generate one parent trap primitive every three seconds naming a different slave by GUMP ID until the master process has cycled through all GUMP IDs on the network. The redundant cable detection algorithm will use as many adoption intervals as there are GUMP IDs in the network, and, they may be consecutive or spaced apart in time. Each slave will do parent trapping during the entire adoption interval during which it detects the parent trapping primitive naming it.

Step 1416 represents the process of each slave receiving the parent trap primitive and comparing the GUMP ID therein to that slave's GUMP ID. Step 1418 represents the branching which occurs based upon the result of the comparison.

Each slave whose GUMP ID does not match the GUMP ID in the parent trap performs the process symbolized by block 1418 and treats the parent trapping primitive as if it were a "look for new children" primitive received from its parent. It responds by generating and send "look for new children" primitives out all downlink ports coupled to known children. Then each slave which is not doing parent trapping generates and repetitively sends out each port not coupled to a known child a stream of "adoption primitives", i.e., proxy requests indicating to any new child which receives one that the slave which sent the proxy request is trying to adopt it as its child. Each slave and its parent and the master process continues the automatic topology discovery process defined earlier in steps 254 through 274 of FIGS. 10A through 10C.

Step 1420 represents the process carried out by the single slave whose GUMP ID matches the GUMP in the parent trapping primitive. Basically, this single slave responds to the parent trapping primitive by not sending out any "look for new children" primitives to its known children and not sending out any "adoption primitives" (also sometimes referred to herein as a "proxy request" primitives) out its undiscovered ports. Instead, this single slave masquerades as a new, unadopted slave and listens on all its ports for incoming "adoption primitives" indicating some other slave is trying to adopt is as a child and be its parent even though the parent trapping slave already has a parent. If the parent trapping slave receives an adoption primitive during the adoption interval when it is assigned to parent trapping, there is a redundant cable present indicating a possible wiring error.

Because the adoption primitive contains the GUMP ID of the slave trying to adopt the parent trapping slave, the parent trapping slave which receives the wayward adoption primitive not only knows there is a possible wiring error but also knows its origin and its destination hubs. The process of generating an upstream packet which indicates the source and destination hubs of the redundant cable and transmitting it to the master process and to the proxy agent for transmission to the NMS process as a MIB object is represented by block 1422.

Block 1424 represents the process carried out by the master process of incrementing the GUMP ID to be used in the next parent trapping primitive and comparing the incremented value to the last GUMP ID in the routing table.

Test 1426 represents the branching which occurs based upon the results of the comparison. If all the GUMP IDs have been used in parent trapping primitives previously, then the parent trapping process is done, and processing flows to block 1428 representing a return to step 248 in FIG. 10A to resume processing NMS requests until the next adoption interval occurs. If not all slaves have yet done a parent trapping round, processing returns to step 1410 on FIG. 38A to determine if it is time to do another parent trapping round. This completes the redundant cable detection algorithm.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. An apparatus comprising:
   a processor;
   a proxy agent that is configured to use the processor to:
      receive a management packet designated for a network object, and
      convert the management packet to a subchannel packet; and
   a subchannel transceiver that is configured to communicate the subchannel packet to the network object using a subchannel data path and a subchannel protocol, wherein the subchannel data path comprises a portion of a spectrum of high speed data on a same media as the high speed data.

2. The apparatus of claim 1 wherein the proxy agent is configured to use the processor to convert the management packet to the subchannel packet, wherein the subchannel packet includes a structure to support multiple different subchannel communication protocols.

3. The apparatus of claim 2 wherein the subchannel communication protocols include a synchronous, point-to-point protocol.

4. The apparatus of claim 1 further comprising a mapping table, wherein the proxy agent is configured to use the processor to use an object identifier contained in the management packet to search the mapping table for a function to convert the management packet to the subchannel packet.

5. The apparatus of claim 1 wherein the subchannel transceiver is a single subchannel transceiver having a transmit port and a receive port and further comprising:
   multiple ports over which the single subchannel transceiver communicates; and
   a multiplexer that is configured to simultaneously switch the transmit port and the receive port between the multiple ports.

6. The apparatus of claim 1 wherein the subchannel data path includes an out-of-band subchannel transmission path.

7. The apparatus of claim 1 wherein the subchannel packet includes an object identifier and management data to be acted on by the network object.

8. A recordable non-transitory storage medium having recorded and stored thereon computer executable code that, when executed, is configured to cause at least one processor to execute on a master hub, the master hub configured to:
   receive a management packet designated for a network object;
   convert the management packet to a subchannel packet; and
   communicate the subchannel packet to the network object using a subchannel data path and a subchannel protocol, wherein the subchannel data path comprises a portion of a spectrum of high speed data on a same media as the high speed data, wherein the subchannel data path shares a same media as high speed data.

9. The recordable non-transitory storage medium of claim 8 wherein the subchannel packet includes a structure to support multiple different subchannel communication protocols.

10. The recordable non-transitory storage medium of claim 9 wherein the subchannel communication protocols include a synchronous, point-to-point protocol.

11. The recordable non-transitory storage medium of claim 8 wherein the master hub is configured to use an object identifier contained in the management packet to search a mapping table for a function to convert the management packet to the subchannel packet.

12. The recordable non-transitory storage medium of claim 8 wherein the subchannel data path includes an out-of-band subchannel transmission path.

13. The recordable non-transitory storage medium of claim 8 wherein the subchannel packet includes an object identifier and management data to be acted on by the network object.

14. A method for subchannel communications, the method comprising:
   receiving a management packet designated for a network object;
   converting the management packet to a subchannel packet using a processor; and
   communicating the subchannel packet to the network object using a subchannel data path and a subchannel protocol, wherein the subchannel data path comprises a portion of a spectrum of high speed data on a same media as the high speed data.

15. The method as in claim 14 wherein the subchannel packet includes a structure to support multiple different subchannel communication protocols.

16. The method as in claim 15 wherein the subchannel communication protocols include a synchronous, point-to-point protocol.

17. The method as in claim 14 further comprising searching a mapping table for a function to convert the management packet to the subchannel packet using an object identifier contained in the management packet.

18. The method as in claim 14 wherein the subchannel data path includes an out-of-band subchannel transmission path.

19. The method as in claim 14 wherein the subchannel packet includes an object identifier and management data to be acted on by the network object.

* * * * *